(12) United States Patent
Dharmaji

(10) Patent No.: US 10,523,979 B2
(45) Date of Patent: Dec. 31, 2019

(54) STREAMING LIVE VIDEO

(71) Applicant: Vyu Labs, Inc., Cupertino, CA (US)

(72) Inventor: Srinivasa M. Dharmaji, Cupertino, CA (US)

(73) Assignee: Vyu Labs, Inc., Cupertino, CA (US)

( * ) Notice: Subject to any disclaimer, the term of this patent is extended or adjusted under 35 U.S.C. 154(b) by 0 days.

(21) Appl. No.: 15/850,417

(22) Filed: Dec. 21, 2017

(65) Prior Publication Data

US 2019/0200054 A1   Jun. 27, 2019

(51) Int. Cl.

| | |
|---|---|
| *H04N 21/2343* | (2011.01) |
| *H04N 21/2187* | (2011.01) |
| *H04N 21/236* | (2011.01) |
| *H04N 21/239* | (2011.01) |
| *H04N 21/2662* | (2011.01) |
| *H04N 21/643* | (2011.01) |
| *H04N 21/61* | (2011.01) |
| *H04L 29/08* | (2006.01) |
| *H04L 29/06* | (2006.01) |

(52) U.S. Cl.
CPC ..... *H04N 21/234309* (2013.01); *H04L 65/00* (2013.01); *H04L 69/162* (2013.01); *H04N 21/2187* (2013.01); *H04N 21/236* (2013.01); *H04N 21/2393* (2013.01); *H04N 21/2662* (2013.01); *H04N 21/643* (2013.01); *H04L 67/02* (2013.01); *H04N 21/6125* (2013.01); *H04N 21/6175* (2013.01)

(58) Field of Classification Search
CPC ....... H04N 21/234309; H04N 21/2187; H04N 21/236; H04N 21/2393; H04N 21/2662; H04N 21/643; H04N 21/6125; H04N 21/6175; H04L 67/02

See application file for complete search history.

(56) References Cited

U.S. PATENT DOCUMENTS

| | | | |
|---|---|---|---|
| 9,332,049 B1* | 5/2016 | Herrero | H04L 65/607 |
| 9,531,843 B1* | 12/2016 | Young | H04L 25/4908 |
| 2004/0255164 A1* | 12/2004 | Wesemann | H04L 12/4641 726/15 |
| 2008/0120424 A1* | 5/2008 | Deshpande | H04L 65/4084 709/230 |
| 2010/0281174 A1* | 11/2010 | Poder | H04L 67/141 709/228 |

(Continued)

*Primary Examiner* — Randy A Flynn
(74) *Attorney, Agent, or Firm* — Perkins Coie LLP; Michael A. Glenn

(57) ABSTRACT

Methods, apparatuses, and embodiments related to streaming live video. A celebrity plans to live stream an interaction with a fan to a large number of her fans. The celebrity uses a device to capture and stream live video to her fans. The celebrity selects a fan and begins to interact with the fan, who uses a device to live stream a question. To enable a more natural interaction, the celebrity utilizes a platform with reduced latency of communication. With other platforms, latencies of between 6 to 30 seconds may occur in interactions between the celebrity and the fan. The platform utilizes one or more techniques to achieve reduced latency, such as not performing error checks on the live streamed data, not reordering packets while they are being relayed between devices, etc. A TCP tunnel that utilizes raw sockets is used to enable customized techniques for reducing communication latency.

24 Claims, 57 Drawing Sheets

(56) References Cited

U.S. PATENT DOCUMENTS

| | | | |
|---|---|---|---|
| 2012/0265892 A1* | 10/2012 | Ma | H04N 21/23418 |
| | | | 709/231 |
| 2013/0091214 A1* | 4/2013 | Kellerman | G06Q 10/00 |
| | | | 709/204 |
| 2015/0067819 A1* | 3/2015 | Shribman | H04L 67/06 |
| | | | 726/12 |
| 2016/0006817 A1* | 1/2016 | Mitic | H04L 65/608 |
| | | | 709/232 |
| 2016/0192029 A1* | 6/2016 | Bergstrom | H04N 21/251 |
| | | | 725/109 |
| 2017/0019445 A1* | 1/2017 | Panje | H04L 65/1069 |

* cited by examiner

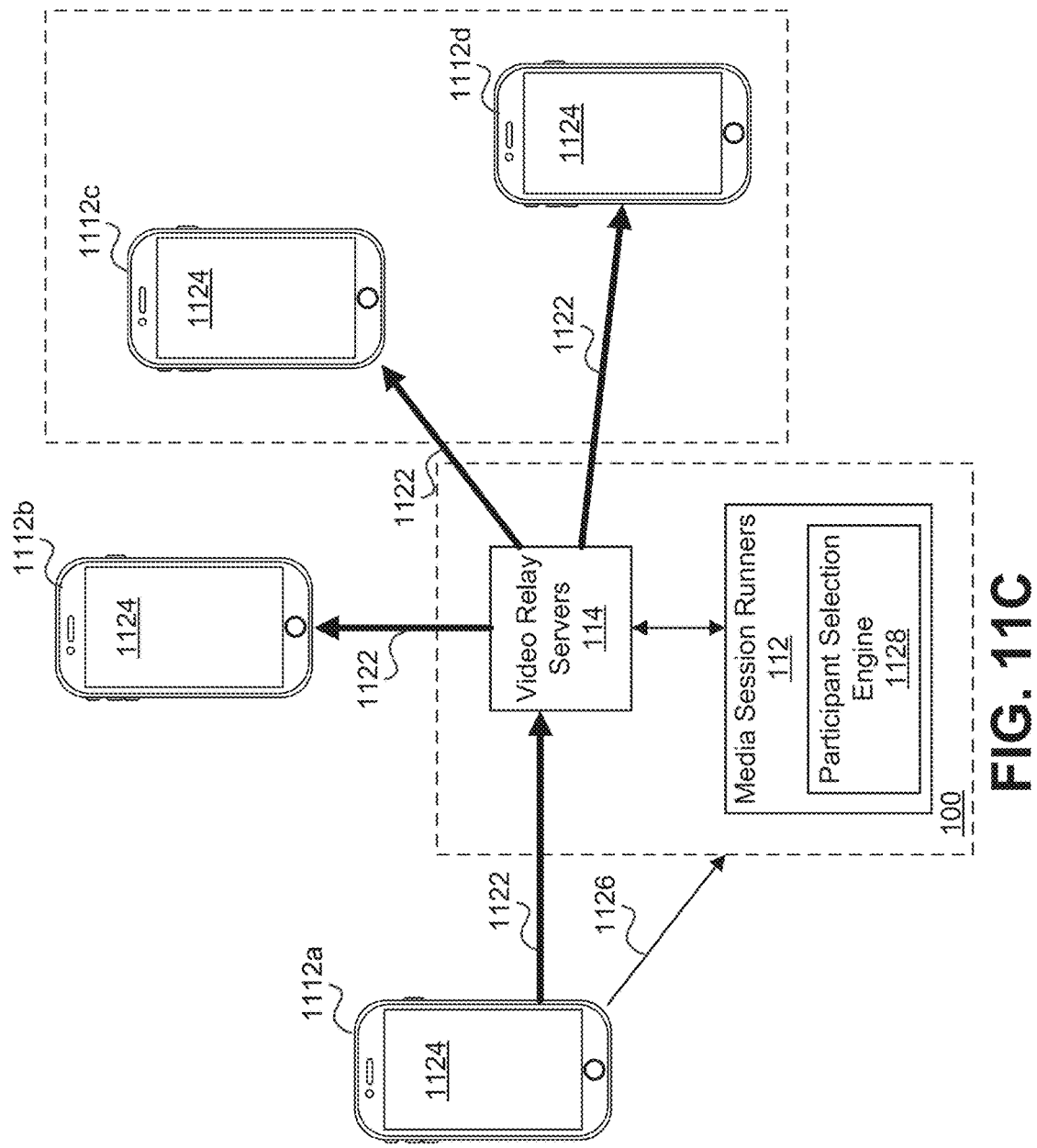

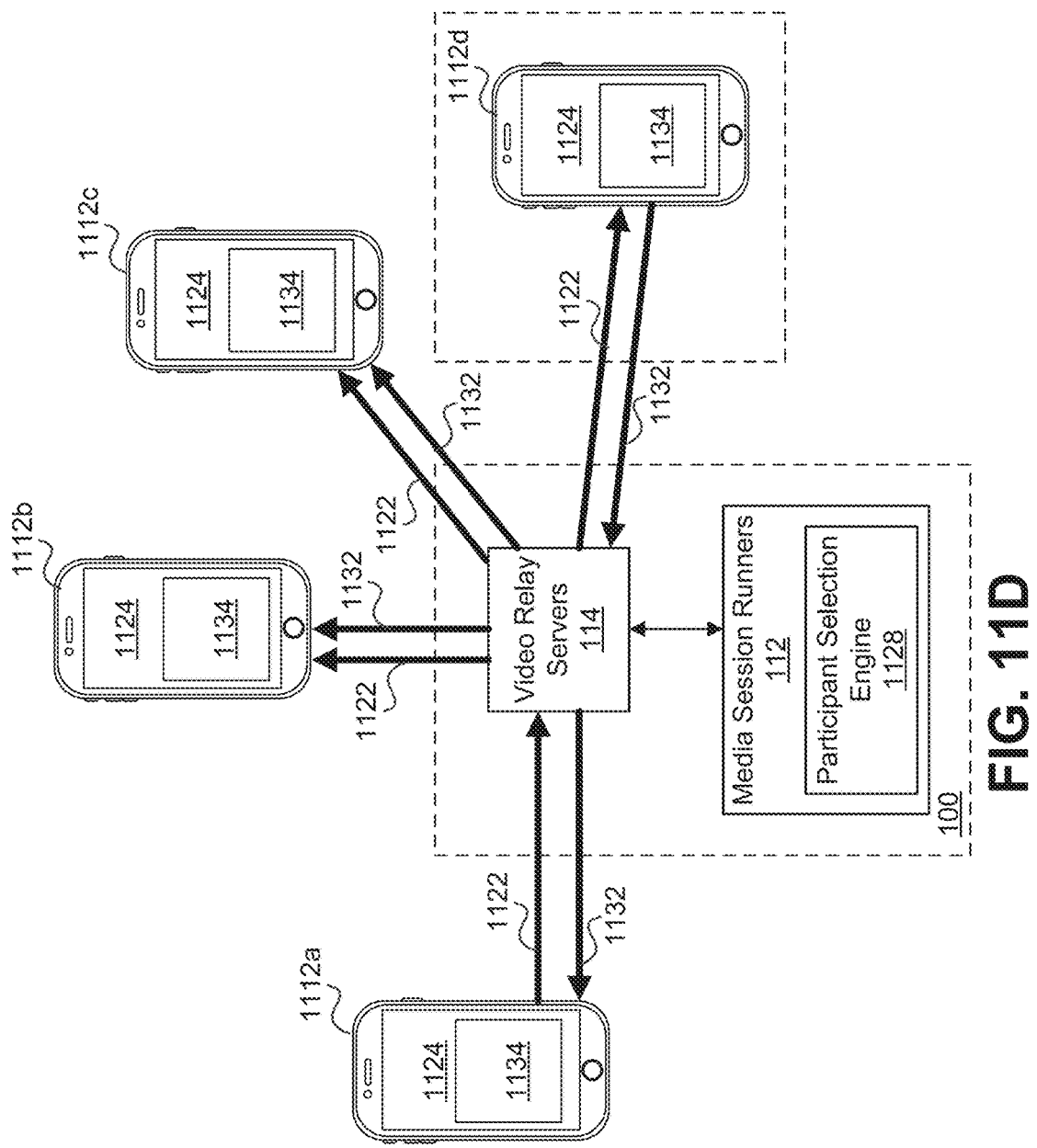

Select Participants for Brainstorming

△ vydeo | Executives  Sessions    Admin ⬤

Schedule New Session                    Brainstorm

EXECUTIVE      John Chambers
POST TO SPARK ROOM  Executive Mainroom
WHEN           Thu May 05 2014 13:25:45 GMT-7:00 □

Participants   Chuck Robbins        ⊖
               Jonathan Rosenberg   ⊖
               Rowan Trollope       ⊖
                        Add Schedule Private brainstorming sessions – anywhere, anytime!

FIG. 33

STREAMING LIVE VIDEO

TECHNICAL FIELD

Various of the disclosed embodiments concern techniques and systems related to streaming live video.

BACKGROUND

Events, occurrences, etc. that may generate interest with the public are often streamed live via the Internet, such as via HTTP Live Streaming (HLS) or Web Real-Time Communication (WebRTC). The event/occurrence/etc. can be, for example, an interview with a voter at an election campaign rally, a social media session between a celebrity and her fans, a scene from an automobile crash site, etc. The event is watched by recipients of the streaming video via their computing devices, such as via their smartphone, tablet, personal computer, etc.

SUMMARY

Introduced here is technology related to streaming live video. In an example, a broadcaster, such as a celebrity, uses a device to capture live video and stream the live video to her fans. The celebrity is planning to stream live video to numerous fans for their entertainment, 100,000 fans in this example, and plans to interact with some of her fans during the live streaming session. The celebrity, the celebrity's agent, etc., logs into a FanDate™ platform to announce to the celebrity's fans that she will have a fan interaction session at 5 pm on Saturday. The celebrity asks her fans to register for the session, and the FanDate platform provides a calendar event for the fan's calendar tool to remind the fan of the session. The FanDate platform posts her announcement to various social media sites, such as Facebook™, Instagram™, Twitter™, etc. Fans login to the FanDate platform and register for the session.

At 4:50 pm on Saturday, ten minutes before the preannounced time, the platform notifies fans that have registered for the session that the session will be starting at 5:00 pm. The celebrity and the celebrity's agent log into the FanDate platform, and prepare for the fan interaction session. At 5:00 pm, the celebrity initiates the session via the FanDate platform. About 100,000 fans join the session, and about 1,000 fans submit a question.

The celebrity begins to stream live video via the platform to all 100,000 of her fans and, before the celebrity is ready to interact with her fans, the FanDate platform evaluates these 1,000 fans to determine which are "safe" to interact with the celebrity. For example, the platform evaluates the connectivity bandwidth to the device of each of these 1,000 fans and evaluates the technical capabilities each fan's device, and filters out those fans with inadequate connectivity bandwidth or with inadequate devices for streaming live video to the celebrity's device. When the celebrity is ready to interact with her fans, she or her agent tap or select an icon on their device, and a pre-screened set of 20 fans are selected that meet the "safe" criteria. The 20 users are each notified that they have been selected, and the first 5 that respond by tapping an icon on their phones are presented to the celebrity or the agent. The celebrity or the agent quickly reviews their 5 questions and selects one of the fans to talk to the celebrity. An interactive live streaming session is initiated between the celebrity and the selected fan, with all 100,000 audience members being able to see the video of the celebrity with a video of the fan embedded as a picture in a picture, side by side, etc. The fan asks his question, and the celebrity responds.

Because of the live interaction, the latency of the broadcast is important. Prior art technologies for streaming live video often have latencies of 10 or even 20 seconds. Even with a latency of only a few seconds, live interactions between a celebrity and one of her fans would not be enjoyable to watch. For example, with a latency of only 3 seconds, the fan would ask a question, 3 seconds later the celebrity would see the live streamed video of the fan asking the question and would answer the question, and an additional 3 second later (6 seconds after the fan asked the question) the fan would see the live streamed response of the celebrity to the fan's question. With such large latencies, interactions between the celebrity and the fan would not appear natural nor would be very enjoyable to watch.

The technology introduced here reduces the latency of a live streamed broadcast, which enables live streamed interactions between a celebrity and a fan, or any other parties, that are enjoyable to watch. Due to the reduced latency and the resultant minimization of time delays between celebrity/fan interactions, interactions between the celebrity and a fan appear more natural and are more enjoyable. While this example discusses an example of a celebrity live streaming to multiple fans and interacting with one or more of her fans, the technology can be applied to a variety of different scenarios and examples.

The disclosed technology solves problems exhibited by prior art technologies. In a first example, a broadcaster attempts to use HTTP live streaming (HLS) to broadcast to 100,000 users. However, due to shortcomings of HLS, such as being a chunky protocol, the latency is excessive, e.g., being approximately 15 seconds in this example with 100,000 users (with a 30 second round trip time for interactions between the broadcaster and a user). HLS breaks down a live stream into a series of individual HTTP-based file downloads, where each file is referred to as a chunk. HLS has certain inefficiencies that can contribute to excessive latency, such as a receiving computer is not able to begin processing a particular chunk until the particular chunk is successfully received, a receiving computer is not able to begin processing a particular chunk until all chunks sequentially before the particular chunk have been successfully received, etc. Issues such as these lead to increased latency. For example, when a particular IP packet that includes data of a chunk has a transmission error, the receiving computer will not process the chunk until the particular IP packet, and all the other data of the chunk, are successfully received. The receiving computer will send a message back to the sending computer notifying the sending computer of the error, and the sending computer will retransmit the errored IP packet. Inefficiencies such as these can significantly delay processing of the chunk by the receiving computer, which contributes to the excessive transmission latency. The size of a chunk can be, for example, the size of a frame of video, the size of a maximum transmission unit of an underlying protocol (e.g., 1500 bytes for the IEEE 802.3 Ethernet standard), etc.

In a second example, a broadcaster attempts to use WebRTC to broadcast to 100,000 users. However, due to shortcomings of WebRTC, such as being a peer to peer protocol, the latency is also excessive, e.g., being approximately 7 seconds in this example with 100,000 users (with a 14 second round trip time for interactions between the broadcaster and a user). WebRTC is a peer to peer protocol, which means that each broadcaster sends their video stream to every user, which can cause excessive bandwidth usage.

If a broadcaster is broadcasting from Los Angeles to 1000 users in New York, the sending device will send a stream to each of the 1000 devices, leading to the sending of 1000 individual streams from the broadcaster's device to the users' devices. Further, similar to HLS, processing of particular data sent via WebRTC cannot occur until all the particular data is successfully received, or until the data sequentially before the particular data is successfully received.

The disclosed technology improves latency of live broadcasts via a variety of techniques. In an example, a number of techniques are used to improve latency. A celebrity broadcasts from Los Angeles to 100,000 users, of which 1000 are in New York. The celebrity's sending device creates a transmission control protocol (TCP) tunnel with a server in San Jose, which in turn creates a TCP tunnel with a server in Ohio, which in turn creates TCP tunnels with each of the 1000 user devices in New York. Each TCP tunnel utilizes raw sockets to send and receive IP packets rather than utilizing an existing protocol-specific transport layer formatting, such as User Datagram Protocol (UDP) or TCP. Because the technique uses raw sockets, techniques optimized to reduce latency can be utilized.

For example, IP packets can be sent as they are received without performing any error detection or correction on the data of the IP packets (thereby avoiding having to wait for an acknowledgement (ACK) signal having to be sent between devices). IP packets can be sent as they are received, without having to reorder the packets, or even having to determine whether the IP packets are being received in order. Data of a particular IP packet can be processed as the data is received, without waiting for the entirety of the particular IP packet to be received, or without waiting for IP packets sequentially before the particular IP packet to be successfully received. Further, even though the celebrity's sending device is sending a live stream to each of the 1000 users in New York, the sending device sends only one stream to the server in San Jose, which in turn sends only one stream to the server in Ohio. Only once the stream is received by the server in Ohio is the stream replicated to create 1000 individual streams. As the Ohio server receives the live stream data, the server processes the stream, such as to down encode the stream to avoid exceeding the bandwidth available to a particular user's device (e.g., down encoding from 2 Mb/sec to 500 kb/sec). The server processes the stream without performing any error detection or correction or reordering of data of the stream, and then sends the 1000 individual streams to the devices of the 1000 users.

BRIEF DESCRIPTION OF THE DRAWINGS

One or more embodiments of the present invention are illustrated by way of example and not limitation in the figures of the accompanying drawings, in which like references indicate similar elements.

FIGS. 11B-11D show a sequence of architectural flow diagrams that illustrate an example process for selecting a participant for interaction with a host during an interactive session;

FIG. 33 shows a user interface for selecting participants for a brain storming session;

DETAILED DESCRIPTION

Figure 1:
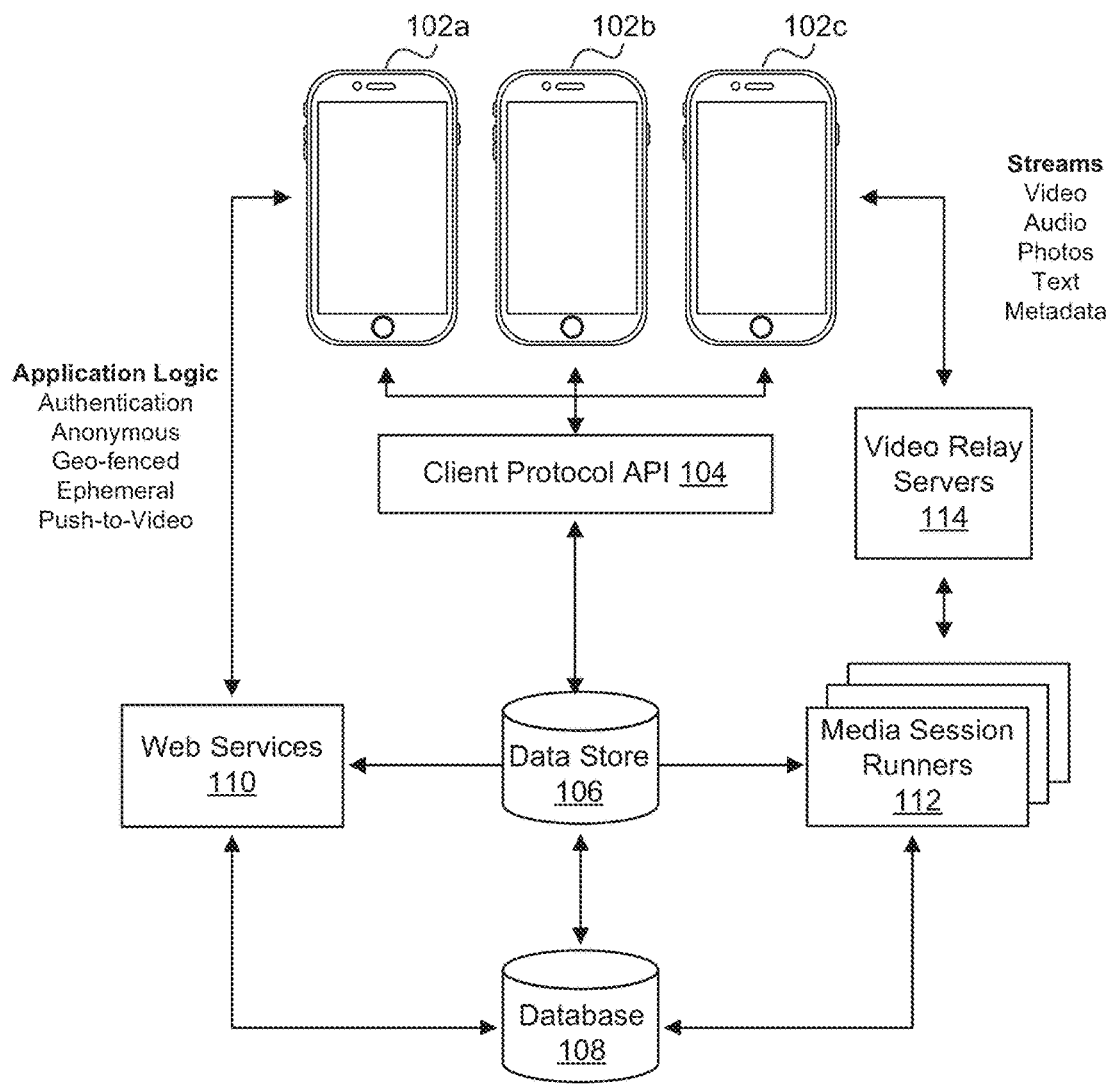
FIG. 1 is a generalized block diagram illustrating the architecture of a platform that facilitates interactions between a host user (in some cases a "celebrity") and one or more other participants (in some cases fans of the celebrity)

From the foregoing, it will be appreciated that specific embodiments of the invention have been described herein for purposes of illustration, but that various modifications may be made without deviating from the scope of the invention. Accordingly, the invention is not limited except as by the appended claims.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices. As used herein, unless specifically stated otherwise, the term "or" can encompass all possible combinations, except where infeasible. For example, if it is stated that a result can include A or B, then, unless specifically stated otherwise or infeasible, the result can include A, or B, or A and B. As a second example, if it is stated that a result can include A, B, or C, then, unless specifically stated otherwise or infeasible, the result can include A, or B, or C, or A and B, or A and C, or B and C, or A and B and C.

As used herein, terms such as "connected," "coupled," or the like, refer to any connection or coupling, either direct or indirect, between two or more elements. The coupling or connection between the elements can be physical, logical, or a combination thereof. References in this description to "an embodiment," "one embodiment," or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

As used herein, terms such as "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

Operating Environment—Example Computing Platform

FIG. 1 is a generalized block diagram illustrating the architecture of a platform 100 that facilitates interactions between a popular individual (also referred to as a "celebrity") and one or more other individuals who have an interest in the celebrity. When the celebrity initiates an interactive session, the celebrity can be referred to as a "host" or "host user." Note, in some situations, the "host" or "host user" may refer instead to another individual that represents or is otherwise associated with the celebrity such as a manager, agent, publicist, sponsor, or family member. When the other individual(s) participate in an interactive session with the celebrity, they can be referred to as "audience members," "participants," or "participant users." The interactive session represents a forum through which a celebrity can establish a paced, synchronous session with one or more participant users. For example, each participant user may interact with the celebrity via an application that is executed by a corresponding user device 102a-c. "Users" of the platform 100 include both "host users" (e.g. celebrities, managers, agents, etc.) and participant users (e.g. audience members); therefore, each of the user devices 102a-c could be associated with either a host user or a participant user.

Here, for example, three user devices 102a-c are executing the application, which implements a client protocol application programming interface (API) 104. The client protocol API 104 monitors user interactions with the application to control distribution, publication, subscription, etc., of streams (e.g., of video, audio, photos, text, and/or metadata). For example, the client protocol API 104 may process inputs received at a user interface presented on the display of the user devices 102a-c.

The client protocol API 104 serves as an interface between the user devices 102a-c and a data store 106 (e.g., an in-memory data store, such as Redis). The data store 106, which supports certain utilities (e.g., the publish and subscribe commands or "pub/sub"), could store content required for initiating the streams, information relevant to the users (e.g., registration information or usage statistics), etc. In some embodiments, the data store 106 is connected to a database 108 that is responsible for storing metadata, media content (e.g., video and audio), etc. For example, the database 108 may include an archive of previously-recorded interactive sessions that can be replayed at the user devices 102a-c through the application. Moreover, the database 108 may be an open-source cross-platform document-oriented database, such as MongoDB. In such embodiments, the database 108 could use dynamic schemas and/or JavaScript Object Notation (or JSON-like) documents.

Logic in the application executing on each user device 102a-c can control user authentication. For example, the application may be synced with one or more social media accounts (e.g., Facebook®, Twitter®, Snapchat®) of the user (e.g., celebrity or audience member) corresponding to the user device. The application may also maintain user anonymity, provide geo-fencing, and implement the ephemeral nature of the content and push-to-video mechanism. Control information and/or other user information can then be provided to a web service 110, which is a collection of protocols or stands that are used to exchange data between the application and the data store 106/database 108. More specifically, the web service 110 can effect redistribution and publication/subscription in connection with the content of the database 108 and/or data store 106. The web service 110 could be, for example, Node.js, a JavaScript-based framework.

The user(s) are able to control and/or access various streams presented on the user interfaces generated by the application. The stream(s) can include video, audio, photos, text, and/or metadata, which are provided via media session runners 112 through video relay servers 114, which can be a TCP-Live Vydeo content delivery network (CDN) video relay server, can be a User Datagram Protocol (UDP) video relay server, etc. These techniques allow stream control and access to be maintained as further described below.

The term "application" is used herein for the purposes of illustration only, and one skilled in the art will recognize that the user interfaces described herein could be accessible via one or more of a web browser, mobile application, software program, or an over-the-top (OTT) application. The user interfaces may be accessed using any appropriate network-accessible electronic device, such as a mobile phone, tablet, personal computer, game console (e.g., Sony PlayStation® or Microsoft Xbox®), music player (e.g., Apple iPod Touch®), wearable electronic device (e.g., a watch or fitness band), network-connected ("smart") device (e.g., television), virtual/augmented reality system (e.g., Oculus Rift® or Microsoft Hololens®), or some other electronic device.

The following classes of individuals could use the application to establish an interactive session with fans or followers:
  Top-class Celebrities (e.g., those with millions of followers): These celebrities are often very conscious about their brand image and may only provide answers to pre-approved questions. Said another way, these celebrities may not take live questions or may only take live questions from participants that fit a specified selection criterion. According to an embodiment, an interactive session may proceed as follows:
    The celebrity user sets a limit on the maximum number of fan questions allowed (e.g., a default value of 100) while scheduling a session;
    One or more fans record question(s) (e.g., 15 second video recordings) for the celebrity and submit the question;
    A service stores the questions on a server, which is typically only associated with that session;
    The celebrity reviews the questions before the session and selects a few of them;
    The server streams the questions, for example one by one, in the order chosen by celebrity, when the celebrity taps on a question button that is presented on the display of the celebrity's user device; and
    When the celebrity completes answering the question, the celebrity taps on the question button again for the next question.
  Politicians, YouTube Personalities, Journalists, etc.: These individuals may prefer to initiate a instance session with their followers that supports live interactions. In such embodiments, a push-to-control video floor scheme can be used as further described below.
  Note that top-class celebrities could also choose to participate in live interaction sessions, and other celebrities (e.g., politicians, YouTube personalities, journalists) could elect to participate in a session that includes pre-recorded and vetted questions.

Operating Environment—Example User Interface Features

Figure 2:
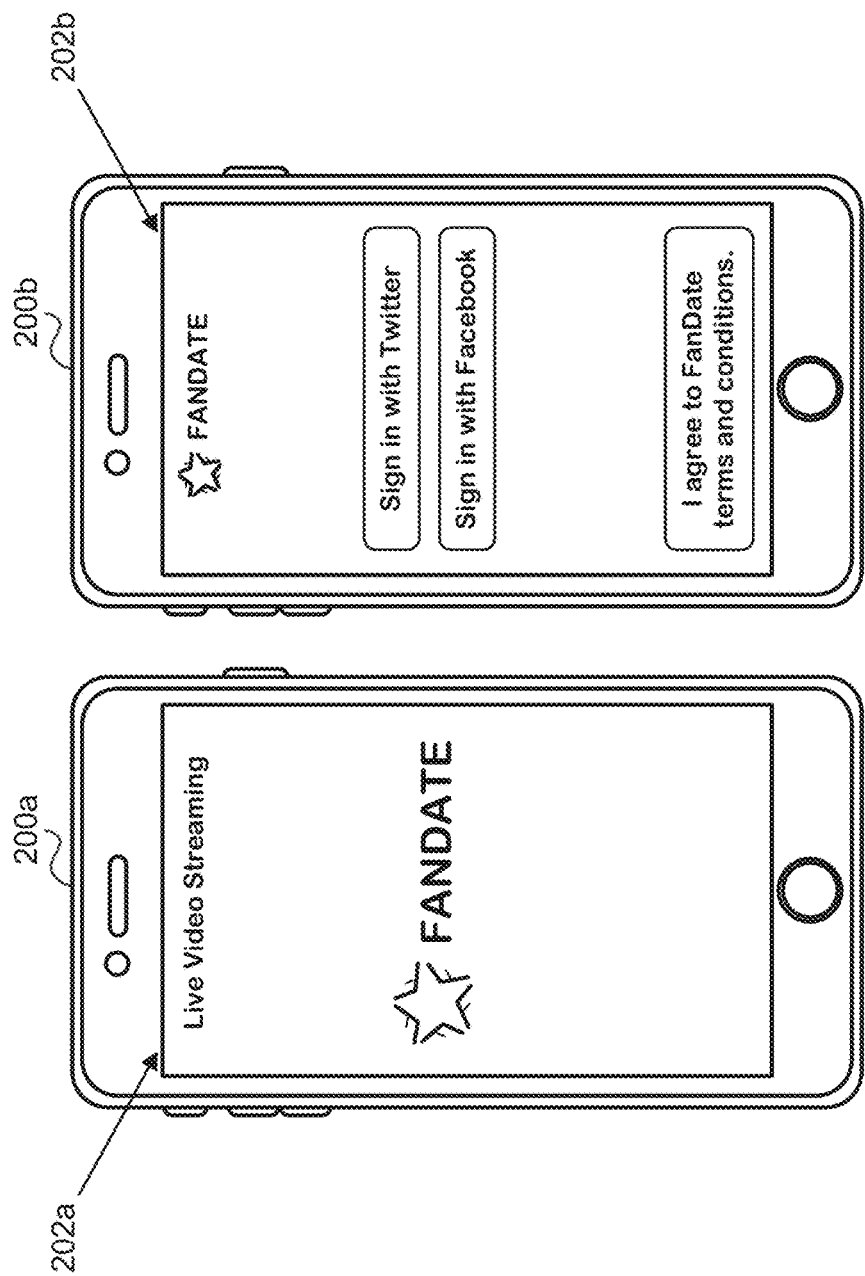
FIG. 2 includes screenshots of user interfaces that can be used to register with a service that facilitates paced, synchronous interactions between a host user and one or more other participants

FIG. 2 includes screenshots of user interfaces 202a-b that can be used to register with a service that facilitates paced, synchronous interactions between a host user (e.g. a celebrity) and one or more other participant users (e.g. audience members). The user interfaces 202a-b may be accessible to user devices 200a-b through a web browser, mobile application, software program, or an OTT application.

In some embodiments, a user registers for a service (also referred to as a FanDate service) by signing into to a social media account (e.g., Facebook, Twitter, Snapchat). The term "user" can refer to any individual (e.g., a celebrity or a prospective audience member) who accesses the application. Such an action may link the user's account with the service to a particular social media account. Consequently, the user may not need to complete a tedious registration process in order to initiate the application and participate in interactive sessions. Instead, user information could be pulled from the social media account. For example, the underlying platform 100 could extract the user's name, location, a count of the user's fans or followers, other social media presences associated with the user, etc.

In other embodiments, the service may require the user to manually complete a registration form or simply confirm that information extracted from a social media account is indeed correct. For example, the user may elect to associate an account with a particular social media account, and then the service may request additional information.

Figure 3A:
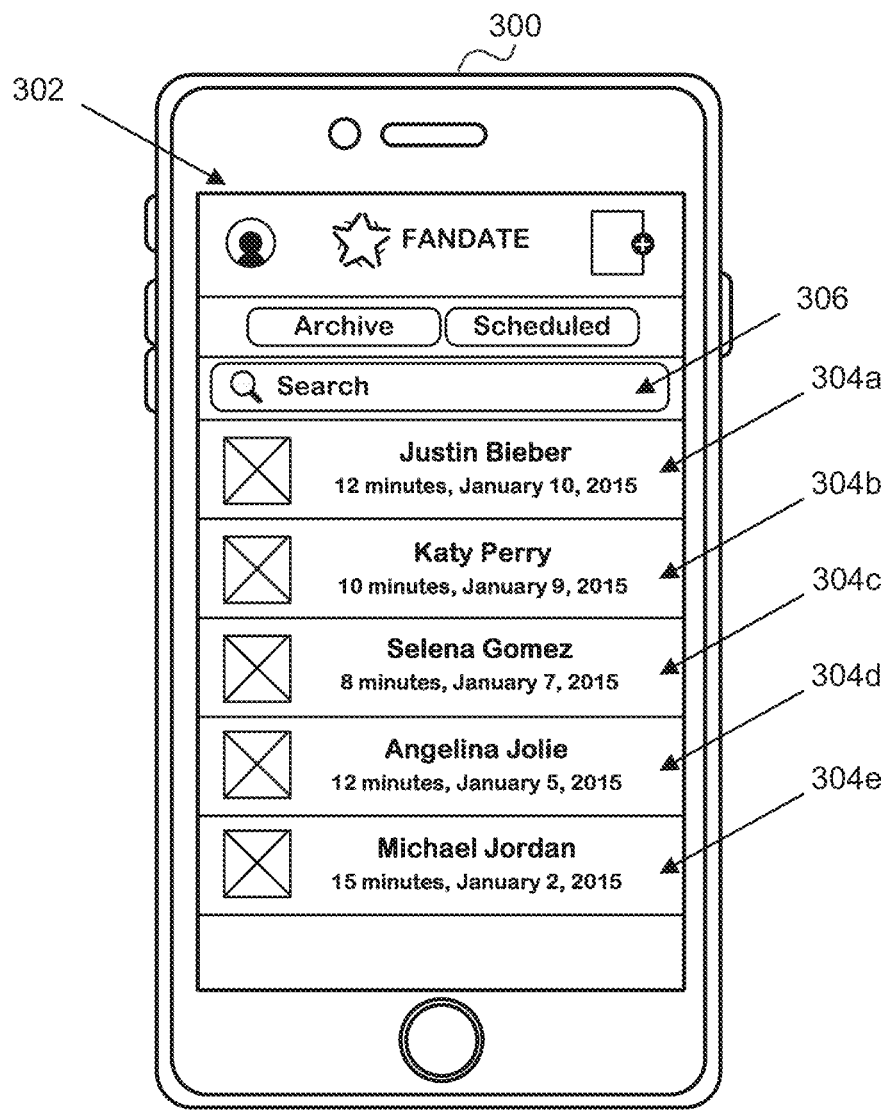
FIG. 3A shows an example user interface that includes a list of pending and/or in progress interactive sessions.

FIG. 3A shows an example user interface 302 that includes a list of pending and/or in progress sessions 304a-e to be facilitated by the platform 100. Each of the sessions is a paced, synchronous interaction between a host user such as a celebrity (here, Justin Bieber, Katy Perry, etc.) and one or more participant users (i.e. audience members). Each participant user interacts with the host user via a user interface that is presented on the display of a corresponding user device 300 (e.g., a mobile phone, tablet, or personal computer).

The list of sessions may be searchable by various criteria. For example, a prospective participant user may be able to search for the name of a particular celebrity or a keyword (e.g., "sports," "music") that is associated with individual sessions by entering these terms within a search bar 306. The participant user could also filter the sessions by recording date, session duration, etc. In some embodiments, participant users are able to browse archived sessions and/or scheduled sessions.

Figure 3B:
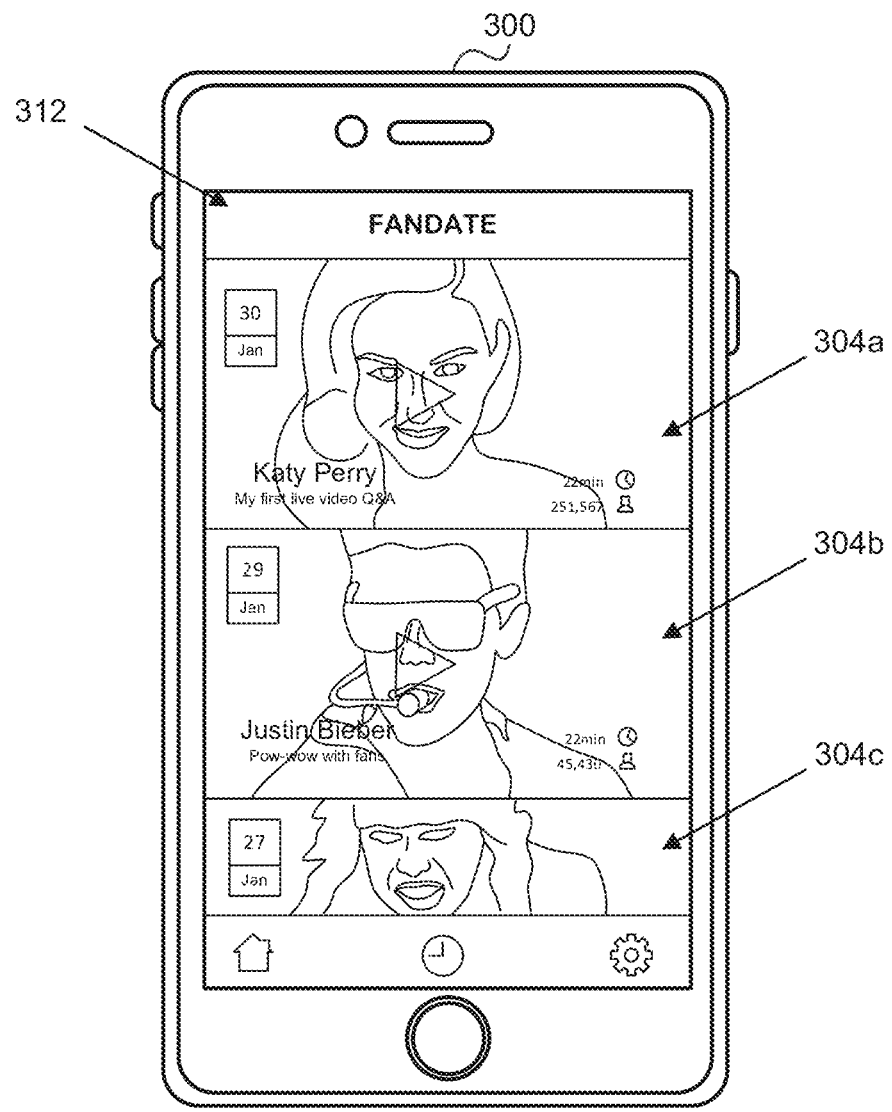
FIG. 3B shows an example user interface that includes multiple pending and/or in progress interactive sessions displayed as multiple graphical elements.

FIG. 3B shows an example user interface 312 that is similar to interface 302 except that the included list of pending and/or in progress sessions are displayed as multiple graphical elements 304a-c. As with interface 302 shown in FIG. 3A, each of the sessions by the platform 100. Each of the sessions is a paced, synchronous interaction between a host user such as a celebrity (here, Justin Bieber, Katy Perry, etc.) and one or more participant users. Each of the graphical elements 304a-c can include an image and/or video of the celebrity hosting the interactive session, information regarding the session (e.g. scheduled start, number of participants, title, category of discussion, etc.). A prospective participant user can select to join one of the interactive sessions by, for example, interacting with (e.g. touching) one of the corresponding graphical element 304a-c.

Figure 3C:
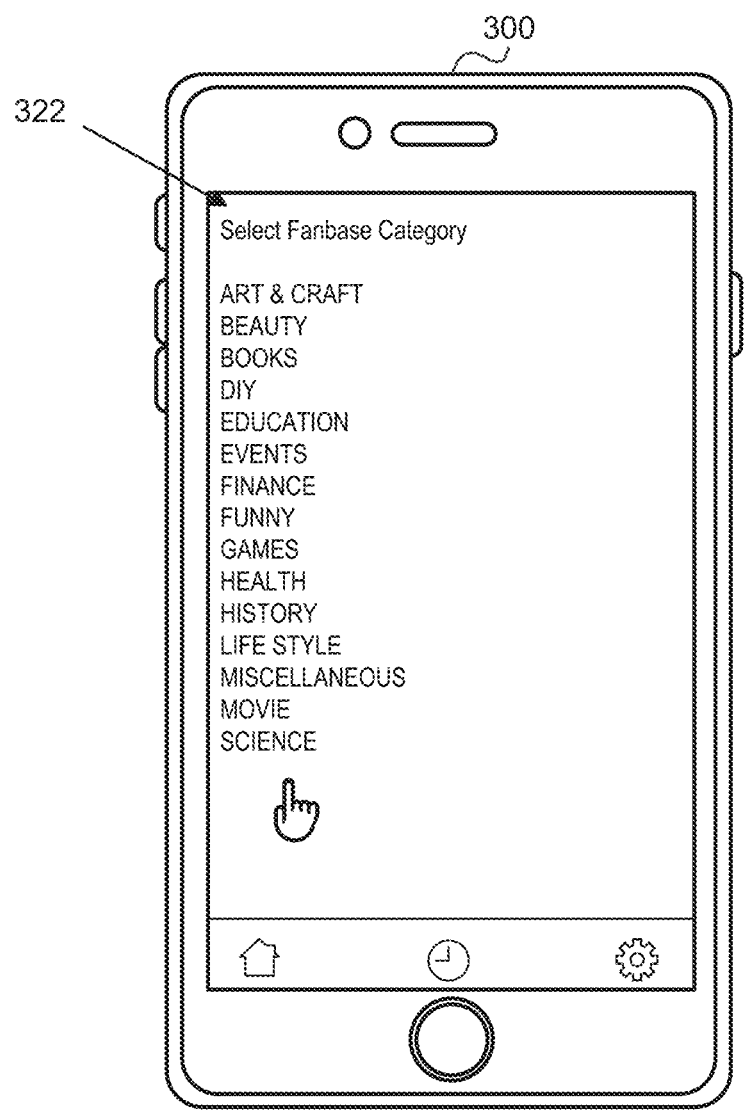
FIG. 3C shows an example user interface including a list of categories of pending and/or in progress interactive sessions.

FIG. 3C shows an example user interface 322 showing a list of categories of pending and/or in progress sessions to be facilitated by the platform 100. In an embodiment, a participant user can select one or more of the available categories (e.g. art & craft, beauty, books, etc.). In response to a user selection, a participant user may be presented with an interface (e.g. interface 302 of FIG. 3A or interface 312 of FIG. 3B) including a list of pending and/or in progress sessions that fit the selected category. For example, in an embodiment, the user-selectable categories pertain to a topic of discussion set up for the various pending and/or in progress sessions.

Figure 3D:
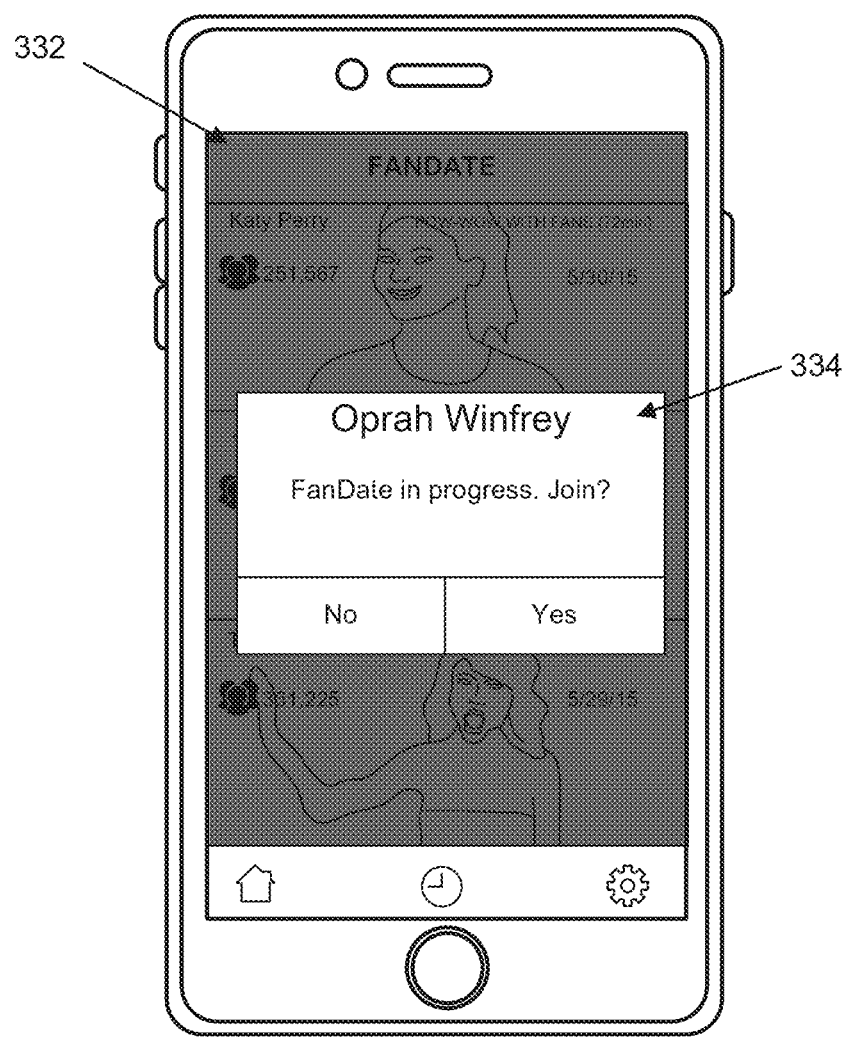
FIG. 3D shows an example user interface for joining an interactive session already in progress.

FIG. 3D shows an example user interface 332 showing interactive graphical element 334 prompting a user to join an interactive session hosted by a celebrity (e.g. Oprah Winfrey) that is already in progress. For example, a user may select a particular session (e.g. via interface 302 of FIG. 3A or interface 312 of FIG. 3B). If the user selected session is currently in progress, the user may be presented with graphical interface 334 prompting the user to join the session already in progress. In response to selecting yes, the user may be placed into the session already in progress as an audience member.

Figure 4A:
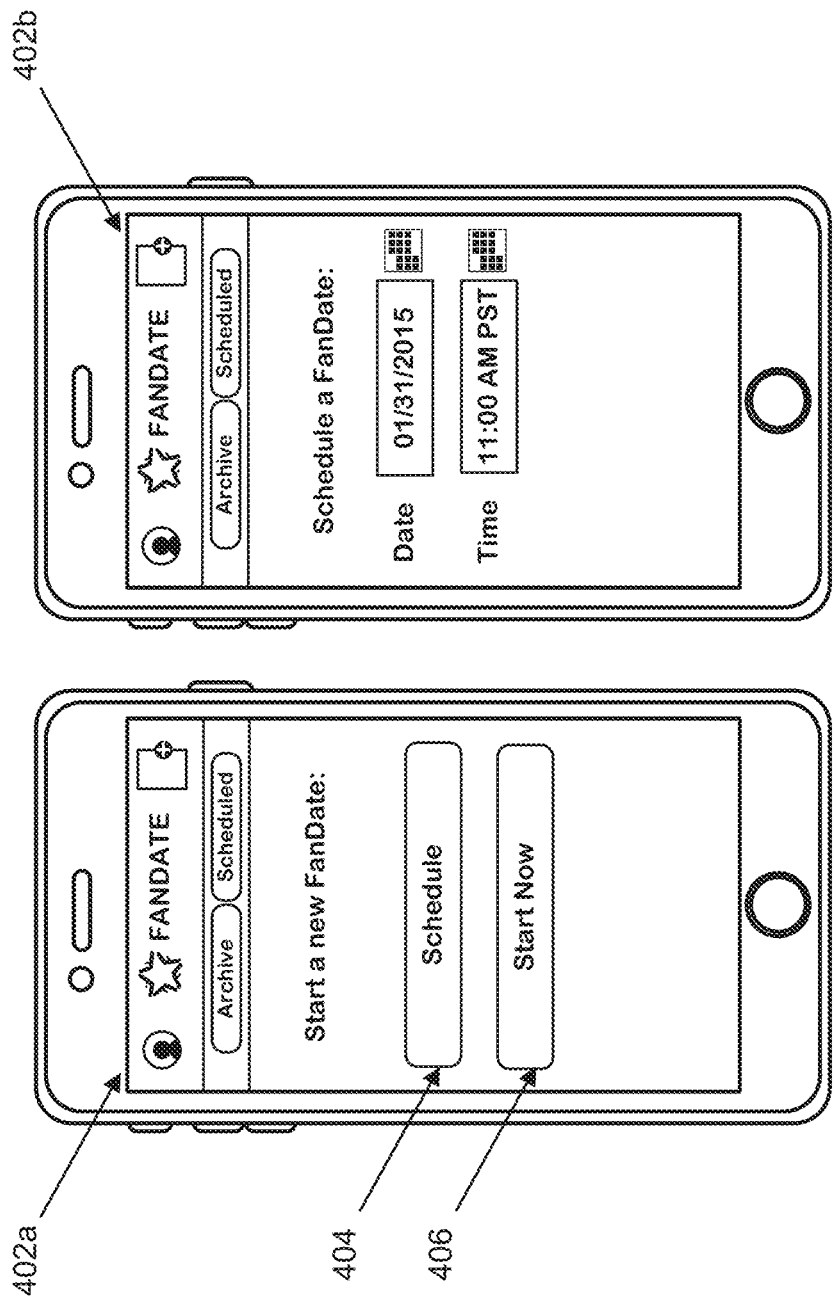
FIG. 4A shows example user interfaces for creating an interactive session.

FIG. 4A shows example user interfaces 402a-b that can be used by a host user (e.g. a celebrity) to create an interactive session. For example, a host user may be able to schedule a session for a later time by selecting a schedule button 404 and then specifying a date and/or time. A scheduled session can then be added to the host user's calendar and/or the calendar of some other individual (e.g., a secretary or manager) associated with the user. In some embodiments, a host user must be a celebrity or represent a celebrity to qualify to initiate an interactive session. The qualification of a host user to initiate an interactive session may be based at least in part on a level of notoriety of the user. For example, the platform 100 may require that the user have minimum number (e.g. 100,000 or 1,000,000) of followers or fans on a social media platform (e.g., Twitter followers or Facebook fans) to qualify as a celebrity and be granted permission to initiate an interactive session.

Figure 5:
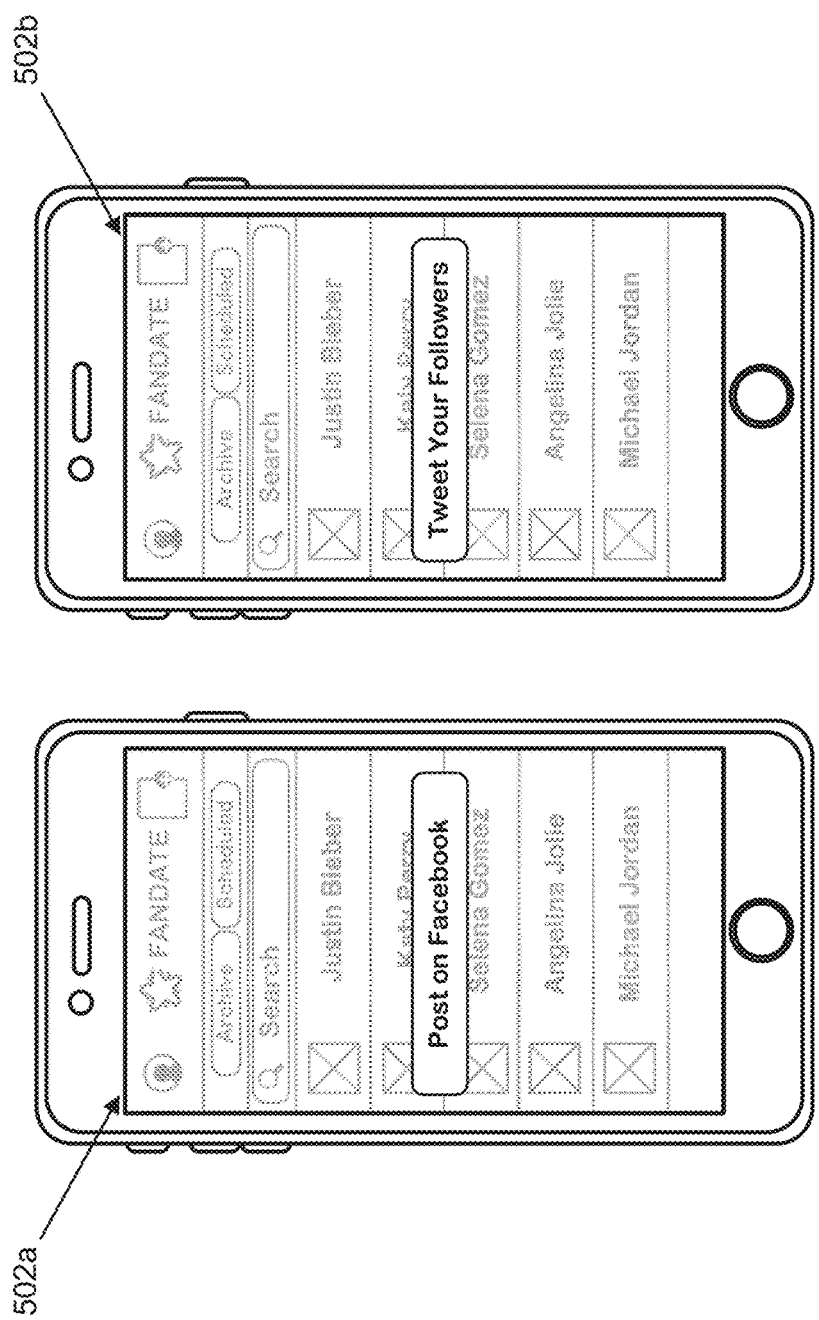
FIG. 5 shows example user interfaces through for logging into other social media accounts.

In order to establish a given user's qualification as a celebrity, that user may link his or her platform 100 account with their corresponding accounts at one or more other social media platforms (e.g. Twitter, Facebook, et.). FIG. 2, for example, includes screenshots of a user interface 202b through which a user can sign into their platform 100 account using login information for another social media account (e.g. Twitter, Facebook, etc.). In response to login into the platform 100 account (e.g. via interfaces 202a-b) with login info from a third-party social media platform, the platform 100 account may be linked with the account with the third-party social media platform, thereby providing access to certain information regarding the user (e.g. number of followers/fans) managed at the social media platform. Alternatively or in addition, a user already logged into their platform 100 account may directly log into another social media account directly from the user interface. For example, FIG. 5 shows interfaces 502a-b through which a user can log into other social media accounts (e.g. Twitter, Facebook, etc.) from within an interface of the platform 100.

In some embodiments, scheduled sessions are activated before the scheduled session start time. For example, sessions could be activated 10 or 15 minutes before the scheduled start time. Once a session has been activated, audience members may be permitted to interact with (e.g., tap or click) a link and access the session through the application.

The host user can also elect to commence an interactive session immediately by selecting a start now button 406. The host user may answer questions as they are submitted by one or more participant users (i.e. audience members), answer a predetermined set of questions, or simply record media content without any audience participation (e.g., a statement or performance). The celebrity may also be able to specify whether an interactive session is recorded and presented in real time or whether the interactive session is recorded and stored by the platform 100 for subsequent viewing.

Figure 4B:
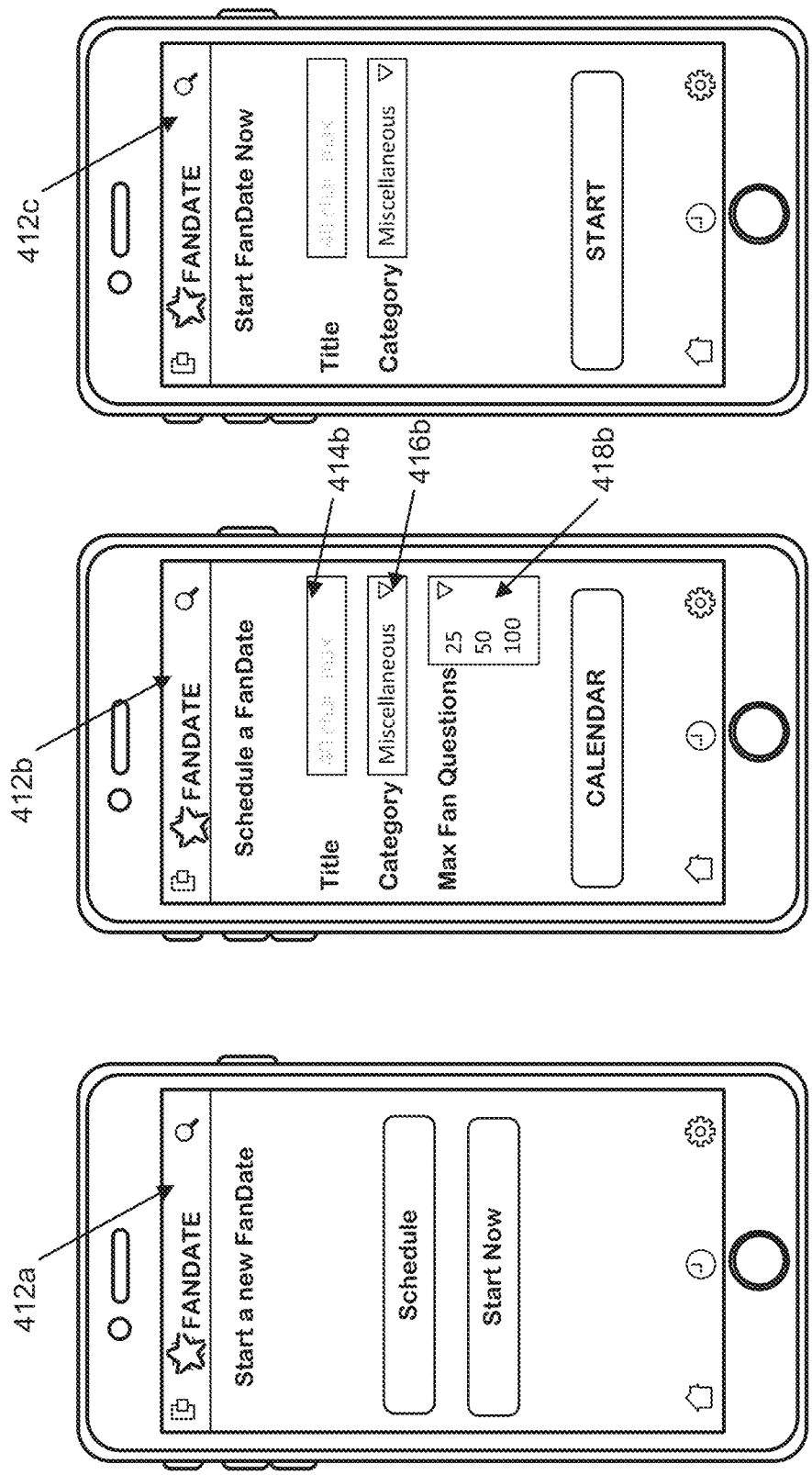
FIG. 4B shows example user interfaces for creating an interactive session that include user-selectable options for the interactive session.

FIG. 4B shows example user interfaces 412a-c for creating an interactive session that include user-selectable options for the interactive session. As shown in FIG. 4B, interfaces 412a-c can include user-selectable options (e.g. in the form of text fields, pull down menus, etc.) through which a host user (e.g. a celebrity) can select options for the interactive session. For example, interface 412b includes a text field 414b in which a host user can enter a title for the interactive session, a pull down menu 416b through which a host user can select from different pre-defined categories under which to list the interactive session, and a pull down menu 418b through which a host user can set a maximum number of fan questions to take during the interactive session. The example options 414b, 416b, and 418b in interface 412b are provided for illustrative purposes and should not be construed as limiting. For example, as will be described, a host user may enter participant selection criteria through similar interfaces to facilitate selecting users from which to take questions or comments during the interactive session.

Figure 4C:
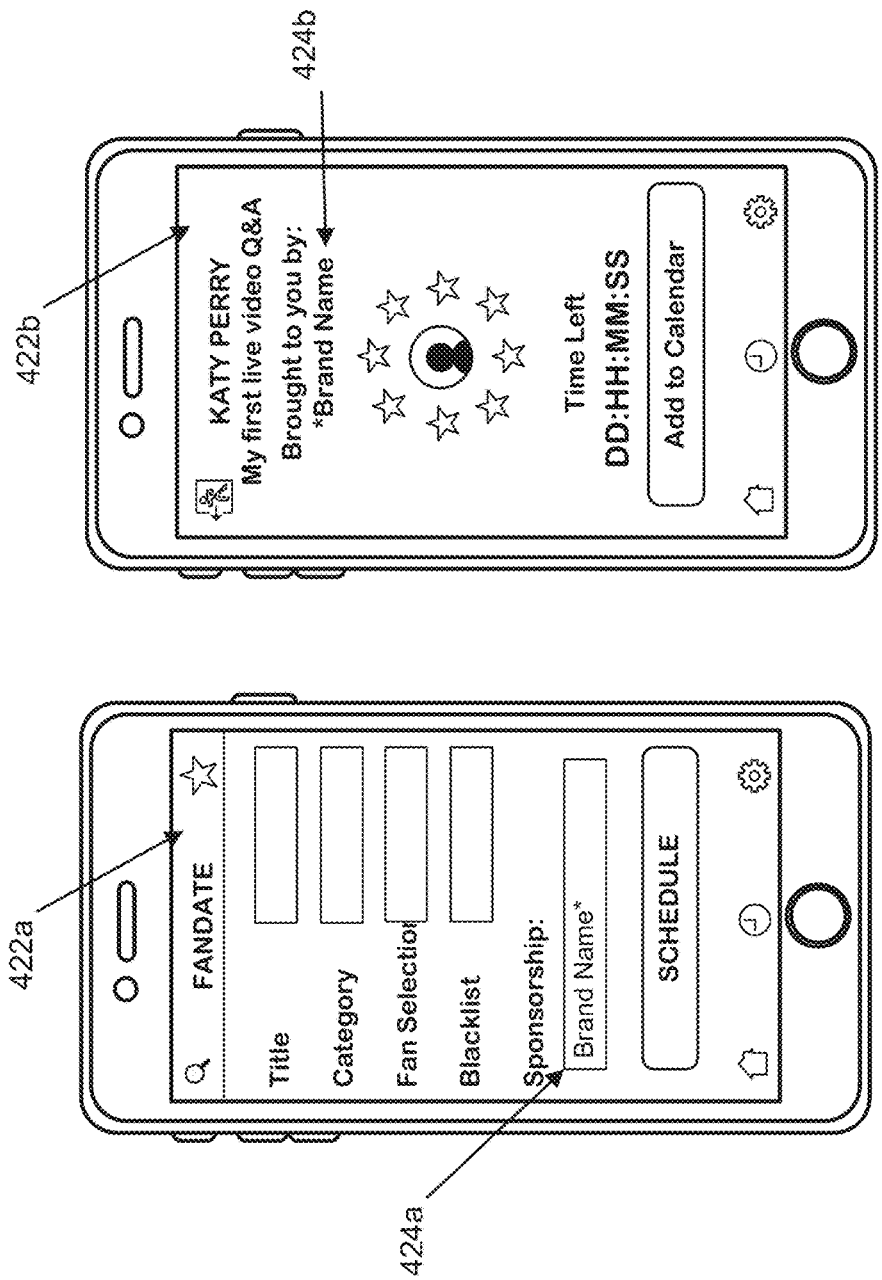
FIG. 4C shows example user interfaces for setting up sponsorship for an interactive session.

FIG. 4C shows example user interfaces 422a-c for setting up sponsorship for an interactive session. Similar to the user-selectable options 414b, 416b, and 418b in interface 412b of FIG. 4B, interface 422a can include a user-selectable option 424a for setting up sponsorship of an interactive session. For illustrative purposes, option 424a is shown in interface 422a as a text field for through which a user can enter a brand name. However in other embodiments, option 424a may include other input mechanism such as a list of pre-defined sponsors from which a user can select (e.g. via a drop down menu), an option to upload media (e.g. an image or video associated with the sponsor, an option to link to a social media account associated with the sponsor, etc. After the host user (e.g. a celebrity) has set up the interactive session with a sponsor via interface 422a, interface 422b may display information about the scheduled or in-progress interactive session that includes sponsorship information 424b. Again, for illustrative purposes, sponsorship information 424b is shown in interface 422b as text string reading "Brought to you by: *Brand Name," however in other embodiments, sponsorship information 424 may include images, video, links, interactive elements, etc.

FIG. 5 shows example user interfaces 502a-b that illustrate how a host user (e.g. a celebrity) may readily log into a social media account directly from the user interface. When the host user has linked an account with one or more social media accounts, any interactive sessions that are scheduled by the host user may be announced across the corresponding social media channel(s). For example, an announcement of an upcoming interactive session may be automatically announced to the followers/fans of a celebrity via the celebrity's Facebook account, Twitter account, etc.

Figure 6:
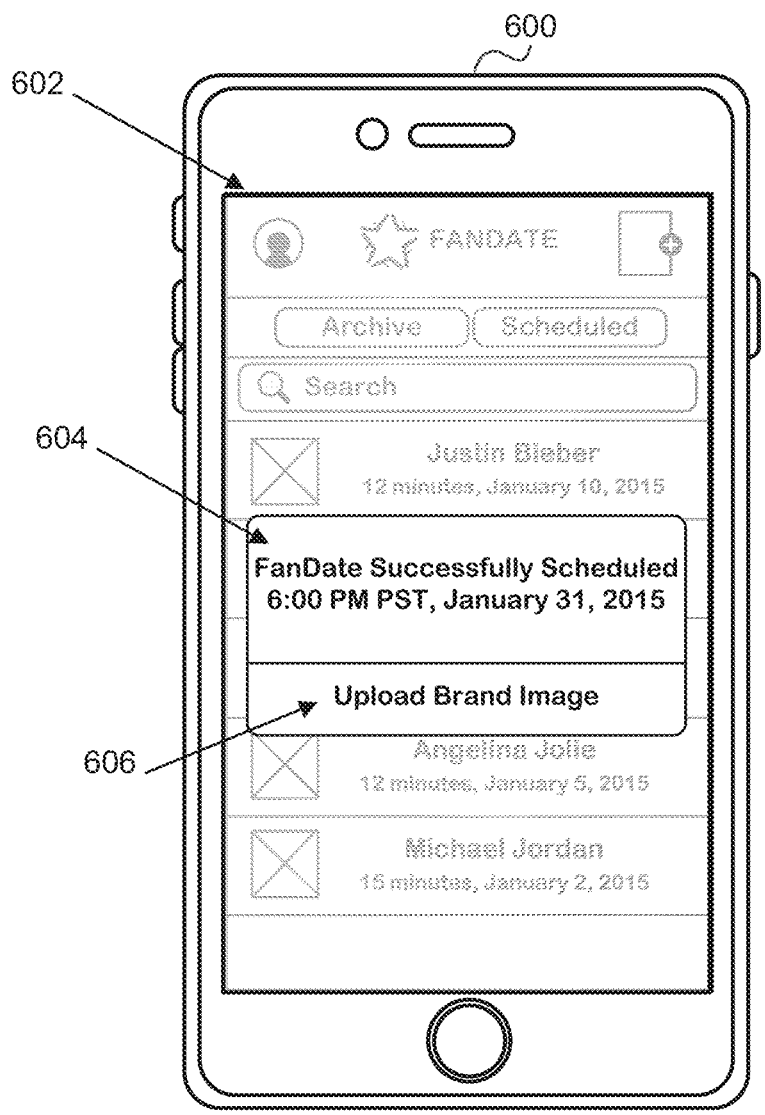
FIG. 6 shows an example user interface for announcing that an interactive session has been successfully scheduled.

FIG. 6 shows an example user interface 602 that includes a notification 604 announcing an interactive session has been successfully scheduled. In some embodiments, the a host user (e.g. a celebrity or someone associated with the celebrity, such as a manager, publicist, or family member) can upload a brand image, marketing information, etc., via an interface element 606 included in the notification. The host user may also be able to announce the interactive session by pushing the notification out through one or more social media channels. For example, the host user may choose to announce the interactive session to the celebrity's Facebook fans, Twitter followers, etc.

In some embodiments, the notification automatically disappears after a predetermined interval of time has elapsed (e.g., five seconds) or if the user taps on the display of the user device 600 on which the notification is presented. In other embodiments, the application requires the host user confirm the interactive session by interacting with a particular element of the user interface (e.g., a confirmation button).

FIGS. 7A-E include screenshots of example user interfaces that depict various stages of an interactive session between a host user (e.g. a celebrity) and one or more participant users. A session initially begins with a start screen 702. During the broadcasting interval, the host user may be able to stop video and/or mute audio at any time. In some embodiments, the host user is also able to take questions from audience members (i.e., "open the floor" to an audience member) by tapping on a Q&A button 704.

Figure 7A:
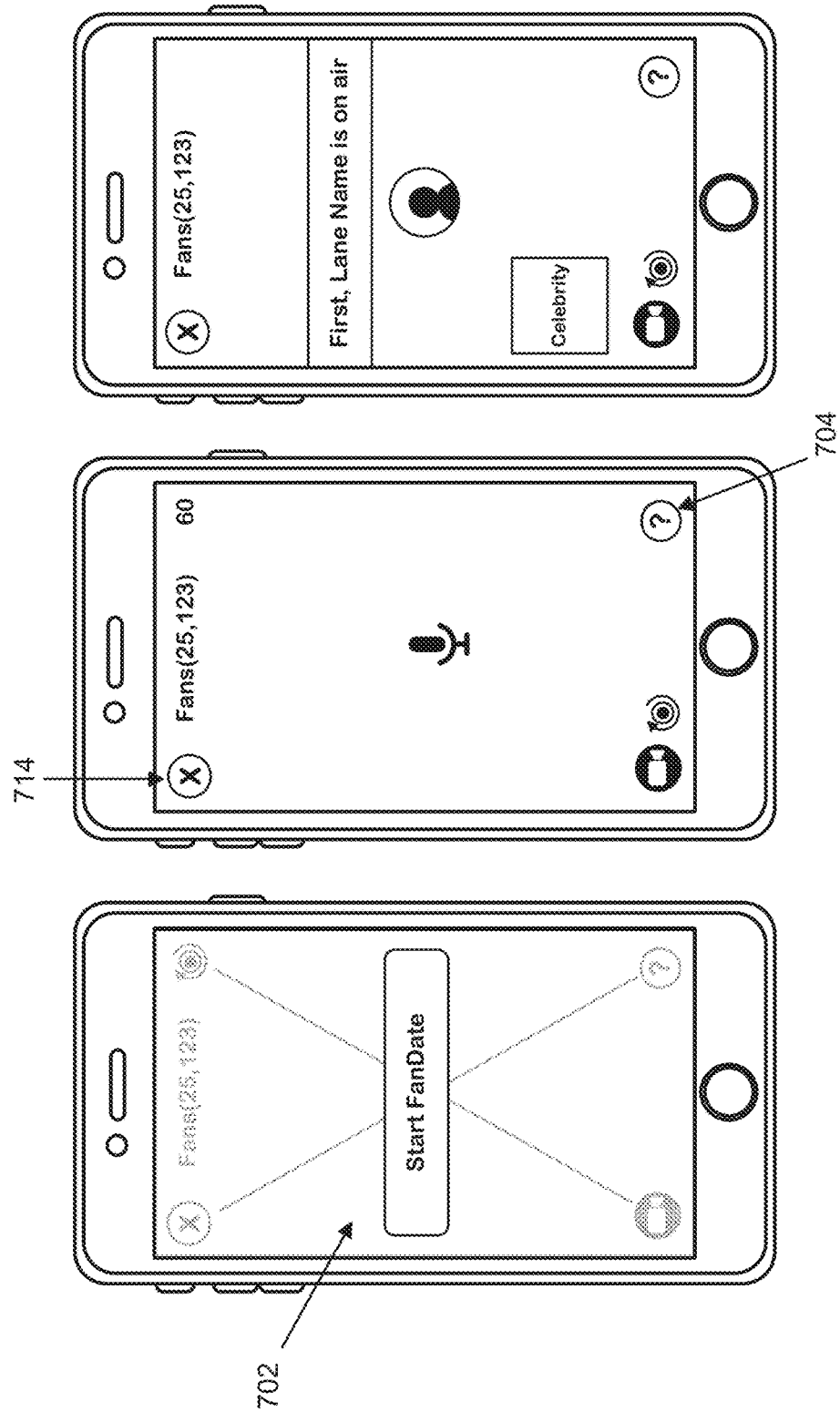
FIGS. 7A-7E show example user interfaces that depict various stages of an interactive session.
Figure 7B:
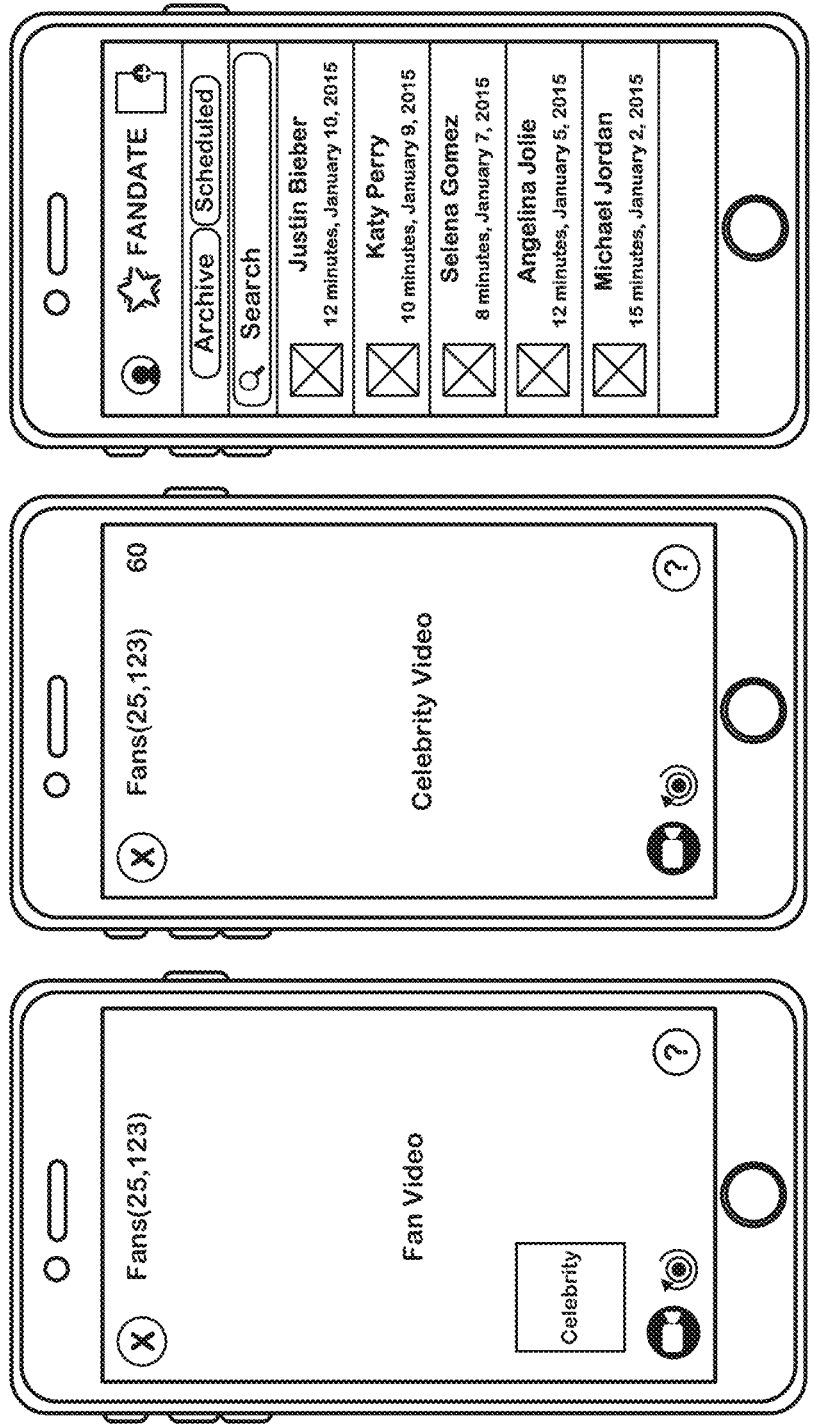
Figure 7C:
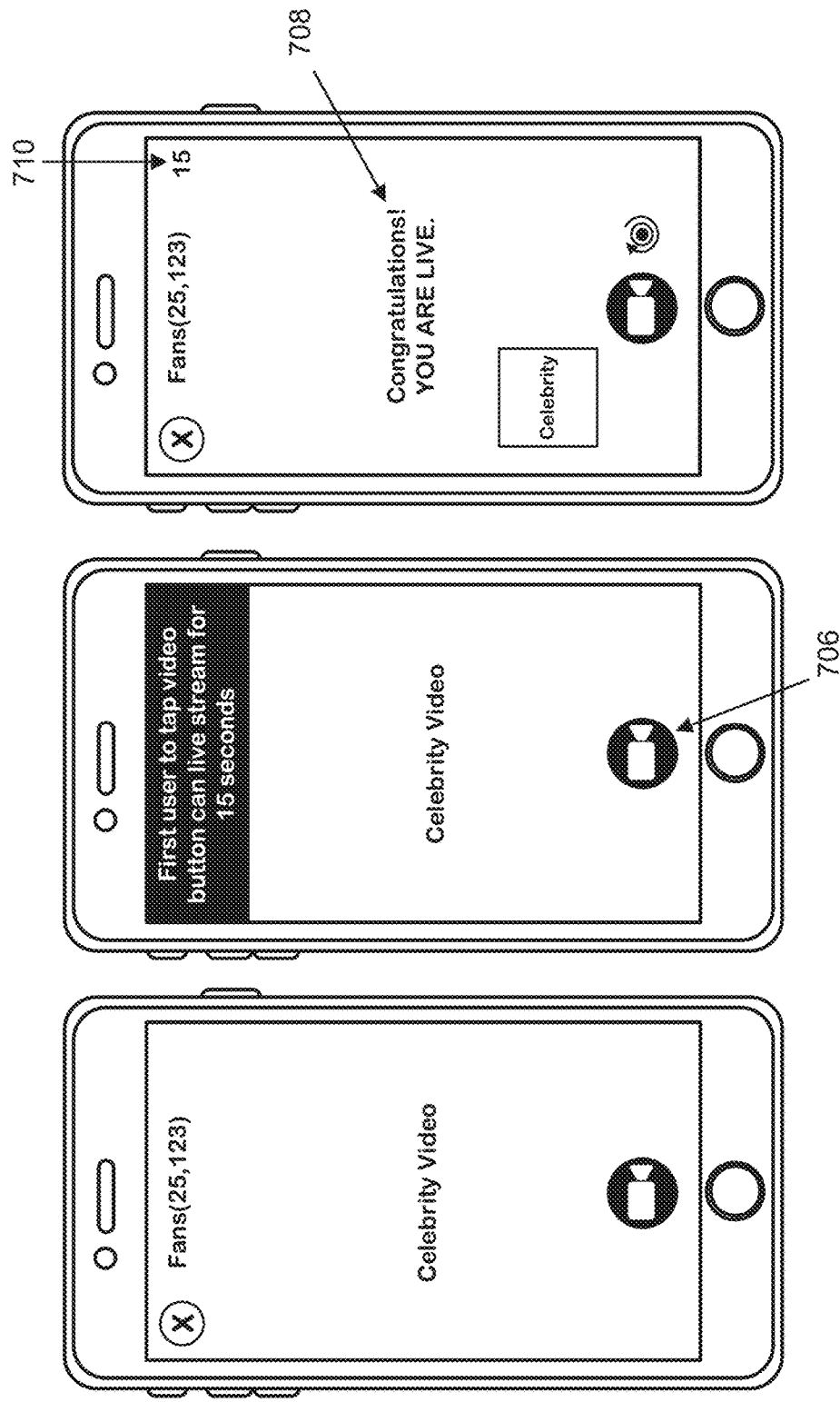

As shown in FIG. 7C, a video button 706 can be displayed to some or all of the participant users that allows those users to transmit a media stream during the interactive session. For example, the video button 706 may be presented to a predetermined number of participant users (e.g., the first ten to enter the session) or a subset of the participant users who satisfy certain selection criterion (e.g., have an uplink speed of at least 500 Kbps or a certain number of social media fans).

Figure 7D:
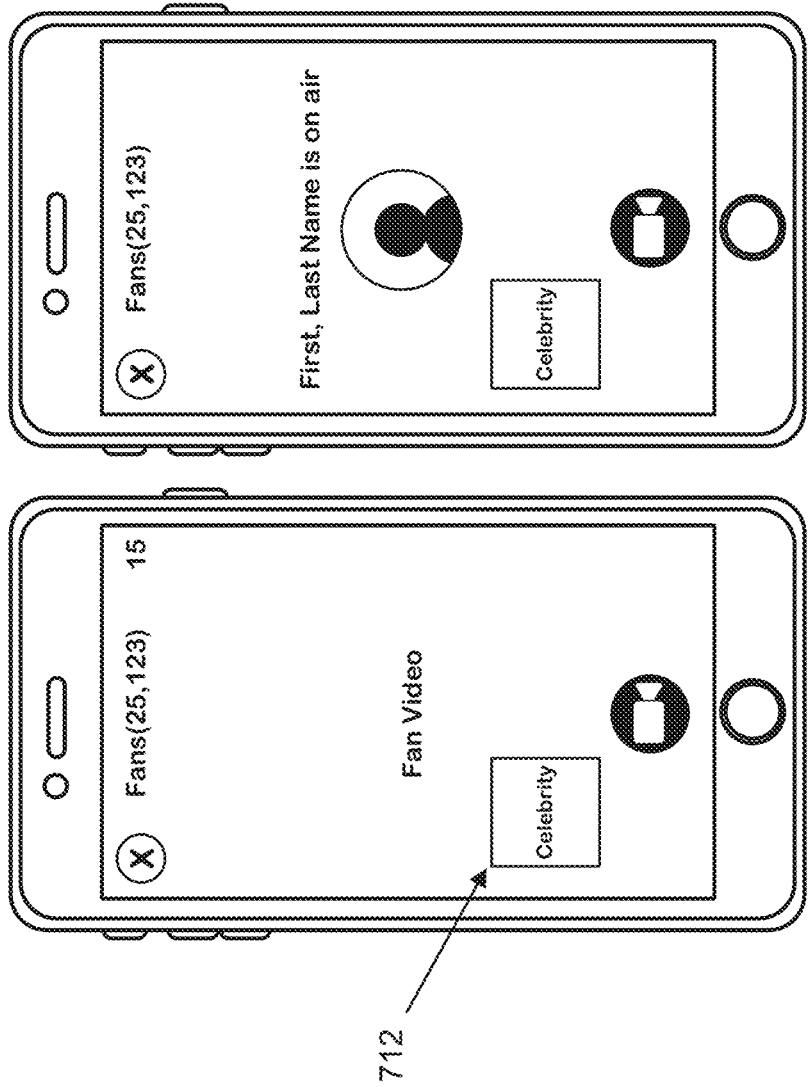
Figure 7E:
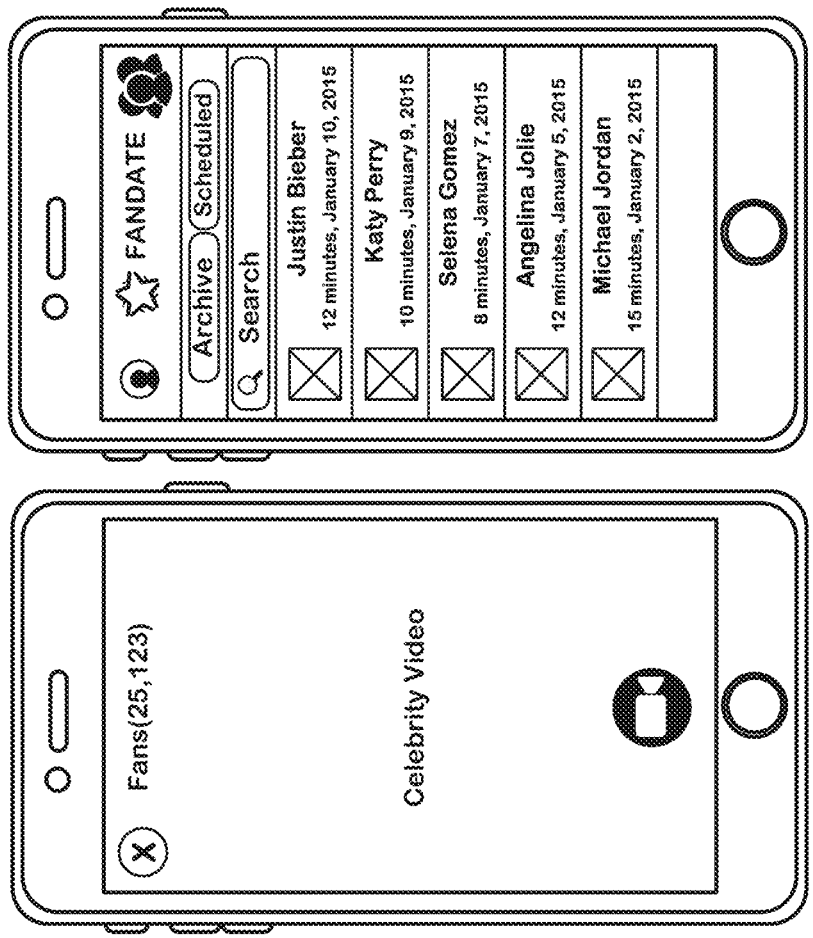

This may be necessary to provide a high quality user experience, as well as keep mischief mongers with fake social media accounts from asking inappropriate questions. The first participant user to tap on the video button 706 could be announced to all other participant users in the session by displaying the selected user's profile picture and name for a few seconds (as shown by FIG. 7D) or by audibly announcing the selected participant user's name. In some embodiments, the host user and/or an administrator associated with the service who is responsible for managing the application are able to terminate the participant user's media stream at any time.

As shown in FIG. 7C, a selected particular participant user may be able to stream media to the host user and the other participant users. After tapping the video button 706, a notification 708 can be presented that indicates the particular participant user's video/audio feed is now live. The session could can also stream the media content and display a countdown 710 (e.g., downward from 15 seconds) that advises the selected particular participant user of the floor time remaining.

After the particular participant user's broadcast times out or is terminated (e.g., by the participant user, host user, or an administrator user), the floor button 712 is activated and the host user's media stream is once again displayed. For example, the celebrity video may be automatically brought back to full screen on each participant's display when no participant users are uttering questions (i.e., when the host user "has the floor"). The host user can then continue the session by tapping on the Q&A button 704 or end the session by tapping on the close button 714.

As shown by in FIGS. 7C-D, an individual participant user's perspective generally consists mainly of the host user's media stream unless another participant user is streaming media to the session (e.g. asking a question, submitting a comment, etc.). In some embodiments, those participant users who are eligible to ask questions (and thus record themselves in real time) are visually notified on the display (e.g., by a blinking video button that appears on the display).

When an particular participant user is selected (e.g., by being the first to push the video button), the particular participant user will have the floor for a predetermined amount of time. The amount of time may be based on the expected length of the session, the length of the question submitted, or could simply be a specified amount (e.g., 10 or 15 seconds). After the amount of time expires, the media stream is ended and the user interface may automatically revert to a different layout. In some embodiments, the selected participant user, host user, and/or an administrator may be able to prematurely terminate the media stream.

A splash screen can also be displayed to selected participant user that indicates the participant user is able to ask a question. Moreover, when a particular participant user has the floor, that participant user may be granted video and/or audio control. For example, the participant user may be able to stream a live video feed or record an utterance without streaming video. The host user's media stream will typically continue to be streamed (e.g., within another window shown by the user interface). Consequently, other participant user's may simultaneously hear and/or see the particular participant user asking a question as well as the host user. Said another way, the media streams during a an interactive session may be full duplex.

Figure 8:
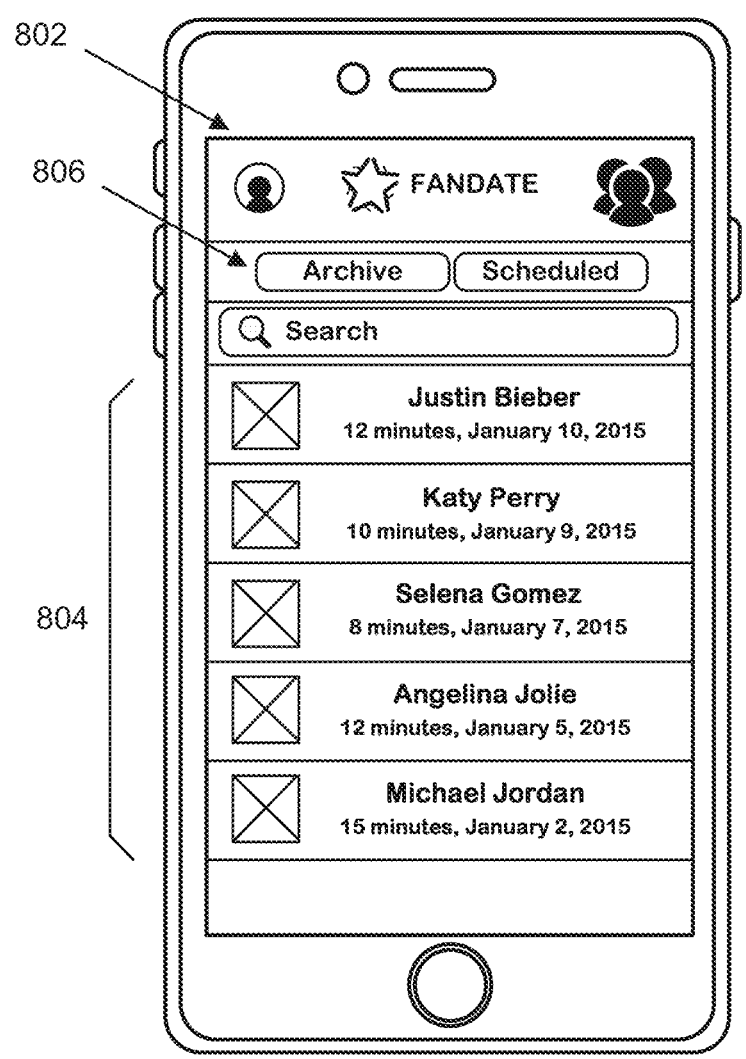
FIG. 8 shows an example user interface including an archive of past interactive sessions.

FIG. 8 shows an example user interface 802 showing an archive of interactive sessions 804. The interactive sessions 804 could include sessions in which questions were asked by participant users in real time, sessions in which pre-screened questions were read by a host user, or sessions in which pre-recorded questions were streamed. Sessions in the archive may be replayed by through the application as desired.

The interactive sessions can also be raw (i.e., unedited) recordings or processed (i.e., edited) recordings in which inappropriate questions, gaps of silence, etc., have been removed. Other media content (e.g., digital images and audio files, such as music or sound effects) could also be added to processed recordings that are stored in the archive. As shown in FIG. 8, the archive may be readily accessible by tapping on an archive button 806 that is presented on some or all of the user interfaces within the application.

Figure 9:
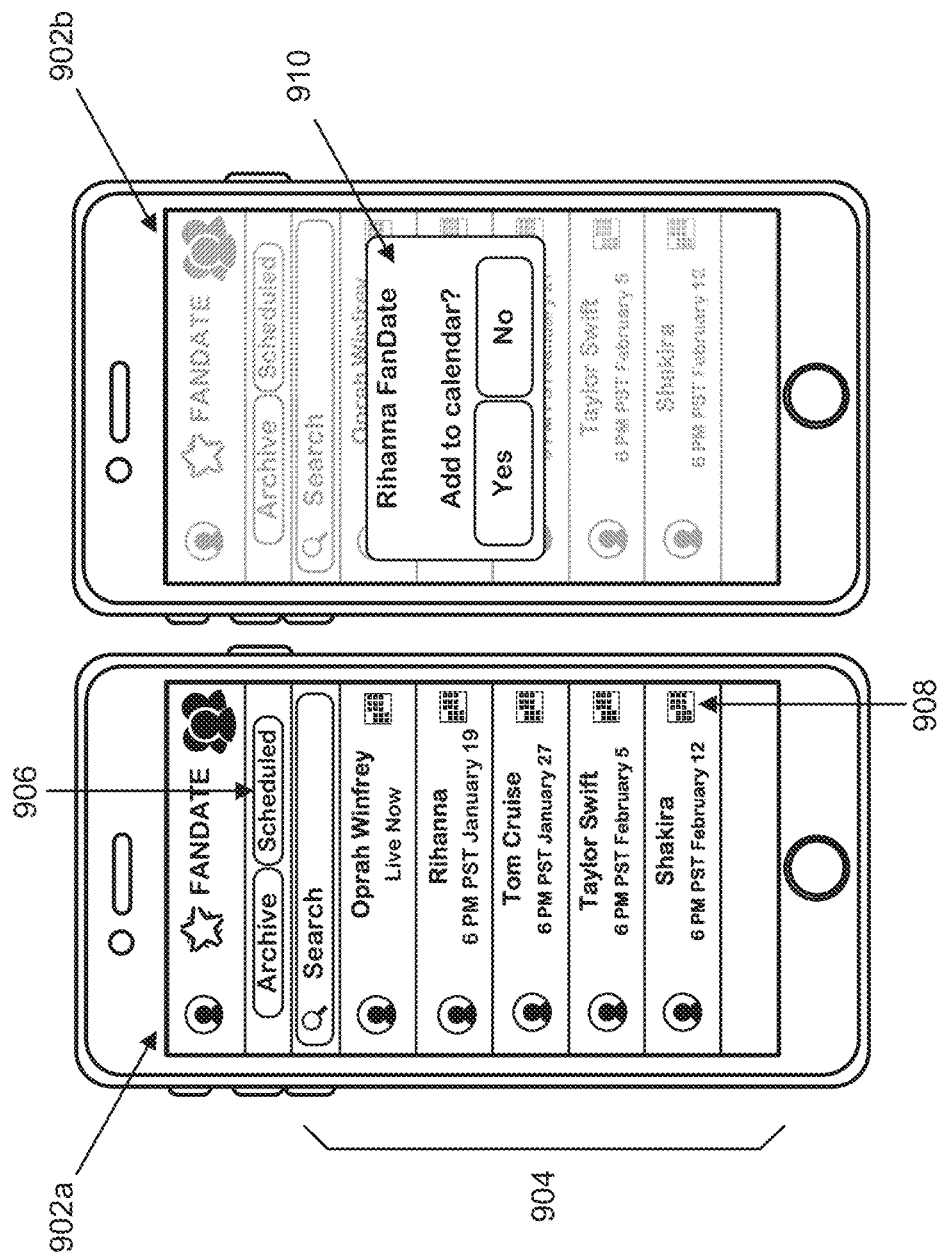
FIG. 9 shows example user interfaces for adding add scheduled interactive sessions to an calendar.

FIG. 9 shows example user interfaces 902*a-b* that can be used to easily add scheduled sessions to an audience member's calendar. More specifically, a list of scheduled sessions 904 can be shown to the audience member upon selection of a scheduled button 906. The scheduled button 806 may be presented on some or all of the user interfaces accessible through the application.

A calendar icon 908 may be displayed for each session that allows audience members to easily add the scheduled sessions to a calendar program or application (e.g., Google Calendar, Microsoft Outlook, Apple iCloud Calendar). In some embodiments, a notification 910 may be presented upon selection of the calendar icon 908 that prompts a user to confirm whether the scheduled session should be added to a calendar. The notification 810 may also allow the user to select which calendar program or application should be used, send information about the scheduled session to another potential audience member (e.g., via text message, email, or social media), etc.

Figure 10:
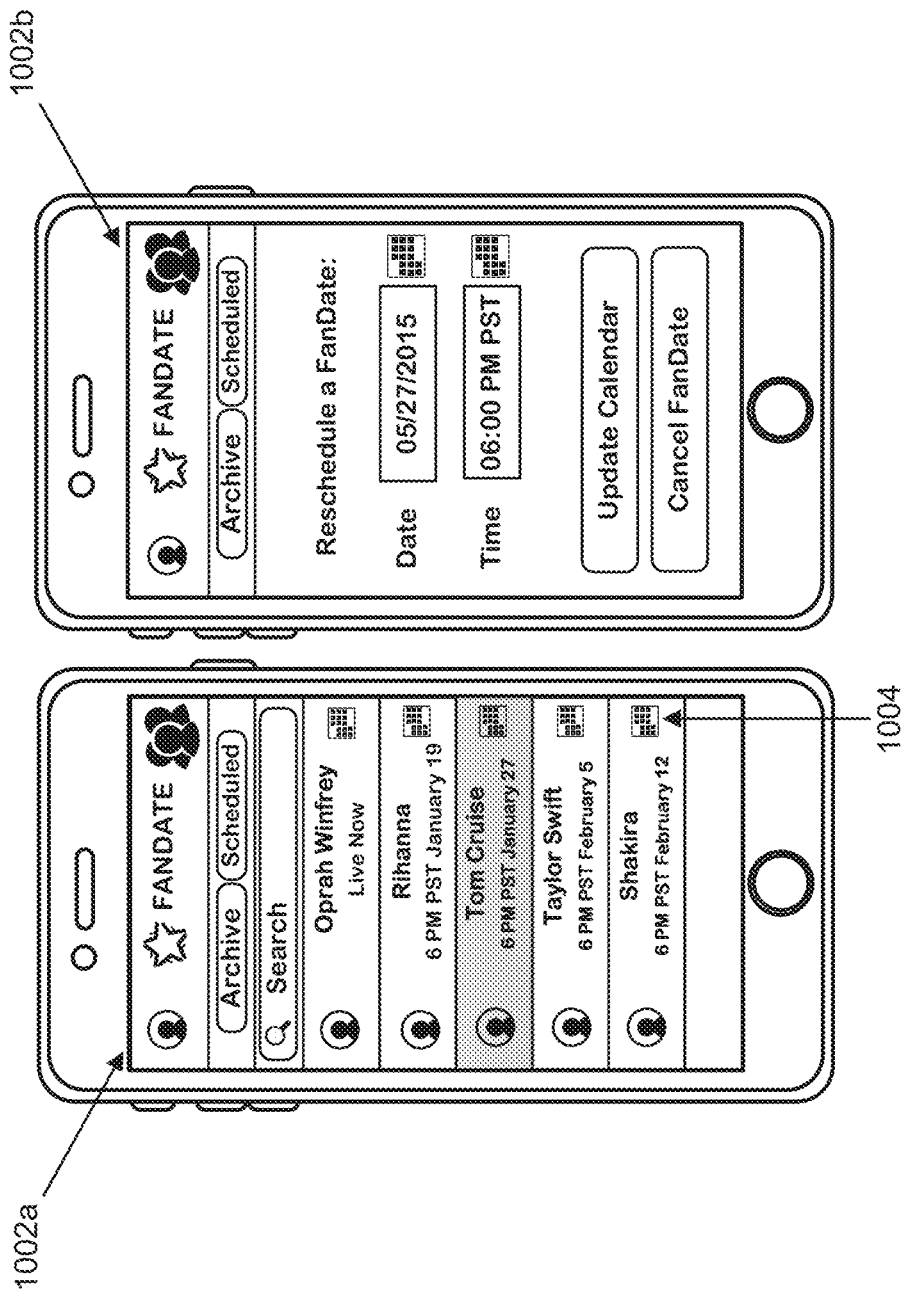
FIG. 10 shows example user interfaces for rescheduling an interactive session.

FIG. 10 shows example user interfaces 1002*a-b* that can be used to reschedule an interactive session through the application. More specifically, the application may allow the a host user (e.g. a celebrity) and/or an administrator to readily reschedule an interactive session by clicking a calendar icon 904.

In some embodiments, potential participant users are also able to request that an interactive session be moved by selecting a desired time. If a sufficient number of potential participant users request that the session be moved (e.g., a predetermined percentage of all social media fans or confirmed attendees), the host user and/or the administrator may have additional motivation to move the session to a different date/time.

In such scenarios, the host user can access the session schedule and set a new date and/or time for the session. A notice of the new date/time could be broadcast to all fans of a celebrity (e.g., through social media) or only those fans who have indicated an interest in attending the session (e.g., through the application). The notice can be transmitted via text message, email message, push notification, social media, etc. In some embodiments, the fans are able to specify (e.g., via a preferences menu accessible through the application) which communication channel should be used.
Participant Selection Mechanism—Example General Processes As mentioned, the previously described platform 100 and various interface features provide for an effective communications mechanism through which celebrities can connect with their fans, such as during a fan interaction session. Described herein are various participant selection mechanisms that enable a host user of an interactive session to select or screen the participants from which they will interact with during the interactive session. As will be described in more detail, these participant selection mechanisms can include, but are not limited to pre-filtering, pre-selection, pre-recording, geo-targeting, and blacklisting.

Figure 11A:
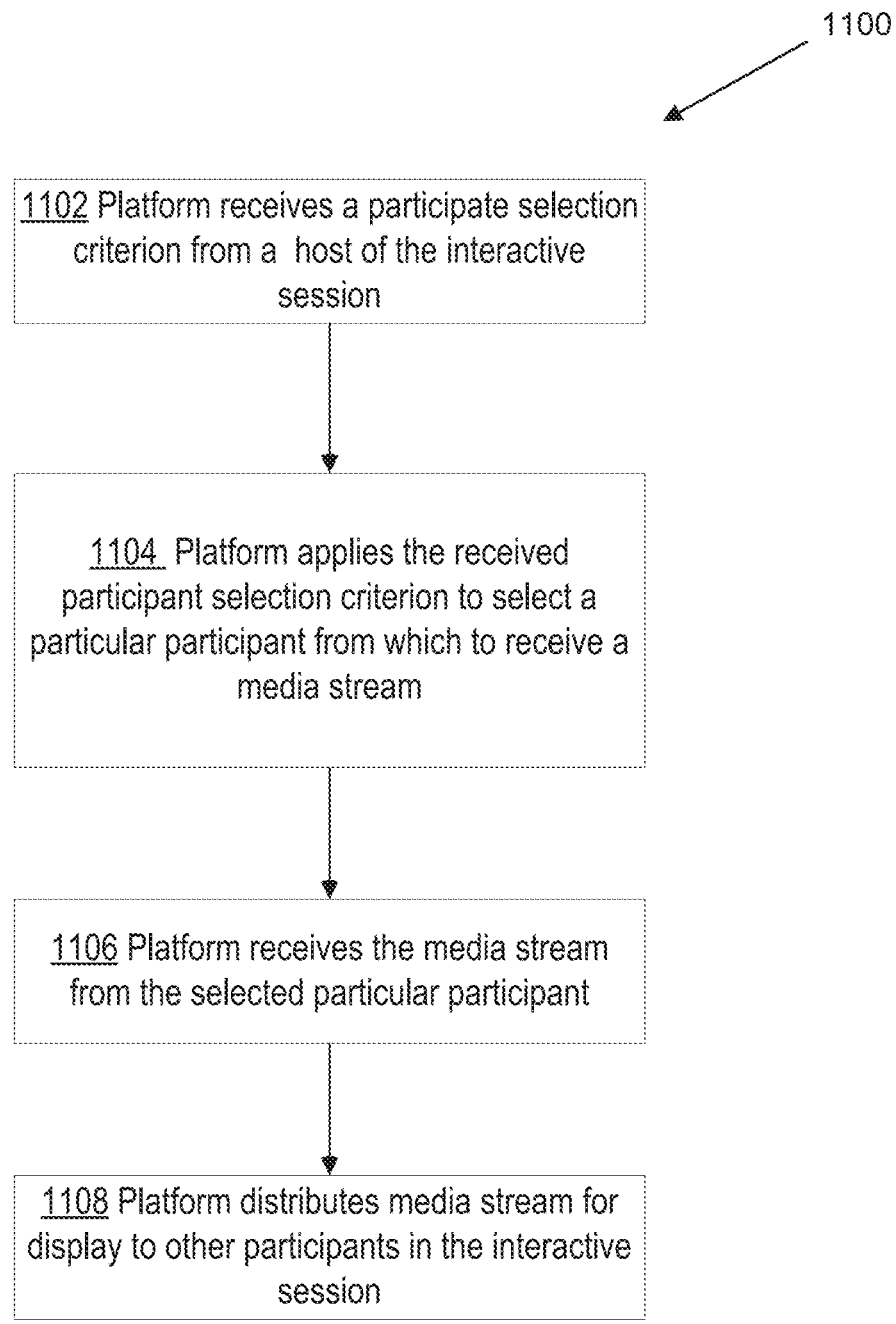
FIG. 11A a flow chart of an example process for selecting a participant for interaction with a host during an interactive session.

FIG. 11A is a flow chart of an example process 1100 for selecting a participant user for interaction during an interactive session with a host user (e.g. a celebrity). Interaction in this context may refer to receiving or broadcasting a media stream (e.g. a video question) from the selected participant user, for example as described with respect to FIGS. 7A-7E. In some embodiments, process 1000 can be performed by one or more computer systems operating as part of the platform 100 for facilitating a paced, synchronous interactive session.

Figure 12:
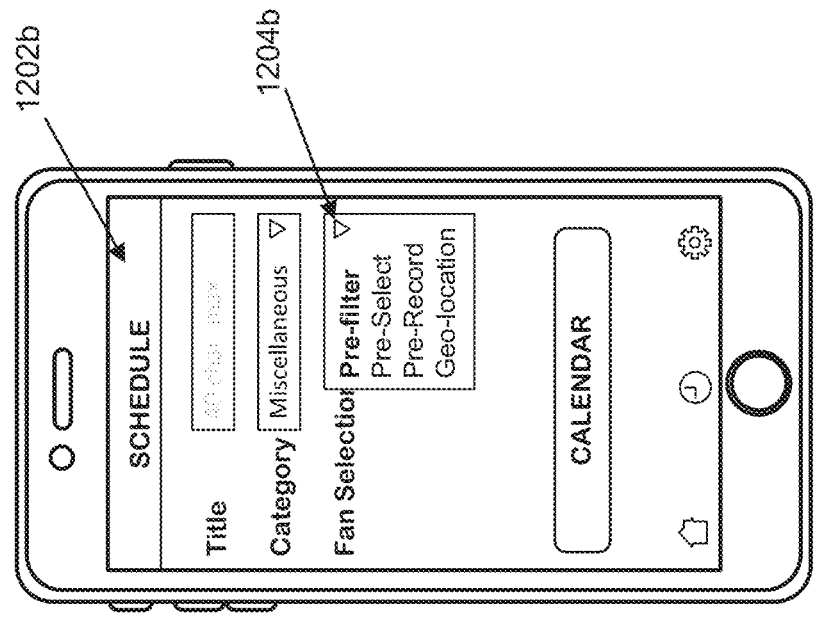
FIG. 12 shows example user interfaces for defining a participant selection criterion.
Figure 12:
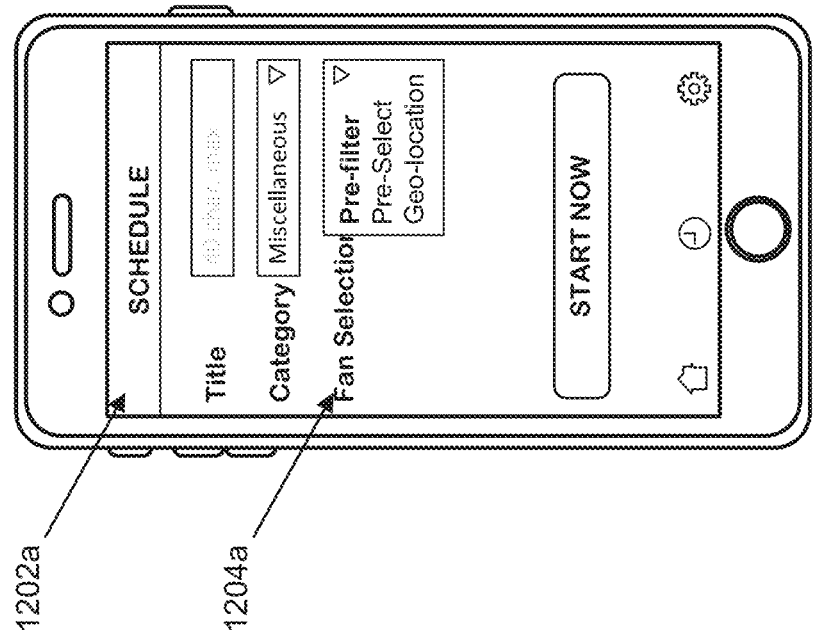

At step 1102, platform 100 receives participant selection criterion (or criteria) from a host user of the interactive session, such as a celebrity. As previously mentioned, a participant selection criterion can include, but is not limited to pre-filtering, pre-selection, pre-recording, geo-targeting, and blacklisting. In some embodiments, the participant selection criterion is received as part of a request by the host to initiate an interactive session. As previously described, platform 100 may generate a user interface accessible via a user device (e.g. an application at a mobile device) through which a host can initiate an interactive session. Further, such a user interface may include interactive elements through which a user can define the participant selection criterion before initiating the interactive session. FIG. 12 shows example user interfaces 1202*a-b* through which a user can provide input to define one or more participant selection criteria. For example, example interfaces 1202*a-b* include user-selectable options 1204*a-b* in the form of pull down menus through which a user may select one or more categories of participant selection criteria (pre-filtering, preselect, etc.) to apply to a given interactive session.

At step 1004, the platform applies a received participant selection criterion (e.g. as defined based on inputs received via interfaces 1202*a-b*) to select a particular participant from which to receive a media stream during an interactive session. As mentioned, the media stream may be received from a computing device associated with the participant that is connected to the interactive session. The media stream can include live and/or pre-recorded media and may include any of images, audio, video, text, metadata, etc. The ways in which various types of participant selection criteria are applied will be described in more detail later. At step 1106 the platform receives the media stream from the selected particular participant and at step 1108, the platform cases distributes the media stream received from the particular participant to the other participants in the interactive session for display via their respective devices, for example as described with respect to FIGS. 7A-7E.

Figure 11B:
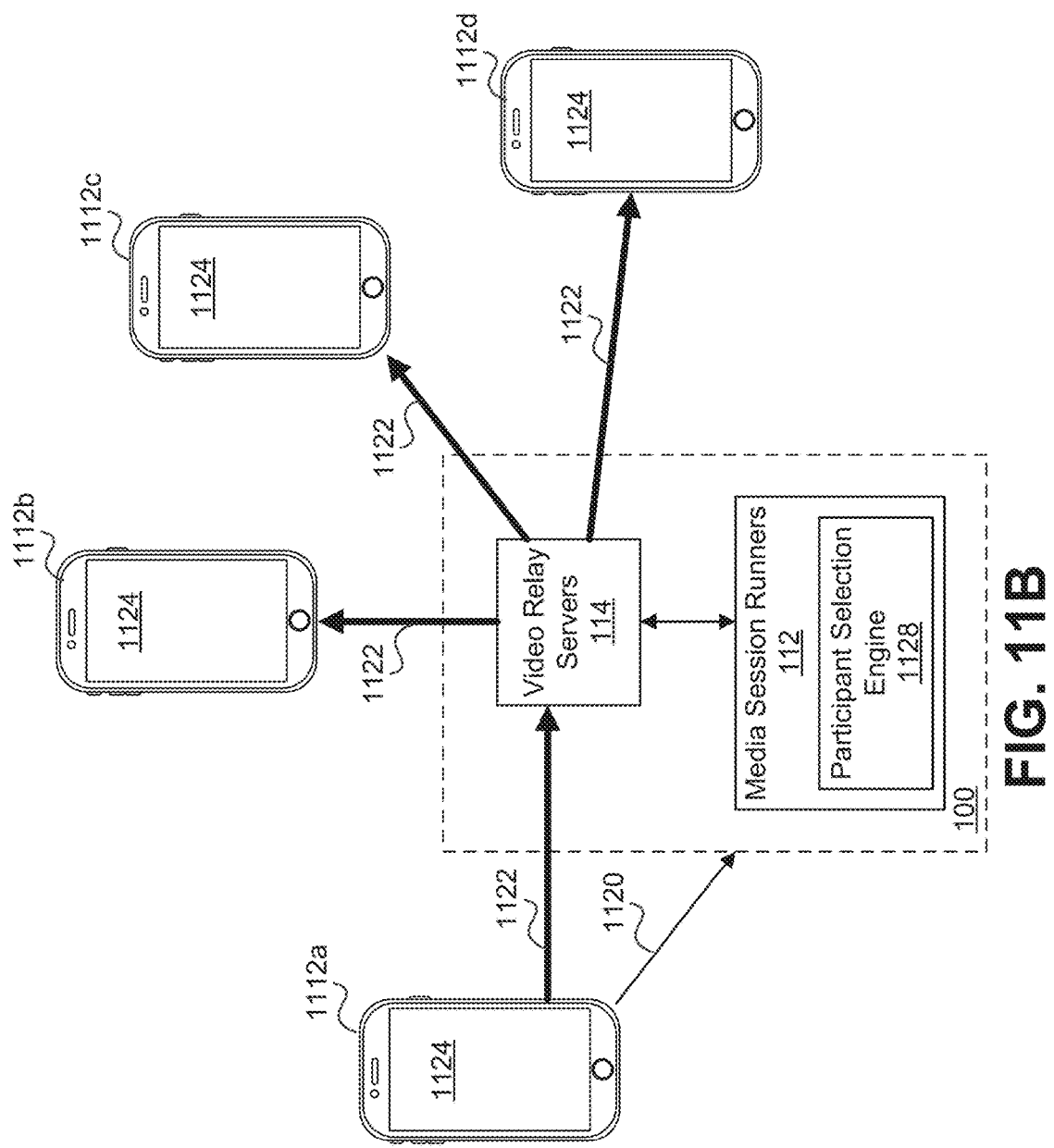

FIGS. 11B-11D show a sequence of architectural flow diagrams that further illustrate a process for selecting a participant user for interaction during a paced, synchronous interactive session. As shown in FIG. 11B, a host device 1112*a* may transmit a request 1120 to platform 100 to initiate an interactive session with multiple participant device 1112*b-d*. Note that devices 1112*a-d* may be similar to devices 102*a-c* described with respect to FIG. 1. Further platform 100 shown in FIG. 11B may be the same as platform 100 described with respect to FIG. 1, but may not show certain components for clarity. In an embodiment, the request 1120 transmitted at step includes a participant selection criterion, for example as described previously with respect to FIG. 11A.

In response to receiving the request 1120 from host device 1112*a*, platform 100 may initiate the interactive session between the host device 112*a* and the multiple participant devices 1112*b-d*. In an embodiment the interactive session may include a first communication channel enabling a media stream 1122 from the host device 1112*a* to the multiple participant devices 1112*b-d*. In embodiment, this communication channel remains open enabling streaming from the host device 1112*a* to the multiple participant devices 1112*b-d* for the duration of the interactive session. As previously described the media stream 1122 can include video, audio, photos, text, and/or metadata. The communication channel may be provided via media session runners 112 through video relay servers 114. As used herein, the term communication channel can refer to any type of communicative connection over a computer network. For example, the communication channel may represent a logical connection between host device 1112*a* and participant devices 1112*b-d* over one or more physical media across one or more multiplexed networks. Note, that as shown in FIG. 11B, and according to some embodiments, media stream 1122 is represented as a one way stream of media data from the host device 1112*a* to participant devices 1112*b-d*. For example, in an embodiment, video relay servers 114 can receive media stream 1122 in the form of live video captured at host device 1112*a*, replicate the media stream 1122 as necessary, and effectively broadcast media stream 1122 to the multiple participant devices 1112*b-d* connected to the interactive session via platform 100. At this stage, participant devices 1112*b-d* are not enable to broadcast their own media streams to the host device or to other participant devices. For example, platform 100 may cause devices 1112*a-d* to display media stream 1112 as output 1124. For example, in the case of streamed live video, output 1124 could include live video of a celebrity captured at host device 1112*a*. In other words, as shown in FIG. 11B, the users of the participant devices 1112*b-d* are audience members viewing the media stream 1122 from the user of the host device 1112*a* (e.g. the celebrity). At this stage in the session, These audience members have limited or no ability to interact with the celebrity using the host device or with other participants.

As shown in FIG. 11C, at any point during the interactive session, a host device 1112*a* may transmit a request 1126 to platform 100 to open the session to audience participation. For example, as previously described with respect to FIGS. 7A-E, during an interactive session, a celebrity may take questions from audience members (i.e., "open the floor" to particular participant users) (e.g. by tapping on a Q&A 704 in interface 7A). In other words, the request by the host device is a request to open the interactive session to a second media stream from one of the multiple participant devices 1112*b*-1112*d*. In response to receiving the request, platform 100 applies the participant selection criterion to select one of the participant devices from which to receive the second media stream. For example, in some embodiments, application of the participant selection criterion may be performed by a participant selection engine 1128 that is part of or in communication with the media session runner 112 for the particular session, as shown in FIGS. 11B-11D.

Application of specific types of participant selection criteria (e.g. pre-filter, geo-targeting, etc.) is described in more detail below. However, the process of selecting a participant from which to receive a media stream can take a few general forms. In some embodiments, depending on the selection criterion applied, a single participant device (e.g. device 1112*d*) may be automatically selected. In such embodiments, when a celebrity presses Q&A button 704 at an interface of host device 1112*a*, platform 100 automatically selects and initiates a second media stream from a particular participant device, without any additional input from the celebrity user of the host device 1112*a* or the participant user of the selected participant device. In some embodiments, instead of automatically selecting a participant device, platform 100 selects or identifies a subset of the connected participant device that qualify for selection based on the participant selection criterion. For example, as shown in FIG. 11C, a participant selection engine 1128 has identified a subset of the connected participant devices that qualify based on an applied selection criterion, as illustrated by the dotted line surrounding devices 1112*c* and 1112*d*. Once a subset of qualified devices is identified, a particular device from the subset may be selected using a number of methods. For example, in some embodiments, the subset is presented to a host user at the host device 1112*a* with a prompt to input a selection of the one of the devices from which to receive the second media stream. Alternatively, in some embodiments, a selection process similar to as described with respect to FIGS. 7A-7E is applied, in which a prompt is presented at each of the qualified participant devices (e.g. 1112*c* and 1112*d*) to initiate a media stream. The first qualified device from which a request is received is then selected to transmit a media stream. This can be accomplished by, for example, including a platform synchronized timestamp in each request and comparing the timestamps of received requests to determine the first device to request. In some embodiments, each packet of data includes a timestamp.

In response to selecting the particular participant device, platform 100 can open a second communication channel enabling the second media stream from the selected particular participant device for a limited period of time during the interactive session. For example, as shown in FIG. 11D, a second communication channel has been opened enabling a media stream 1132 from selected (as indicated by the surrounding dotted line) device 1112*d*. Similar to media stream 1122, media stream 1132 can include video, audio, photos, text, and/or metadata. The second communication channel may be provided via media session runners 112 through video relay servers 114. Also similar to media stream 1122, and according to some embodiments, media stream 1132 is represented in FIG. 11D as a one way stream of media data from the selected particular participant device 1112*d* to host device 1112*a* and the other participant devices 1112*b-c*. For example, in an embodiment, video relay servers 114 can receive media stream 1132 in the form of live video captured at device 1112*d*, replicate the media stream 1132 as necessary, and effectively broadcast media stream 1132 to the host device 1112*a* and other participant devices 1112*b-c* connected to the interactive session via platform 100.

Stream 1122 from the host device 1112*a* may persist for the duration of the interactive session. Accordingly, the concurrent streams 1122 and 1132 are synchronized for simultaneous presentation at the multiple device 1112*a-d*. For example, as shown in FIG. 11D, platform 100 may cause devices 1112*a-d* to display media stream 1112 as output 1124 and media stream 1132 as output 1134. For example, in the case of streamed live video, output 1124 could include live video of a celebrity captured at host device 1112*a* and output 1134 could include live video of a fan captured at the selected participant device 1112*d*. Output 1134 is presented as a frame within output 1124 at each device 1112*a-d*, however it shall be appreciated that the way in which the multiple streams 1122 and 1132 are presented may dynamically change and may be different at each device. For example, as described with respect to FIGS. 7A-7E, when a participant is given the floor to ask a question of the celebrity, the output of their stream (e.g. stream 1132) may be maximized relative to the output of the stream (e.g. stream 1122) from the host device. Once the participant has finished asking their question and/or their stream has terminated, the output of the host stream 1122 may revert to a maximized state. Further, users at each device may be provided options to customize how the various streams are presented (e.g. options to resize and reposition windows).

Participant Selection Mechanism—Pre-Filtering

Figure 13:
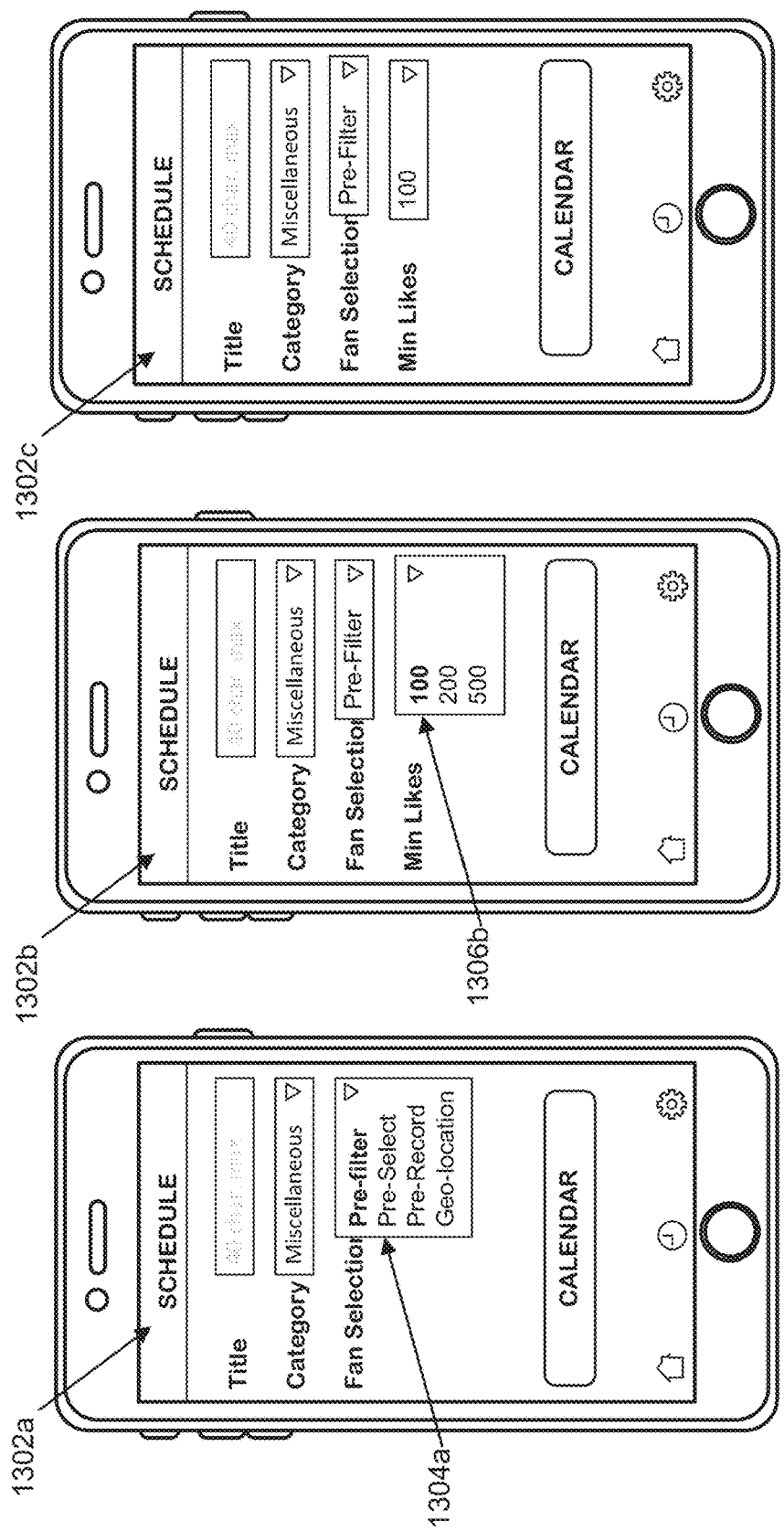
FIG. 13 shows a sequence of example user interfaces for defining a participant selection criterion based on pre-filtering.

FIG. 13 shows a sequence of example user interfaces 1302a-c that can be used to define a participant selection criterion based on pre-filtering. A user (e.g. a celebrity host) may access interface 1302a to request to initiate an interactive session (e.g. immediately or to be scheduled in the future). As shown in FIG. 13, interface 1302a may include an option 1304a through which the user can input a category of selection criterion to apply during the interactive session. For example, option 1304a is shown in interface 1302a as a pull down menu listing multiple categories of selection criterion. In response selecting "pre-filter," interface 1302b may be displayed to the user with an additional option 1306b to select a qualifier associated with the selected category of criteria. For example, in interface 1302b, option 1306b is presented as a pull down menu prompting the user to select a minimum number of likes that a given participant is required to have in order to be considered for selection. As will be described, in some embodiments, participants in an interactive session can rate (e.g. "like") each other within or outside of an interactive session. In this way fan participants can build notoriety thereby becoming more trustworthy from a host user's perspective. As shown in interface 1302c, the user setting up the interactive session has selected "pre-filter" as the selection criterion with a minimum number of likes of 100 for a given participant to be selected to interact with host user (e.g. celebrity) during the interactive session.

The example pre-filter selection criterion shown in interfaces 1302a-c based on a minimum number of likes as a qualifier is provided for illustrative purposes, but should not be construed as limiting. In other embodiments, other qualifiers may be associated with a pre-filter selection criterion. In some embodiments a pre-filter selection criterion may be based on participant affiliations, qualifications, or characteristics. For example, only participants that are members of a given celebrity's fan club may be eligible for selection. As another example, only participants connected to a particular social media platform (e.g. Facebook) may qualify for selection. As another example, only participants in a certain age range (e.g. over 18) may qualify for selection. Information regarding the characteristics of a participant may be gathered based on that participants platform account and/or information tied to any of the participant's other social media accounts. In some embodiments, a pre-filter selection criterion may include qualifiers based on capabilities of the device and/or network through which participants access the interactive session. For example, a pre-filter selection criterion may include a minimum uplink bandwidth qualifier in order to support a seamless experience during the interactive session. It will be appreciated that a given pre-filter participant selection criterion may include more than one qualifier. For example, a user requesting (e.g. via interfaces 1302a-c) to initiate an interactive session may include with the request a pre-selection criterion that participant have a minimum of 100 likes, a minimum uplink speed of 500 Kbps, and be over the age of 18.

A pre-filter participant selection criterion essentially defines a subset of the overall audience in a given interactive session from which the platform may select for direct interaction with the host. For example, as previously described with respect to FIGS. 7A-E, during an interactive session, a celebrity may take questions from audience members (i.e., "open the floor" to particular participant users) (e.g. by tapping on a Q&A 704 in interface 7A). In response to the host user "opening the floor," platform 100 may select one or more participant users in the interactive session from which to receive a media stream (e.g. a pre-recorded video message or a live video stream). If a pre-filter selection criterion exists for the interactive session, platform 100 may apply that criterion in order to select a particular participant user from which to receive the media stream (e.g. with a video question for the host user).

In some embodiments, platform 100 applies the pre-filter selection criterion to automatically select a particular participant that best meets the selection criterion. Often a number of participants in a given interactive session may meet the pre-filter selection criterion thereby establishing a subset of qualified participants. In such situations, platform 100 may apply the selection mechanics described with respect to FIG. 7C in order to select a particular participant from the subset of qualified (according to the pre-filter selection criterion) participants. For example, consider again the scenario described with respect to FIG. 7C. As shown in FIG. 7C, a video button 706 can be displayed to all qualified participants via their respective devices. Here the video button 706 is displayed to the qualified participants with a message, "first user to tap video button can live stream for 15 seconds." Accordingly, the first of the qualified participants that transmits a request (e.g. by pressing button 706) is selected by platform 100 and allowed to transmit a media stream for display to the one or more other participants and host in the interactive session. As noted, in some embodiments, this media stream may be permitted for a predetermined duration (e.g. 15 seconds), and may be terminated in response to input by the host.

Participant Selection Mechanism—Pre-Selection

Figure 14:
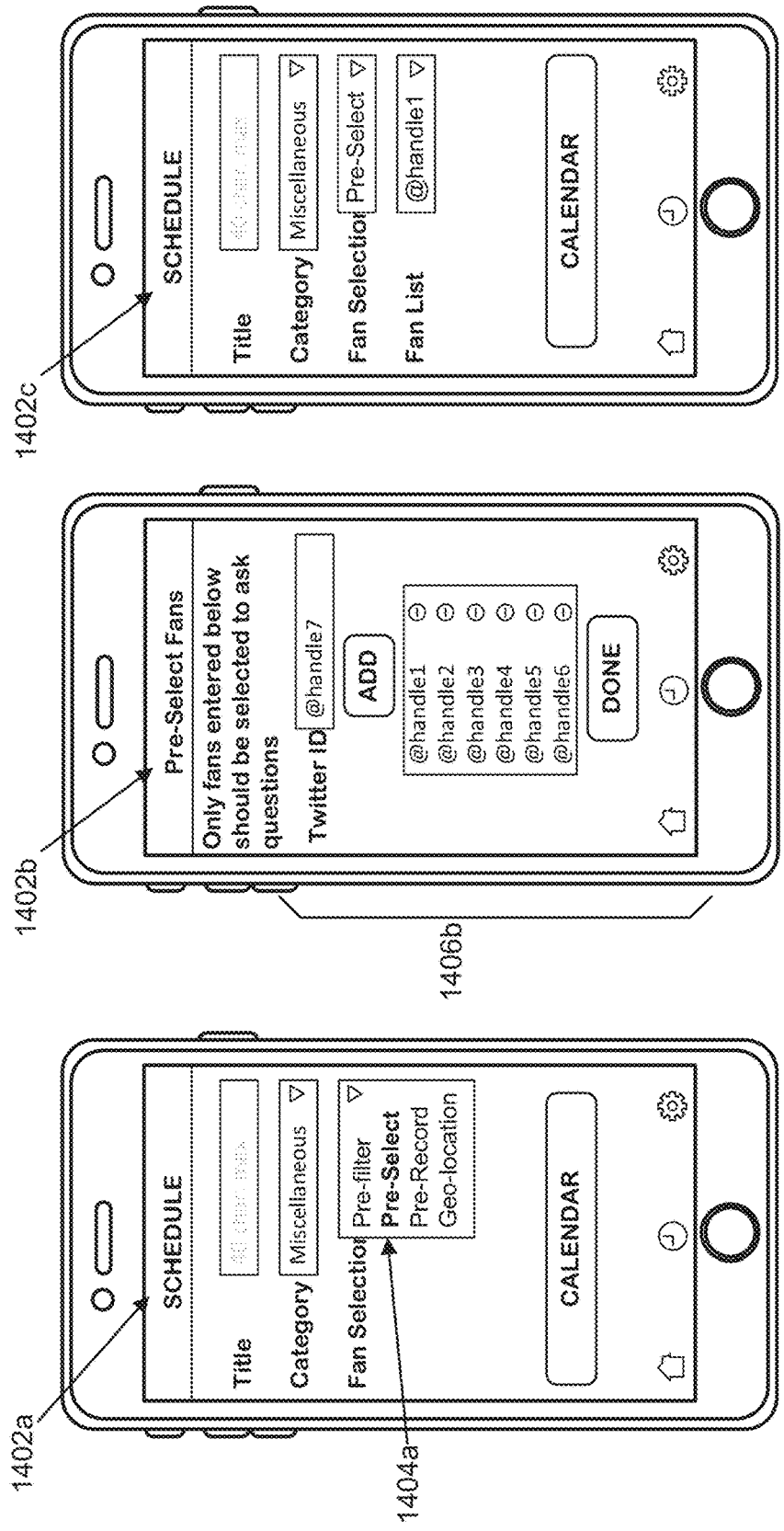
FIG. 14 shows a sequence of example user interfaces 1 for defining a participant selection criterion based on pre-selected participants.

FIG. 14 shows a sequence of example user interfaces 1402a-c that can be used to define a participant selection criterion based on pre-selecting specific participants, also referred to herein as "pre-selection." A host user (e.g. a celebrity) may access interface 1402a to request to initiate an interactive session (e.g. immediately or to be scheduled in the future). As shown in FIG. 14, interface 1402a may include an option 1404a through which the user can input a category of selection criterion to apply during the interactive session. For example, option 1404a is shown in interface 1402a as a pull down menu listing multiple categories of selection criterion. In response to selecting "pre-select," interface 1402b may be displayed to the user with an additional option 1406b to select a qualifier associated with the selected category of criteria. For example, in interface 1402b, option 1406b includes a text field through which a user can enter unique identifiers (e.g. a Twitter ID) associated with one or more participants. For example, a host user may know of one or more trusted fans from which they would be comfortable fielding questions during an interactive session. In response to entering a unique identifier (e.g. "@handle7") the user may add the entered identifier by pressing the "add" button shown in interface 1402b. The entered identifier may then be added to a list of previously entered identifiers and displayed to the host user (e.g. as shown at the list of identifiers @handle1-@handle6) so that the host user can inspect the list and make edits if necessary. Once the host user is satisfied with the list of pre-selected identifiers, the host user can press the "done" button and is presented with display 1402c that includes the selection criterion.

The example pre-selection criterion shown in interfaces 1402a-c based on social media identifiers entered into a text field is provided for illustrative purposes, but should not be construed as limiting. In other embodiments, participants may be pre-selected using other mechanisms. For example, as will be discussed, a host user (e.g. a celebrity) may be able to access a list of the top rated (e.g. based on "likes") participants across platform 100 or from past interactive sessions involving the host. Accordingly, in some embodiments, an interface similar to interfaces 1402a-c may allow a host to select from a predefined list of top-rated participants to ad to a participant selection criterion for a given interactive session.

As with pre-filtering, pre-selection as a criterion essentially defines a subset of the overall audience in a given interactive session from which the platform 100 may select for direct interaction with the host user (e.g. a celebrity). Accordingly, in some embodiments, similar interface mechanics as described with respect to FIGS. 7A-E may similarly apply when selecting a particular participant from which to receive a media stream.

Participant Selection Mechanism—Pre-Recorded Messages

As previously mentioned, in certain situations, a celebrity may not wish to take live questions during an interactives session and may instead opt to solicit a predetermined number of pre-recorded video questions. For example, prior to the start of an interactive session, platform 100 may, in response to a selection criterion, solicit "n" number of pre-recorded videos from potential participants in the session. A host user (e.g. the celebrity or an individual associated with the celebrity) can then review the pre-recorded messages and elect to broadcast them and answer the questions during the interactive session.

Figure 15:
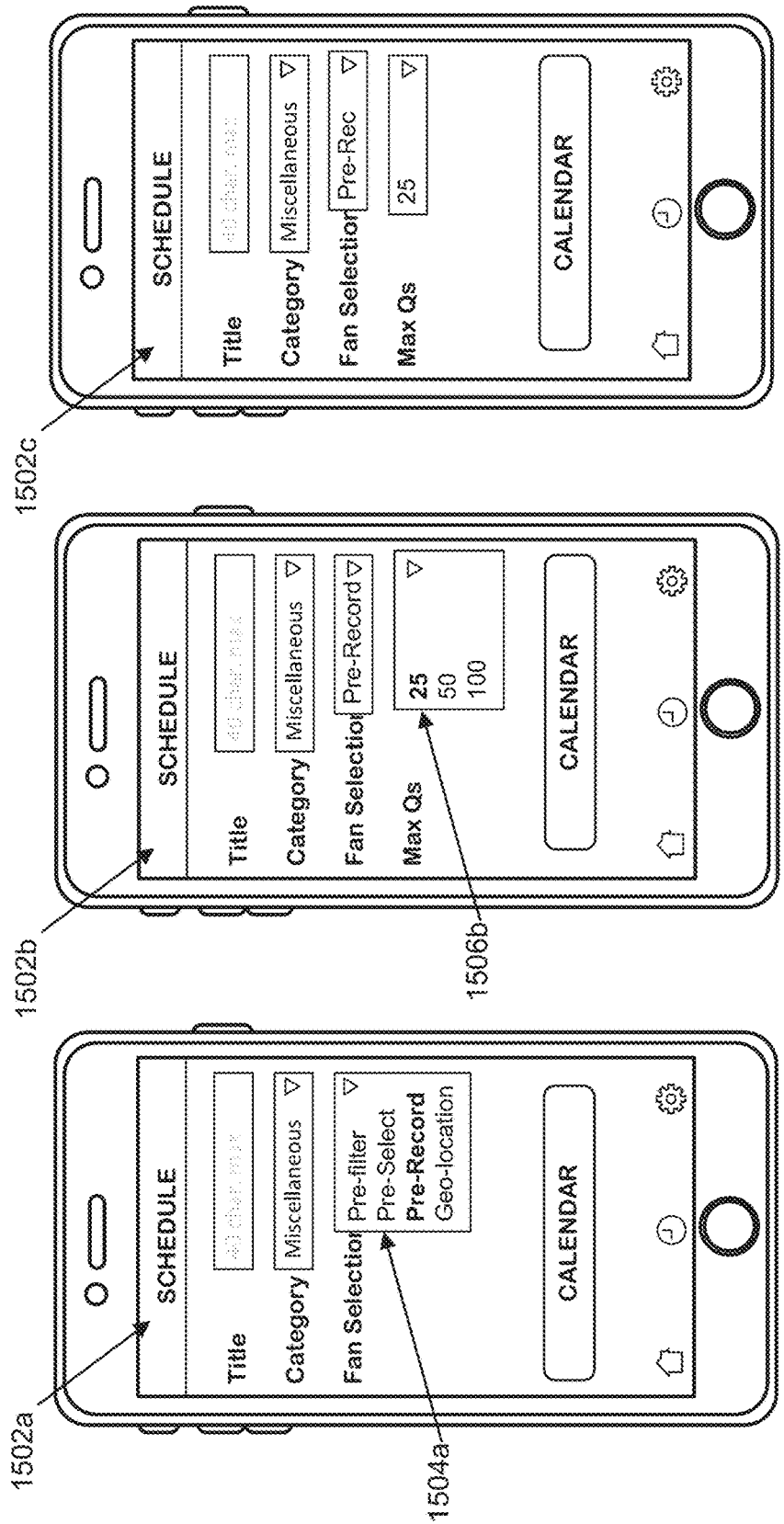
FIG. 15 shows a sequence of example user interfaces for defining a participant selection criterion based on pre-recorded media.

FIG. 15 shows a sequence of example user interfaces 1502a-c that can be used to define a participant selection criterion based on pre-recorded media, also referred to herein as "pre-record." A host user (e.g. a celebrity) may access interface 1502a to request to initiate an interactive session (e.g. immediately or to be scheduled in the future). As shown in FIG. 15, interface 1502a may include an option 1504a through which the user can input a category of selection criterion to apply during the interactive session. For example, option 1504a is shown in interface 1502a as a pull down menu listing multiple categories of selection criterion. In response to selecting "pre-record," interface 1502b may be displayed to the user with an additional option 1506b to select a qualifier associated with the selected category of criteria. For example, in interface 1502b, option 1506b includes a pull down menu prompting the user to select the maximum number of pre-recorded messages to solicit from participants prior to and/or during an interactive session. As shown in interfaces 1502b and 1502c, the user has selected 25 as the maximum number of pre-recorded messages to receive. Note in some embodiments, a qualifier such as "Max Qs" may refer to the maximum number of pre-recorded messages that can be received from an already approved pool of participants (e.g. through the aforementioned pre-filtering and/or pre-selection). Alternatively, any number of participants may submit a pre-recorded message and "Max Qs" qualifier may refer to the number of those pre-recorded messages that are then forwarded to the user for approval. For example, consider that 1000 participants are signed up for a scheduled interactive session. A user may, via interfaces 1502a-c, input a participant selection criterion based on pre-recorded messages specifying the maximum number of messages at 25. One hundred of the 1000 participants submit a pre-recorded message, however based on the selection criterion, platform 100 automatically selects 25 of the submitted 100 questions to forward to the user for approval before placing in a pool of approved pre-recorded messages. For example, platform 100 may automatically select 25 of the 100 participants that best match other selection criterion (e.g. pre-filter, pre-select, geo-targeting, etc.). If the user only approves 15 of the forwarded 25 pre-recorded messages, platform may automatically forward additional un-selected messages from the pool of 100 to the user for approval until a total of 25 messages are approved or the pool of 100 is depleted.

Although not shown in FIG. 15, a user may be prompted to enter other qualifiers to the selection criterion based on pre-recording. For example, a user may specify that prerecorded messages be of a certain length (e.g. max 15 seconds), a certain quality (e.g. min resolution, framerate, bit rate, etc.), a certain format (e.g. mpeg-4), in a certain language (e.g. English), etc.

Figure 16:
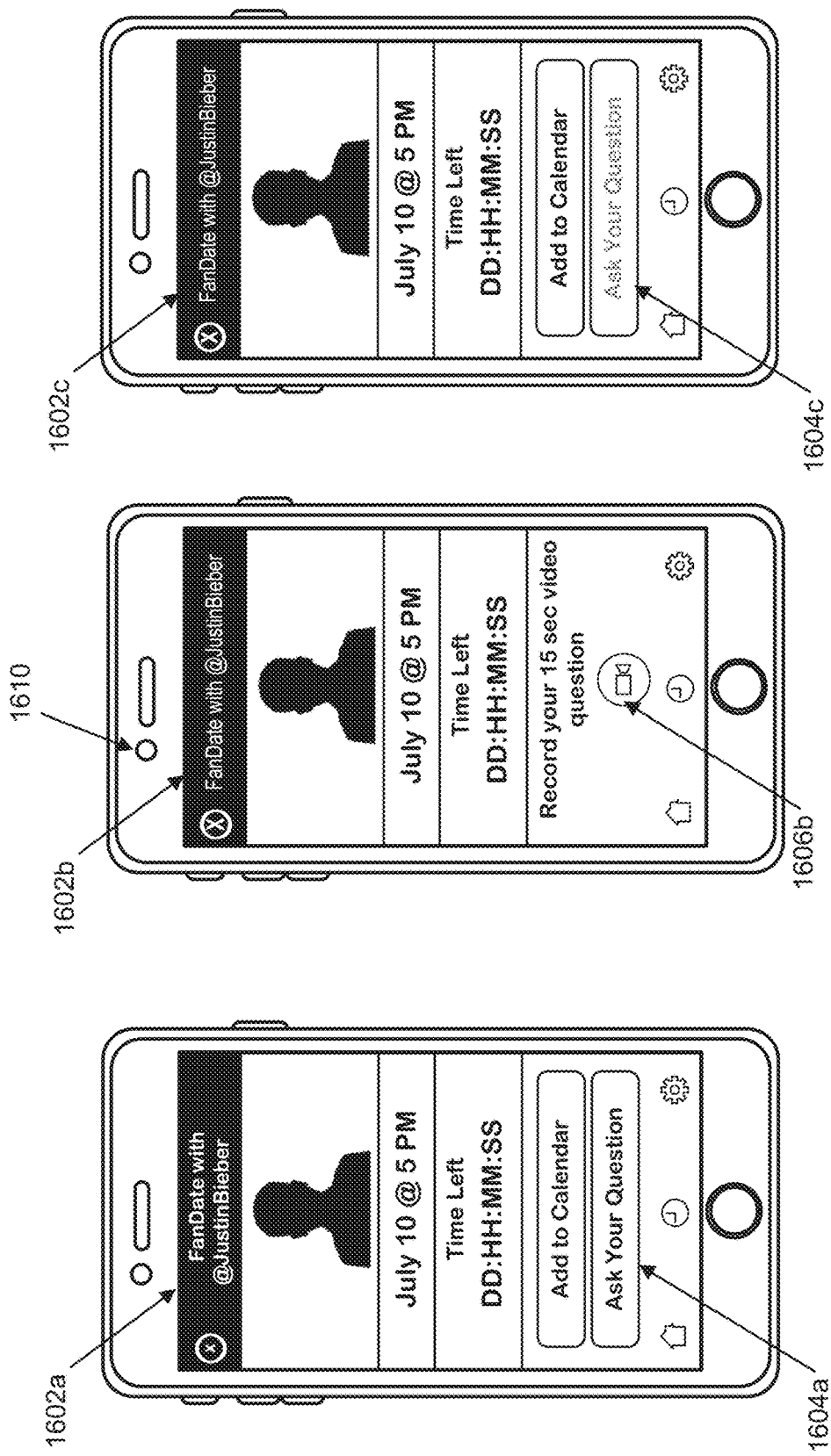
FIG. 16 shows a sequence of example user interfaces for pre-recording a message to be streamed during an interactive session.

FIG. 16 shows a sequence of example user interfaces 1602a-c that can be used by a participant to pre-record a message for inclusion in the interactive session that has a pre-record selection criterion applied. Interface 1602a depicts a screenshot of a start page for an interactive session (e.g. a FanDate session with Justin Bieber). Participants may view the start page shown at interface 1602a at their device before the interactive session is initiated. For example, the start page may include information on the scheduled interactive session including a title, the celebrity hosting the session, a category, sponsorship information, and a countdown to start time of the session. The start page may further include advertisements, previews for other upcoming sessions, media clips from previous sessions, media clips about the corresponding celebrity, etc. The start page may also include an option 1604 to pre-record a message. For example option 1604a is shown in interface 1602 as a button, "Ask Your Question." In response to selecting button 1604a, a participant user may be presented with interface 1602b through which they can record their message. For example interface 1602b may include camera button 1606b which when pressed causes the participant's device to record video via an associated camera, for example integrated front facing camera 1610. The recorded video may then be transmitted by the participant's device to platform 100 before being forwarded to the host user (e.g. in this example Justin Bieber or a user representing Bieber) for pre-approval before the interactive session. In some embodiments, the pre-recorded video may be restricted in length. For example, as shown in interface 1602b, a participant may record a 15 second long video question. Note that the length of the pre-recorded media may in some embodiments be set based on an qualifier associated with the selection criterion that is entered, for example, via interfaces 1502a-c of FIG. 15.

Returning to FIG. 16, as shown in interface 1602c, option 1604a to pre-record a video message may in some situations be unavailable to a participant user, for example, as shown at unavailable button 1604c. The option to pre-record a video message may be unavailable for a number of reasons. For example, the max number of pre-recorded messages (as set via interfaces 1502a-c) may have already been reached at the time that a participant access interface 1602a-c. As another example, the participant may not qualify to submit a prerecorded video because they do not qualify under another selection criterion (e.g. pre-filter, pre-selection, etc.). For example, a user accessing interface 1602c may be on a blacklist and ineligible to submit pre-recorded messages.

As mentioned, prior to or during an interactive session, platform 100 may present selected pre-recorded messages for the host (e.g. a celebrity) to vet and selection for inclusion in the session. For example, in some embodiments similar to as shown in FIG. 7A, a host user can press a "Q&A" button 704 and be presented with a list of selected and/or pre-approved vide messages from fans. In response to selecting, by the host user, one of the video messages, the message may be streamed from the particular participants device or from platform 100 and be displayed via the devices of the other participants in the interactive session.

Participant Selection Mechanism—Geo-Targeting

Interacting with select, geo-located communities could be important for certain celebrities to further their cause. A classic example of this participant selection mechanism may be in politics, wherein the politician can address questions from a certain community (town or city), even though he/she is not physically present. A virtual town hall meeting is the best way to describe this sort of interaction.

Figure 17:
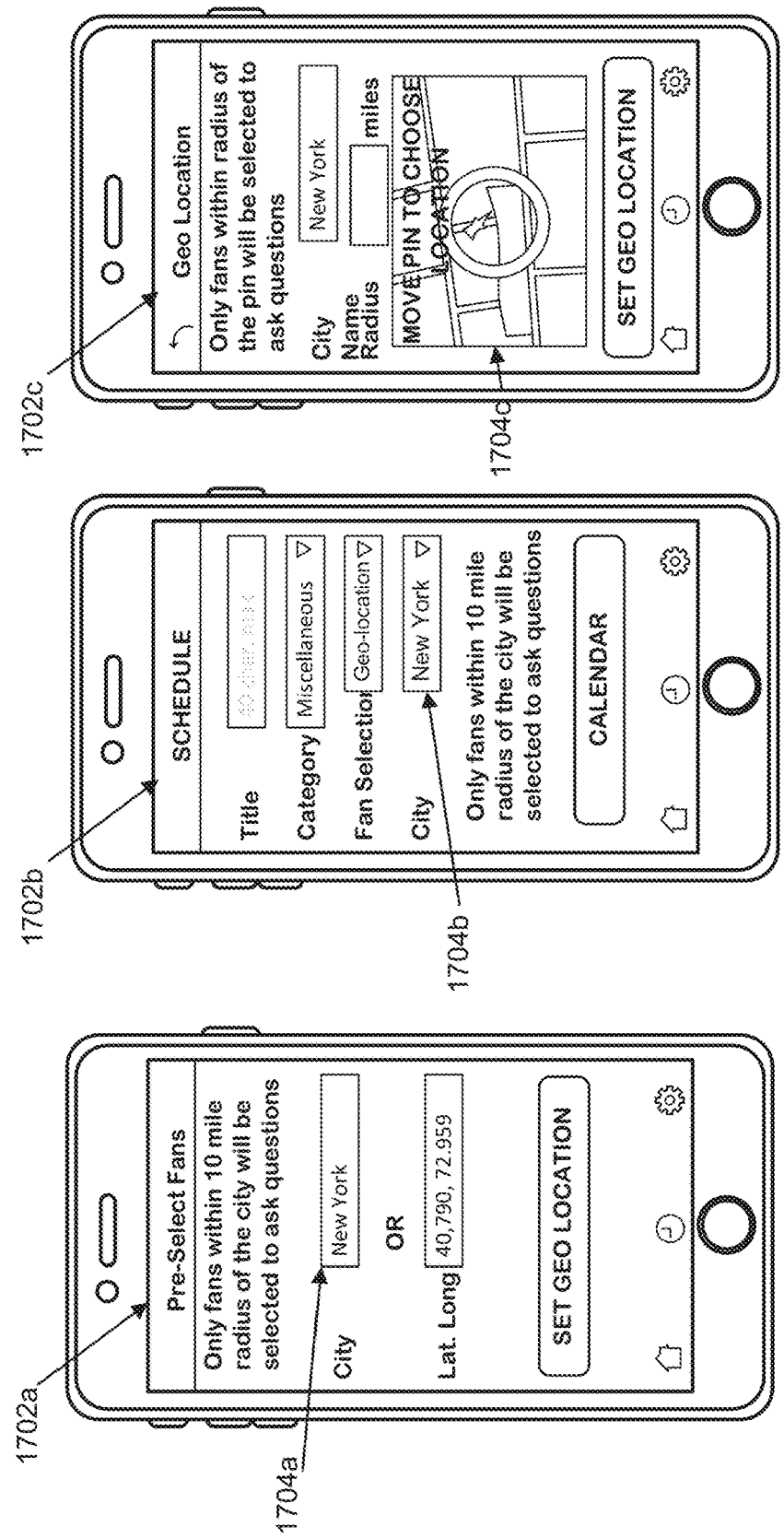
FIG. 17 shows a series of example user interfaces for defining a participant selection criterion based on geo-location.

FIG. 17 shows a series of example interfaces 1702*a-c* that can be used to define a participant selection criterion based on geo-location of participants, also referred to herein as "geo-targeting." As shown in interfaces 1702*a-c*, a host user (e.g. a celebrity) may be presented with a number of options to set a geographic location as a participant selection criterion. For example, as shown in interface 1702*a*, a user may be presented with an option 1704*a* in the form of a text box in which to enter a location (e.g. a location identifier such as a city name or set of coordinates). Similarly, as shown in interface 1702*b*, a user may be presented with an option 1704*b* in the form of pull down menu to select one or more of a pre-defined set of locations (e.g. New York). As anther example, as shown in interface 1702*c*, a user may be presented with an interactive map to select or "pin" a particular geographic location to set the selection criterion. In each of these options 1704*a-c*, the selection criterion may define participants within a threshold distance of the selected location as eligible to stream media from their device. This threshold distance may be set by the platform 100. For example interfaces 1702*a* and 1702*b* allow a user to select a location, however the threshold distance in both instances is set at a 10 mile radius from the selected location. Alternatively, the user may be presented with an option to select a particular radius from the selected location on which to base the selection criterion, for example, as shown with the editable text box in interface 1702*c*.

Prior to and/or during an interactive session, selection criterion based on geo-targeting, may be applied by receiving, by platform 100, location data from participant devices used to connect to the interactive session. For example, many modern mobile device include means for detecting a location of the device (e.g. GPS receivers, accelerometers, computer network localizing, etc.). Upon signing into an account with platform 100, a participant device (e.g. a smart phone device) may transmit to platform 100 a geographic location which then may be used by platform 100 to apply a geo-targeting selection criterion by comparing the received location of the participant device with an geographic area/location defined by the selection criterion. If the location of the participant device falls within a threshold distance from the host-specified location, the participant user of the device may be eligible to stream media (e.g. live or pre-recorded video) to the host and other participants during the interactive session.

Fan Selection Mechanism—Blacklisting

A celebrity might want to completely eliminate certain individuals from being selected to steam media (e.g. ask video questions). Blacklisting such individuals at the platform level may ensure that these individuals are never selected during any of the celebrity's broadcast sessions. In some embodiments, individuals can be blacklisted in a process that is similar to the process of defining a pre-selection criterion described with respect to FIG. 14. In other words, a host user (e.g. a celebrity) can enter, via an interface similar to 1402*b* in FIG. 14, one or more unique identifiers associated with individuals that they do not want to receive a media stream from during an interactive session. For example these individual may have caused trouble on past interactive session or have a particularly low peer-rating (e.g. number of likes). Alternatively these individuals may have been blacklisted by other host users (e.g. celebrities) during previous interactive sessions. For example, when a host user accesses an interface similar to interface 1402*b* to define a blacklist, they may be prompted to one or more individuals that are currently blacklisted at a platform level. As with pre-selection, a user may blacklist certain individuals by entering a unique identifier (e.g. a social media handle) that corresponds to that individual.

As previously mentioned, to provide a greater degree of control over an interactive session, a host user (e.g. a celebrity) may have the option while a particular participant is streaming media (e.g. live or pre-recorded video) to terminate that participants stream at any time. For example, an interface viewable by the host user may include a button to terminate the stream from a particular participant at any time. In some embodiments, the act of selecting the button to terminate the media stream from the particular participant may automatically add that particular participant to a blacklist. The host user can then select a "Q&A" button to cause the system to automatically select the next particular participant from which to receive a media stream (e.g. a vide question).

Participant Notoriety

Figure 18:
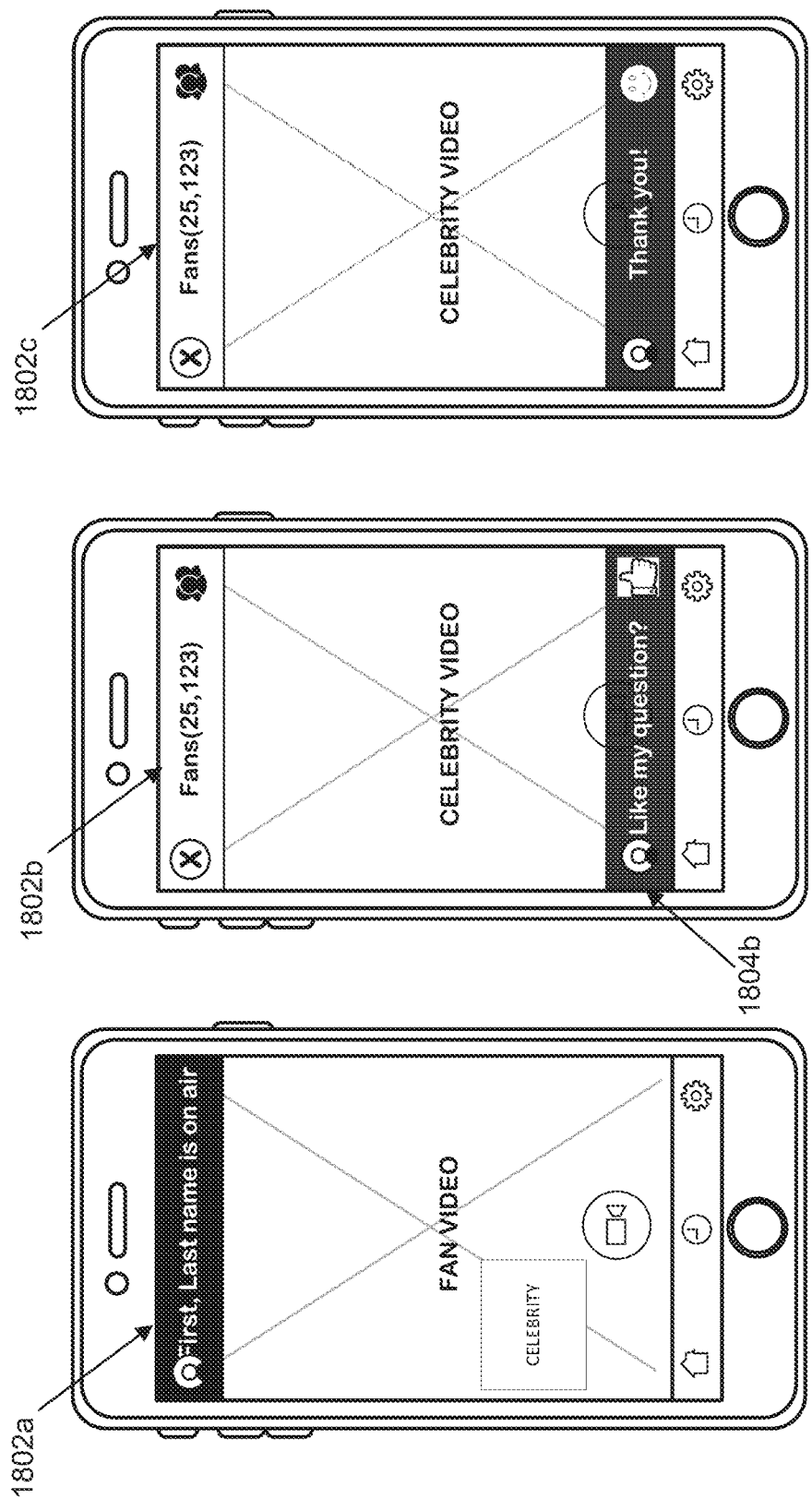
FIG. 18 shows a sequence of example user interfaces receiving participant ratings.

As discussed previously, participant users can build notoriety through gathering "likes" from other participants and from a host user during an interactive session. FIG. 18 shows a sequence of example user interfaces 1802*a-c* that can be used to receive participant ratings, for example in the form of likes from other participants in an interactive session. For example, interfaces 1802*a-c* may be from the perspective of a participant user other than the host user or the selected user from which a media stream (e.g. a video question has been received). As shown FIG. 18, a media stream (e.g. a vide question) received from a selected particular participant (e.g. a fan) may be displayed to another participant via interface 1802*a* for a predetermined amount of time (e.g. 15 seconds) or until a host user terminates the stream. In response to the stream ending, the participant viewing interface 1802*b* may be presented with an option 1804*b* to rate the media stream and/or particular participant from which the stream was received. For example, option 1804*b* as shown in interface 1802*b* asks the participant user if they liked the question asked in the media stream. In response to receiving an input (e.g. liking or declining to like), a participant user may be presented with interface 1802*c*.

Figure 19:
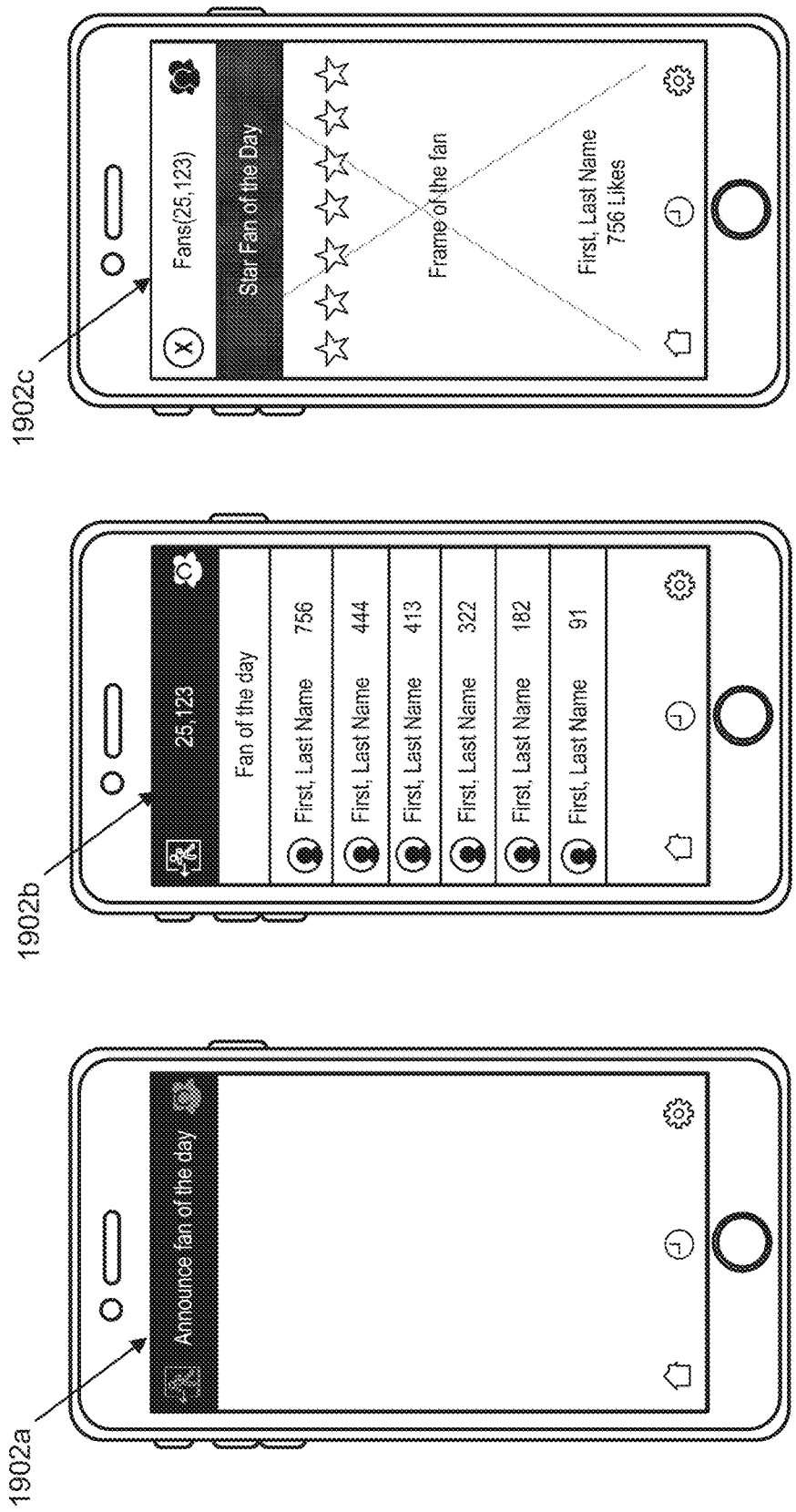
FIG. 19 shows a sequence of example user interfaces for announcing top rated participants during or following an interactive session.

FIG. 19 shows a sequence of example user interfaces 1902*a-c* that can be used to announce top rated participants during or following an interactive session. For example, in an embodiment, interface 902*a* provides an option to a host user (e.g. a celebrity) to announce a fan leaderboard to the participants in the interactive session. The option shown in interface 1902*a* can be presented to a host user during and/or at the conclusion of the interactive session. In response to an input by the host user electing to announce the fan of the day, interface 1902*b* may present a leaderboard including ranked participants for the session (e.g. according to received likes). The leaderboard shown in interface 1902*b* can be presented to all the participants or may be presented only to the host user. In some embodiments, a host user can select one or more of the ranked participants included in the leaderboard shown at 1902*b* as the "star fan of the day." In response, interface 1902*c* may be presented to the participants that announce the star fan of the day. The announcement in interface 1902*c* can include information on the participant (e.g., name, photo, number of likes, etc.) and may, in some embodiments, present some type of celebratory animation or video.

Pre-Recorded Social Media Sessions

Figure 20:
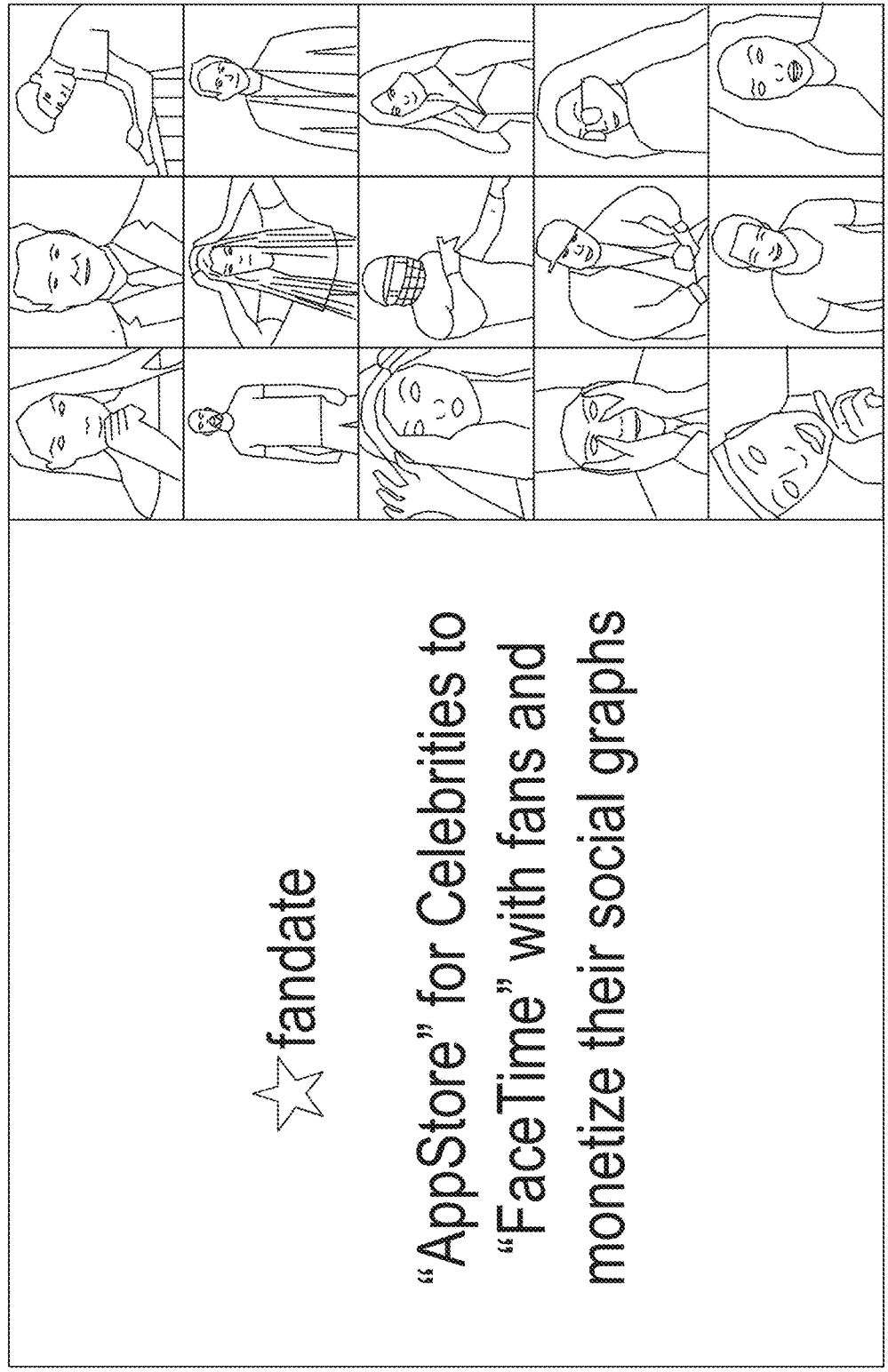
FIG. 20 shows features of a platform for monetizing streaming fan interaction sessions.
Figure 26:
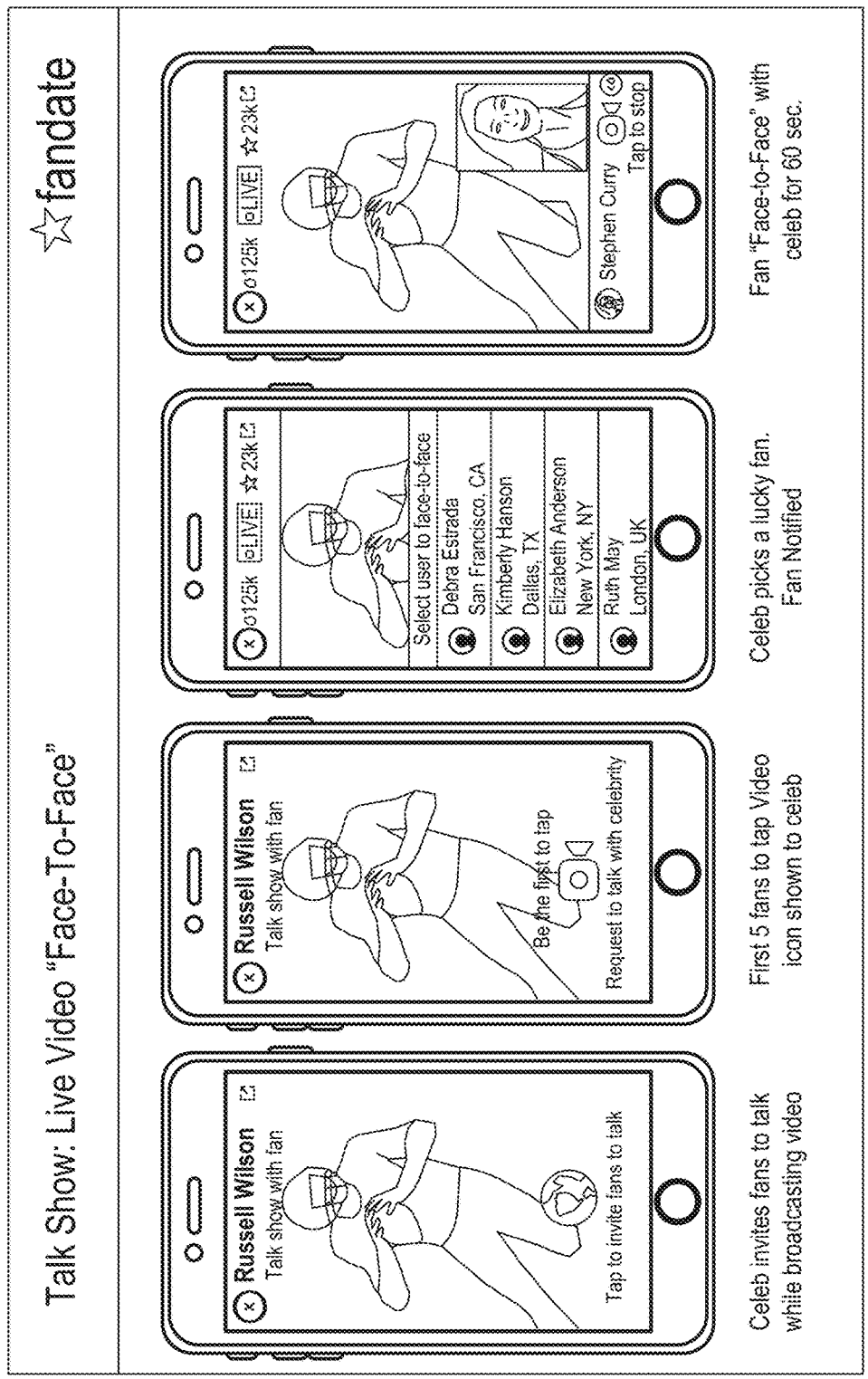
FIG. 26 shows features of a platform for streaming fan interaction session that enables live video face-to-face sessions, and user interface examples.

FIG. 20 shows features of a platform for monetizing streaming fan interaction sessions. In some embodiments, the platform, which is also referred to herein as a FanDate platform, is platform 100 of FIG. 1. In some embodiments, the FanDate platform utilizes a VYDEO platform. In other embodiments, the FanDate platform is a VYDEO platform. In other words, in such embodiments the FanDate platform and the VYDEO platform and one and the same. The fan interaction sessions can be live or can be pre-recorded. In an embodiment where the session is pre-recorded, the technology enables a communicator, such as a celebrity, to interact with participants, such as fans, during what appears to the fans to be a live streaming session. In some embodiments, a FanDate platform enables live video face-to-face sessions. FIG. 26 shows features of a platform for streaming fan interaction session that enables live video face-to-face sessions, and user interface examples. The fan interaction session is also referred to herein as a FanDate session.

Figure 22:
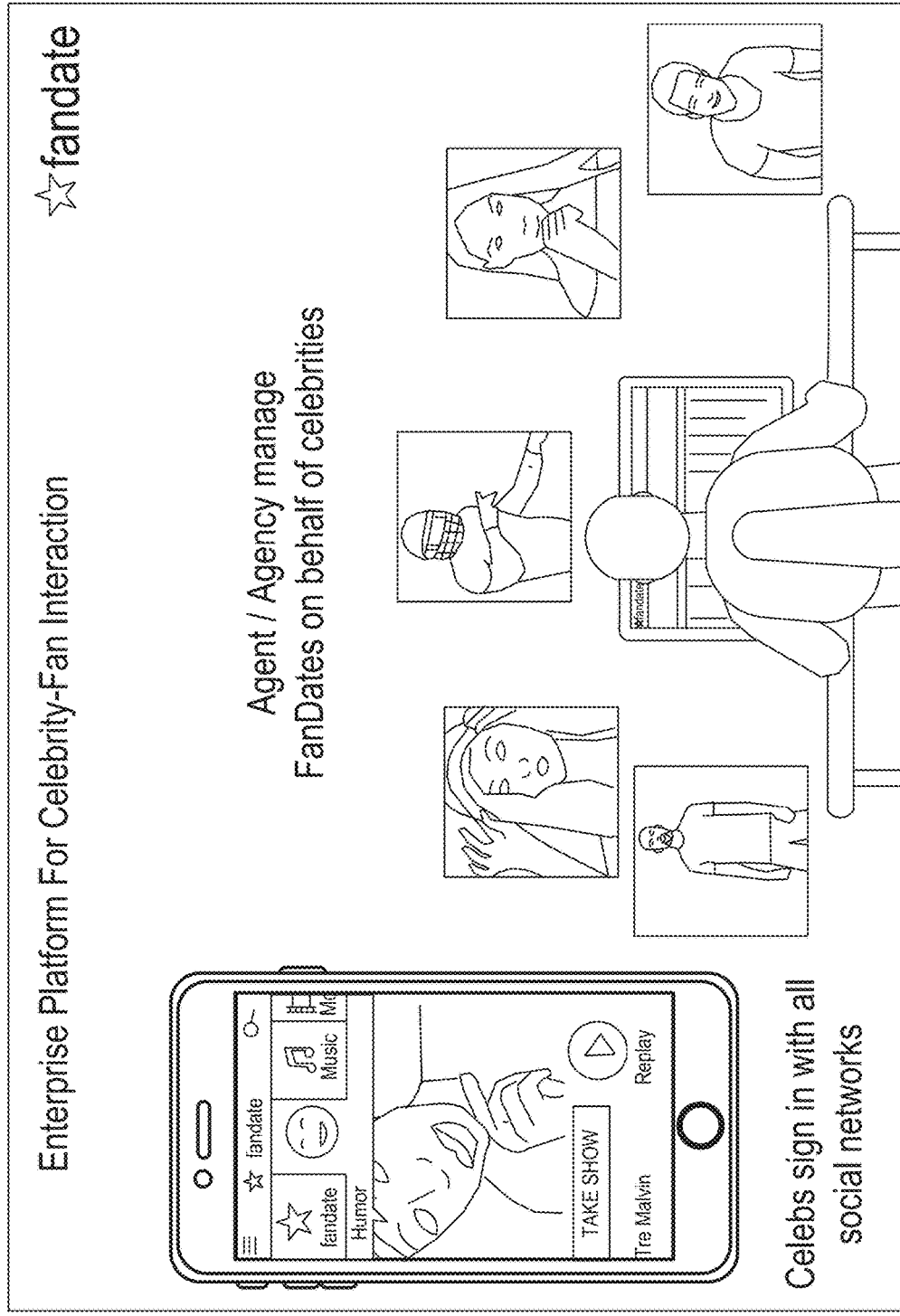
FIG. 22 shows session management features of a platform for streaming fan interaction sessions.

FIG. 22 shows session management features of a platform for streaming fan interaction sessions. A celebrity, or someone acting on her behalf, such as her agent, is able to manage the fan interaction session on behalf of the celebrity. The agent logs into a FanDate platform to announce to the celebrity's fans that she will have a fan interaction session. The agent enters the day and time of the scheduled session.

Figure 24:
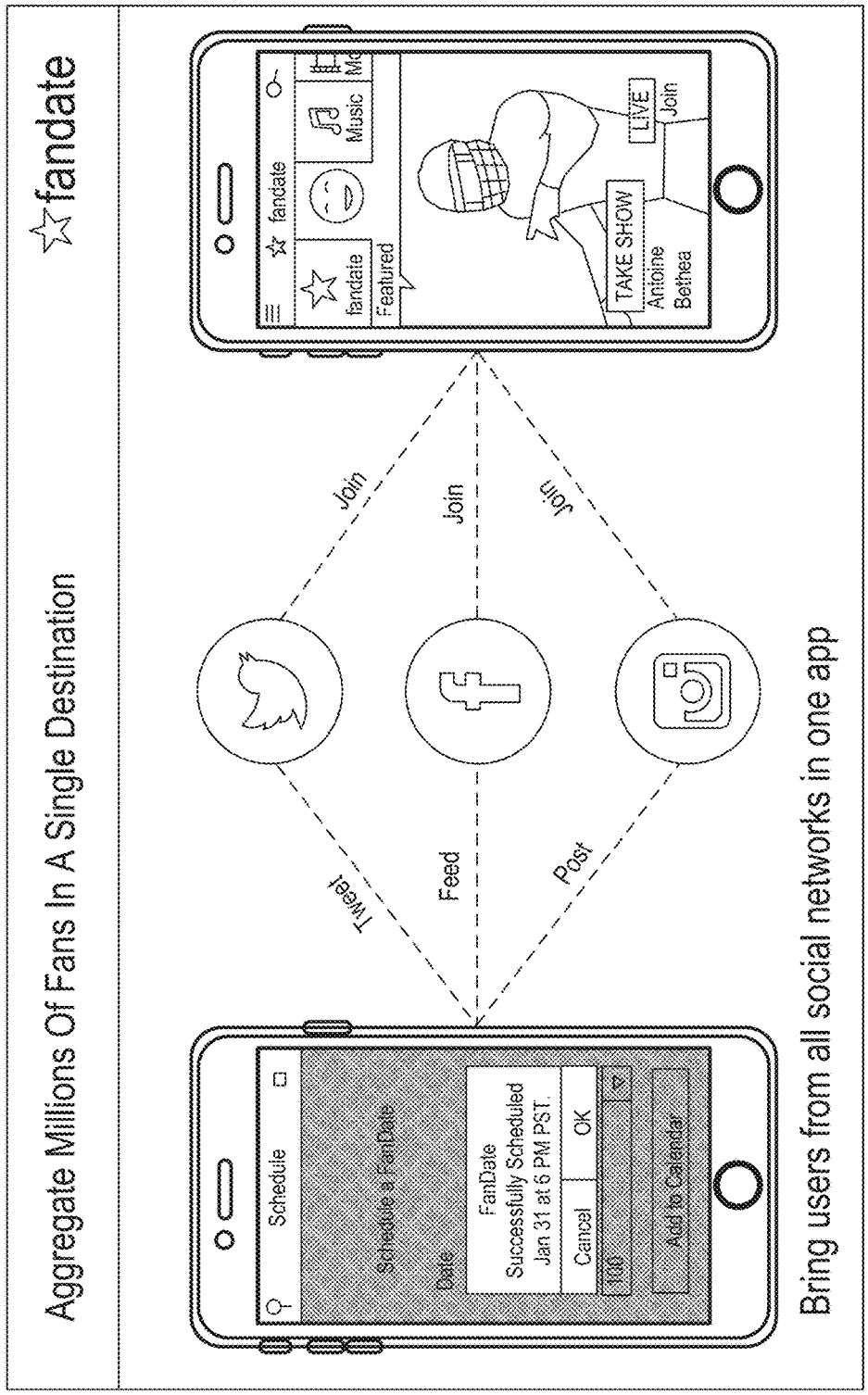
FIG. 24 shows features of a platform for streaming fan interaction sessions that enables aggregation of fans, and user interface examples.

FIG. 24 shows features of a platform for streaming fan interaction sessions that enables aggregation of fans, and user interface examples. The FanDate platform posts her announcement to various social media sites, such as the Facebook™, Instagram™, Twitter™, etc. accounts of the celebrity. The post announces the fan interaction session, and asks the celebrity's fans to submit questions for the session. The post includes a link where a fan can register for the session and submit questions.

Figure 23:
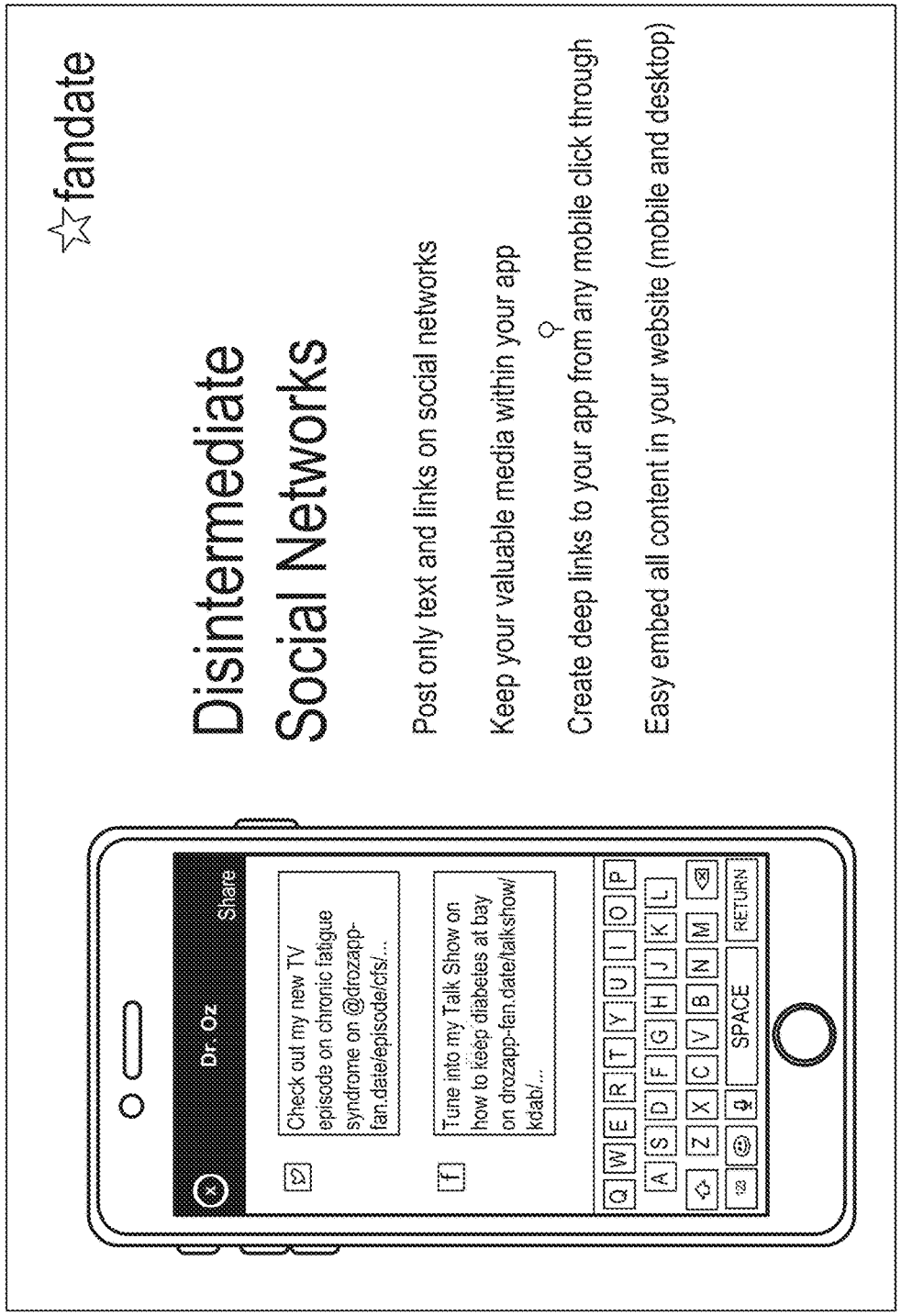
FIG. 23 shows disintermediate social network features of a platform for streaming fan interaction sessions.

FIG. 23 shows disintermediate social network features of a platform for streaming fan interaction sessions. When a fan clicks the link, he is taken outside of the social media site where the link was posted, which eliminates or disintermediates the social media site with the fan interaction session. The fan is asked whether he would like to install an application or navigate to a website to register for the fan interaction session. If the fan elects to install an application on his compute device, which can be a mobile device, a personal computer, etc., an application associated with the FanDate platform is installed and the user is prompted to create an account at the FanDate platform and to associate his cell phone number or email address with the account. If the fan elects to navigate to website, the website appears and the fan is able to create an account at the FanDate platform and to associate his cell phone number or email address with the account. The fan then logs in to his account, where he is able to register for the fan interaction session, and where he associates his cell phone number and his email address with the account. The FanDate platform provides a calendar event for the fan's calendaring tool to remind the fan of the event. The fan is also able to review questions submitted by other fans for the session, and is able to vote for those questions that he likes. The questions that receive the most fan votes rise to the top of a list of fan questions for the session.

Figure 25:
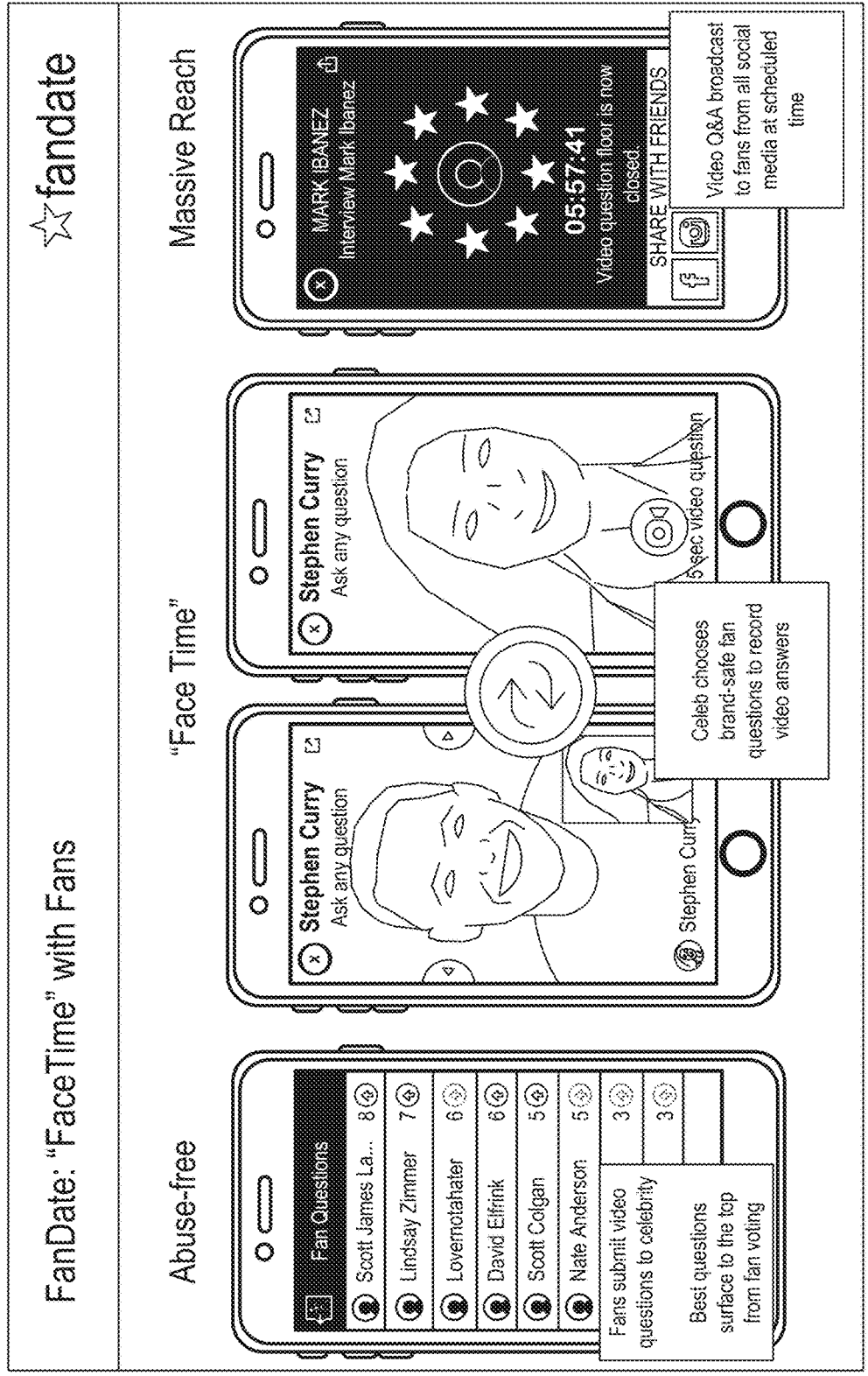
FIG. 25 shows features of a platform for streaming fan interaction sessions that enables streaming of pre-recorded sessions, and user interface examples.

FIG. 25 shows features of a platform for streaming fan interaction sessions that enables streaming of pre-recorded sessions, and user interface examples. The fan is also able to record and submit a question for the session. Because a fan who submits a question wants his question to be viewed by the celebrity, he contacts his friends and encourages them to vote for his question, not only raising his question in the list, but also generating knowledge and excitement of the celebrity's fan interaction session with his friends. The celebrity, or someone acting on her behalf, such as her agent, logs into the FanDate platform and reviews the fan submitted questions, which are sorted based on fan votes, and selects several questions for the celebrity to answer. The agent pre-screens the questions to filter out those that may damage the celebrity's reputation, and selects several for the celebrity to answer. The celebrity, at her convenience, logs into the FanDate platform and navigates to the list of questions pre-screened by her agent. The celebrity initiates a fan interaction session, but the FanDate platform reports that the network connectivity is inadequate. Because the session is not live, it is not a problem to stop the session and move to another location with better network coverage. The celebrity once again initiates the fan interaction session, and she begins to answer the pre-recorded fan questions. The fan interaction session is recorded by the FanDate platform and stored for future use. The agent logs into the FanDate platform, reviews the recorded session, determines that it is safe for release, and schedules the recorded session to be streamed at the scheduled date and time.

Figure 30:
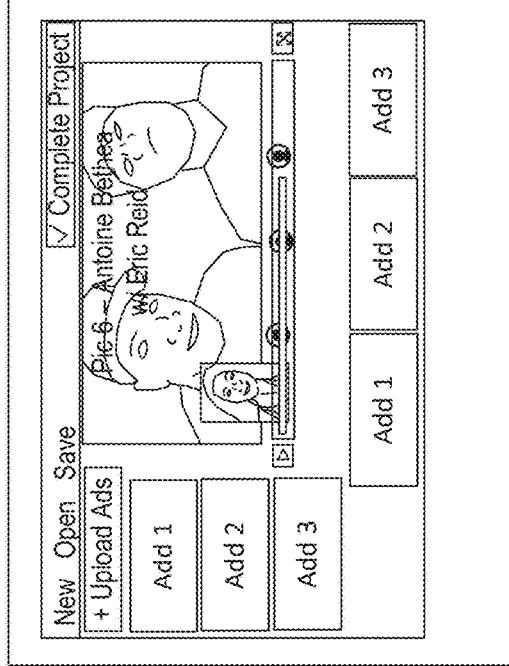
FIG. 30 shows features of a platform for streaming fan interaction sessions that enables addition of advertising to a session, and user interface examples.
Figure 30:
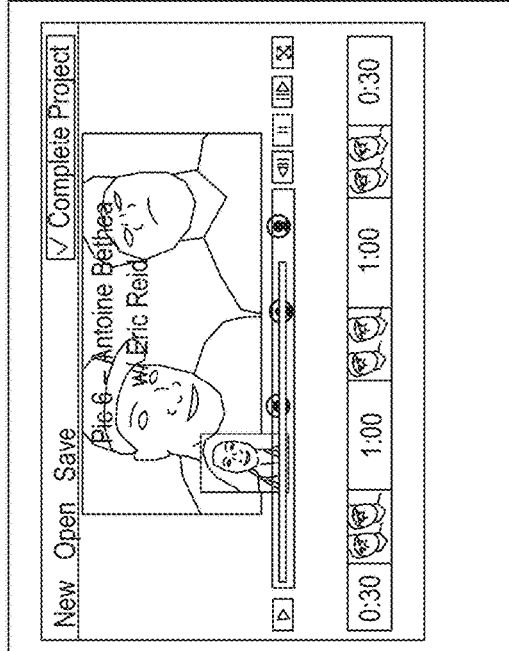

FIG. 30 shows features of a platform for streaming fan interaction sessions that enables addition of advertising to a session, and user interface examples. The agent also arranges for an advertisement to be streamed in association with the session, such as at the end of the recorded session. At certain points in time prior to the session, the FanDate platform notifies fans that have registered for the session that the session will be starting, such as by sending one or more text messages or emails to the fans, which can include sending both a text message and an email.

Figure 21:
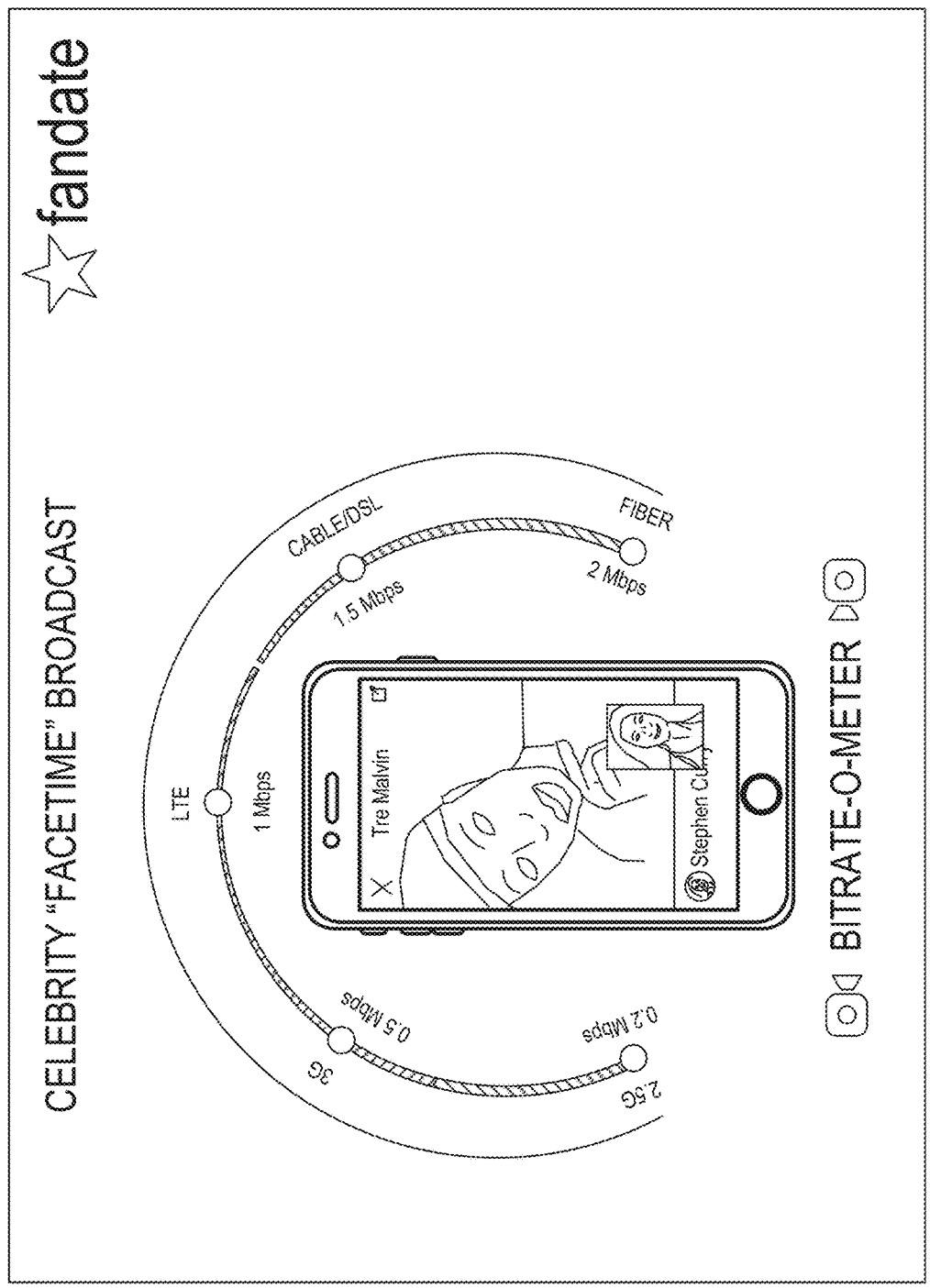
FIG. 21 shows ranges of bandwidths supported by a platform for streaming fan interaction sessions.

FIG. 21 shows ranges of bandwidths supported by a platform for streaming fan interaction sessions. At the schedule time, the pre-recorded interaction session is streamed, followed by the advertisement. The fans are under the impression that they are watching a live fan interaction session by the celebrity. The FanDate platform dynamically optimizes the video being streamed to each fan, varying the bitrate of the video streamed based on the bandwidth available to each fan. An application installed at the fan's computing device monitors available bandwidth, and sends the bandwidth data to the FanDate platform, where the FanDate platform determines the video bitrate to send based on the available bandwidth. In some embodiments, the video is dynamically adjusted, such as by varying the resolution, to achieve the desired bitrate. In other embodiments, the video has been pre-converted to various resolutions with various bitrate requirements, and the FanDate platform selects between the various resolutions to obtain video that can be effectively sent with the available bandwidth. The FanDate platform can dynamically vary the bitrate sent, such as by switching between the various video resolutions available, as the available bandwidth changes, or by dynamically optimizing/customizing the bitrate sent to each fan based on the technical capabilities of the connection to the fan's device, such as the available bandwidth. In some embodiments, the FanDate platform is able to dynamically transcode videos to support bandwidths of from 100 kilobits per second to 2 megabits per second. The FanDate platform determines/monitors video framerates as a measure of bandwidth. A frame at a particular resolution requires a particular amount of data to display, so by determining/monitoring video frame rates, a rate of transmission of video data, or bandwidth, can be determined.

Figure 28:
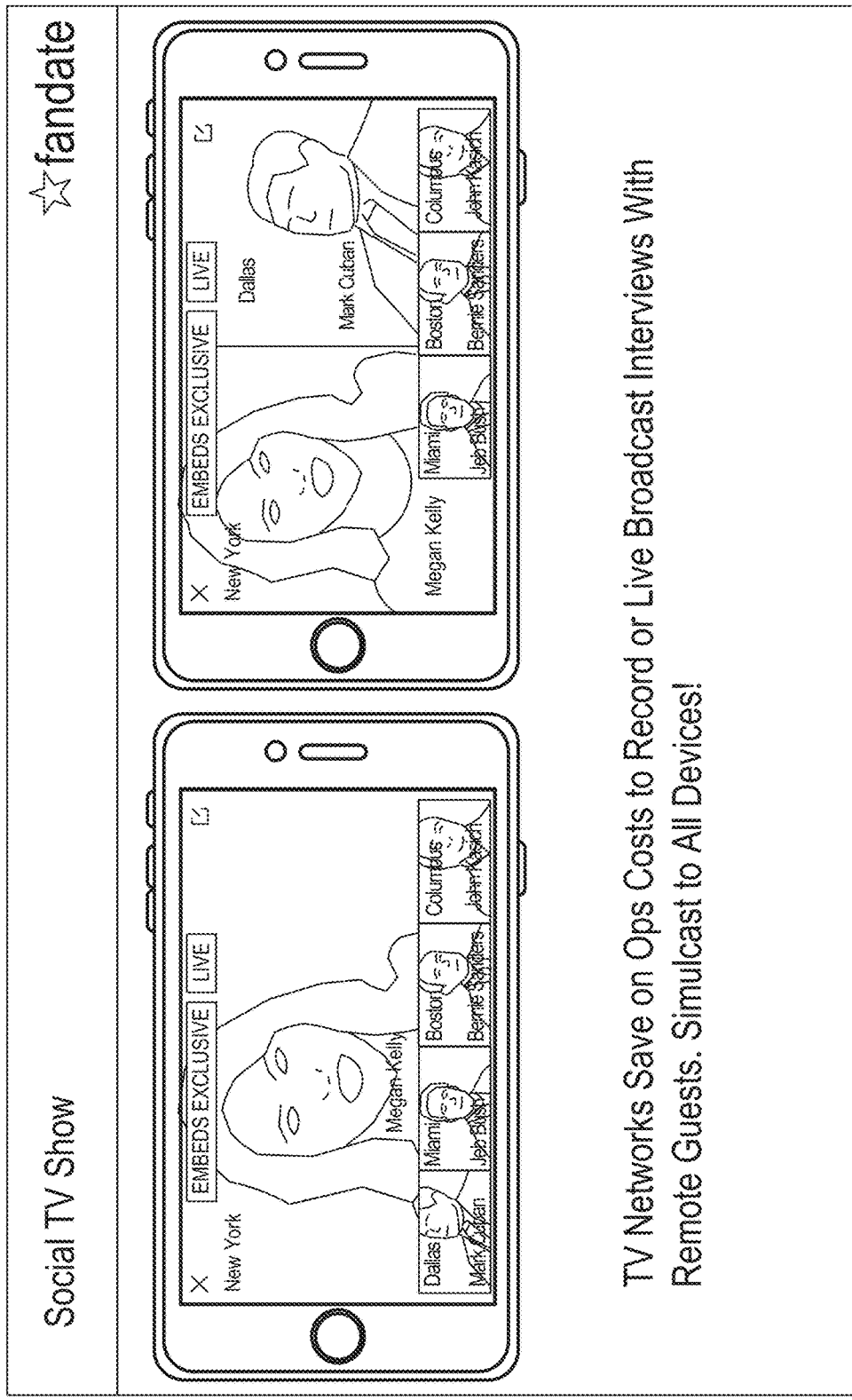
FIG. 28 shows features of a platform for streaming fan interaction sessions that enables social television shows, and user interface examples.

FIG. 28 shows features of a platform for transmitting a fan interaction session that enables a social television show, and user interface examples. In some embodiments, video transmitted by the FanDate platform, such as video for the fan interaction session, is sent to an entertainment platform, such as ABC (American Broadcasting Company), CNN, Netflix, VH1, MTV, Nick Jr., Hulu, YouTube, etc. to enable the entertainment platform to broadcast the session via their entertainment platform. The video can be streamed to the entertainment platform, or can be delivered in any of various ways. For example, the video can be encoded as mpeg4, and the mpeg4 files(s) can be transmitted to the entertainment platform. The entertainment platform can stream the video as it receives the video, or can store the video for later broadcast. The entertainment platform can cause the video to be broadcast via network television, via cable television, via the internet, or via any other available suitable medium.

Figure 27:
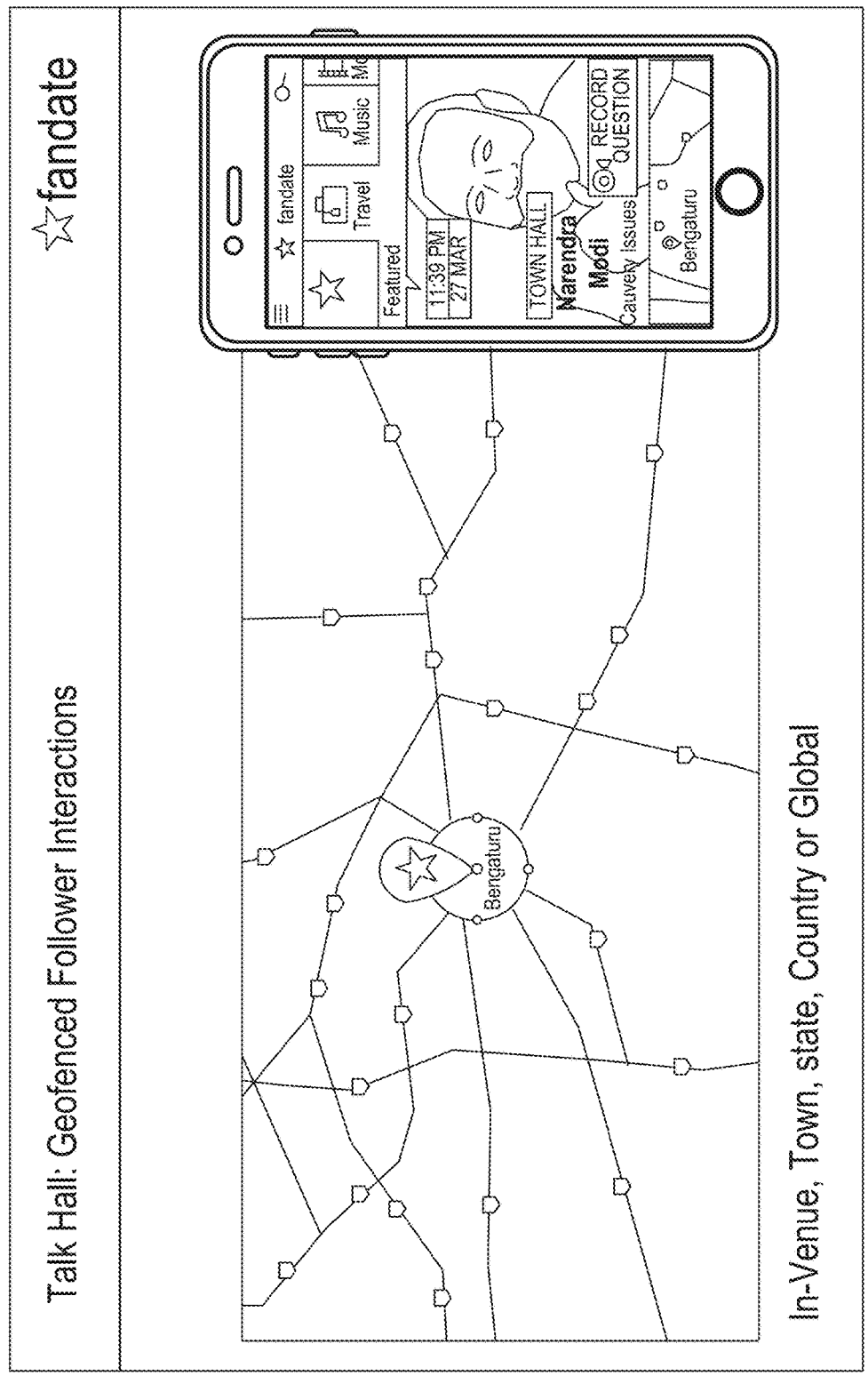
FIG. 27 shows features of a platform for streaming fan interaction sessions that enables geo-fenced follower interactions.

FIG. 27 shows features of a platform for streaming fan interaction sessions that enables geo-fenced follower interactions. In some embodiments, the FanDate platform restricts viewing to those fans within a geo-fence, which is a virtual geographic boundary, defined by a technology such as Global Positioning System (GPS) technology, Radio Frequency IDentification (RFID) technology, etc., that enables the FanDate platform to trigger a response when a mobile device enters or leaves a particular area. Fans that are determined to be within the geo-fence, such as by the platform or by a platform application installed at the fan's computing device, are enabled to join the fan interaction session, while those that are not within the geo-fence are not allowed to join the session.

Figure 29:
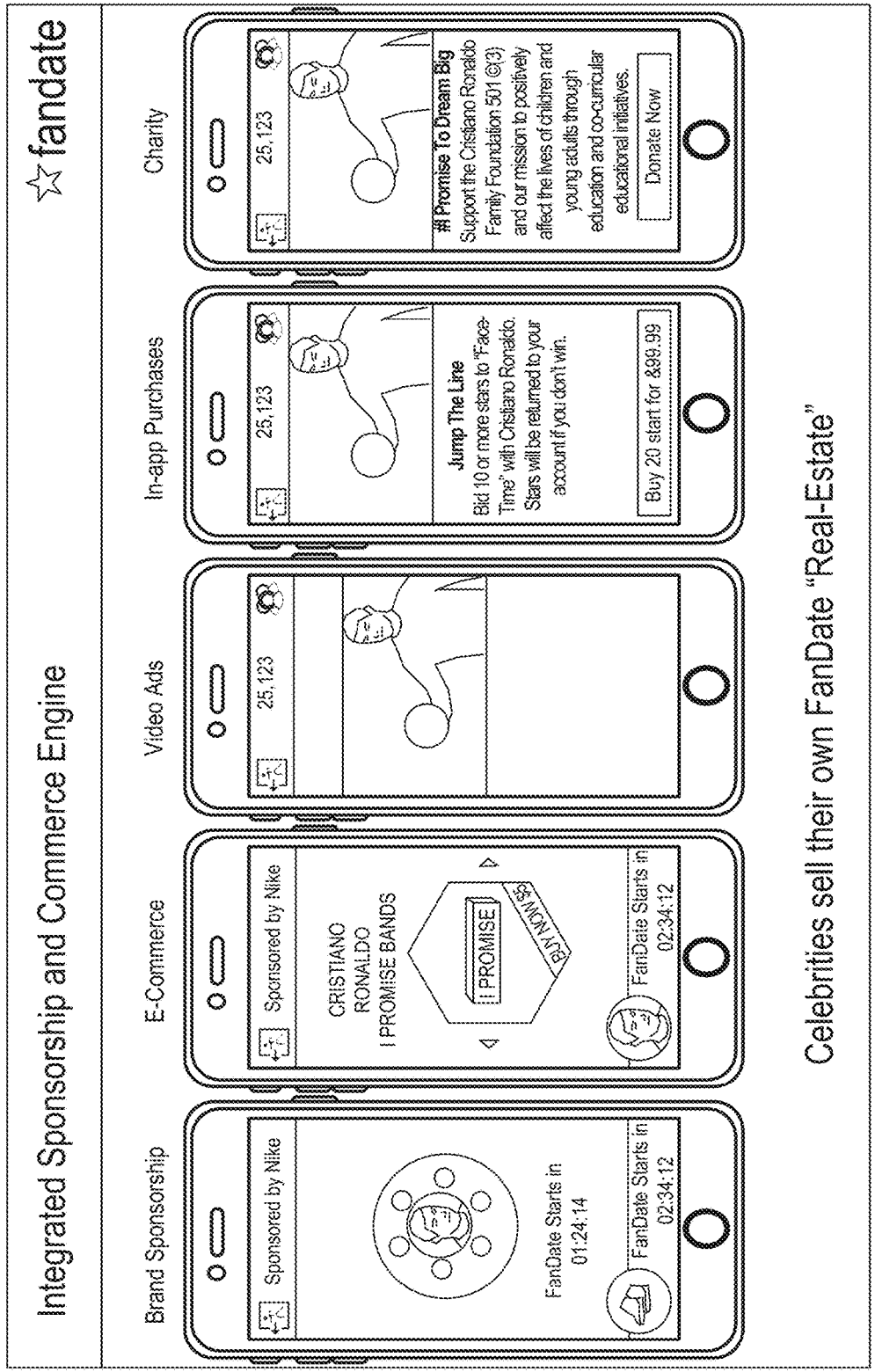
FIG. 29 shows features of a platform for streaming fan interaction sessions that enables integrated sponsorship and ecommerce, and user interface examples.

FIG. 29 shows features of a platform for streaming fan interaction sessions that enables integrated sponsorship and ecommerce, and user interface examples. At the end of the session, the fans view the advertisement and visit an ecommerce store available via the FanDate platform, where they purchase some products offered by the celebrity. The fans leave the session quite happy about their experience, as well as their purchase. The celebrity is also quite happy after the session because, rather than having to appear live at the scheduled time, she was able to record a session that would seem live to her fans when broadcast, and could do so at her convenience and without the risk of embarrassing herself during a true live broadcast. The celebrity is further happy because she was able to disintermediate from a social media site, which enabled her, rather than the social media site, to profit from her fan interactions. She is able to generate revenue based on the advertisement that was added at the end of the session, and based on her ecommerce sales.

Figure 31:
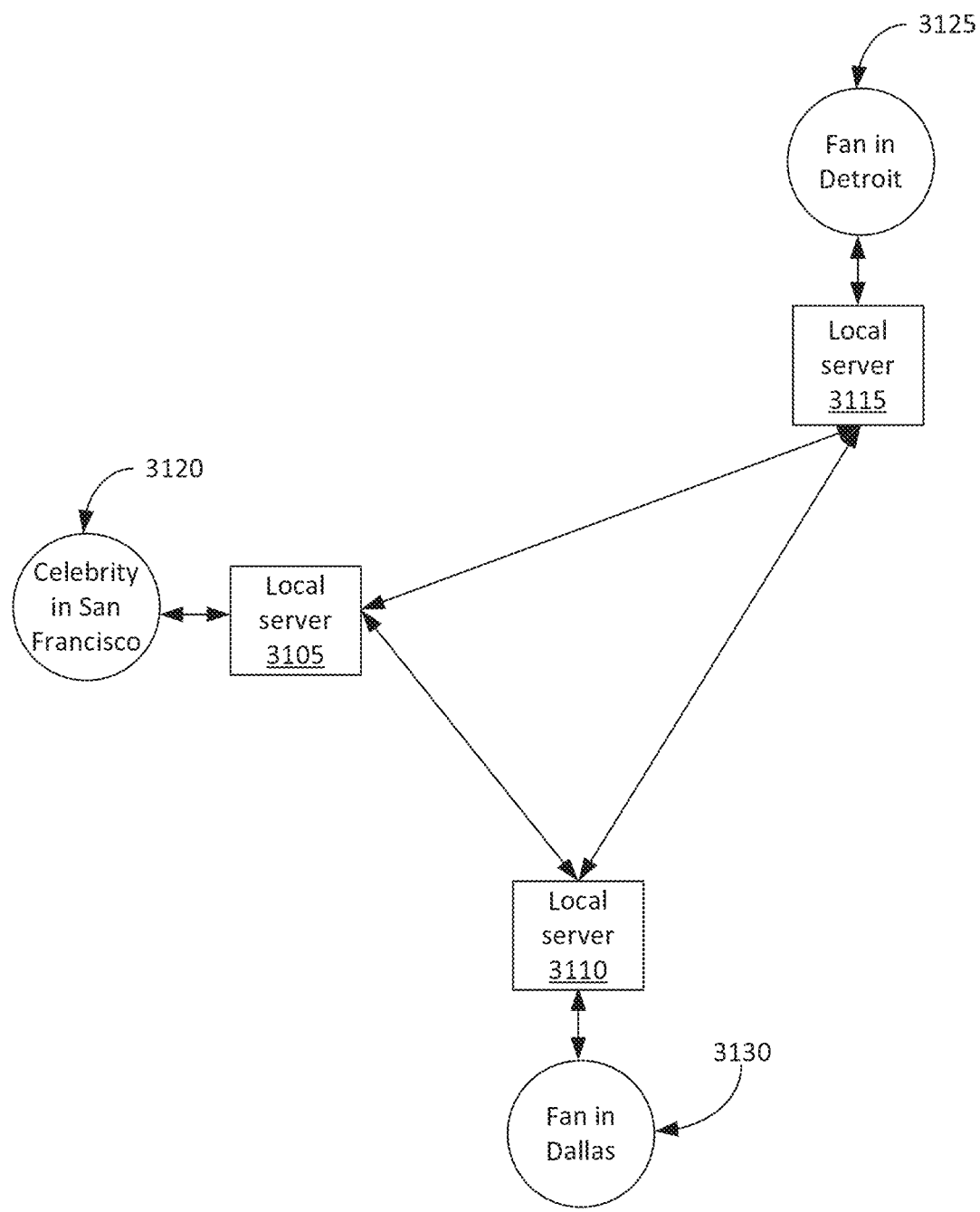
FIG. 31 is a generalized block diagram illustrating the architecture of a platform (in some cases a "FanDate platform") that facilitates distribution of a fan interaction session to participants (in some cases, "fans")

FIG. 31 is a generalized block diagram illustrating the architecture of a platform (in some cases a "FanDate platform") that facilitates distribution of a fan interaction session to participants (in some cases, "fans"). In embodiments where the fan interaction session is pre-recorded, the recording can be pre-distributed to local servers prior to the session. For example, celebrity 3120 is located in San Francisco, and she pre-records her fan interaction session, which is stored at local server 3105, which is local to celebrity 3120. The FanDate platform, such as via an application that executes at the computing device of celebrity 3120, determines the location of the computing device, such as via GPS or another location technology. The platform determines that local server 3105 is the server closest to celebrity 3102, and establishes a communication channel between local server 3105 and the computing device of celebrity 3120. As celebrity 3120 records her session, the video is streamed to local server 3105, where the video is stored for future broadcast. Any or all of servers 3105-3115 can be cloud servers, such as those offered by Amazon Web Services™ (AWS).

After the agent reviews the video and directs the FanDate platform to use the video for the scheduled fan interaction session, the FanDate platform pre-populates the video at local servers distributed thought a geographic area, such as the United States. The FanDate platform caches the video at local server 3115 and local server 3110 in preparation for the fan interaction session. As each fan logs into the system for the fan interaction session, the FanDate platform, such as via an application that executes at the computing devices of the fans, determines a location of each device, and identifies which server is closest to each device. For example, the FanDate platform determines that fan 3130 is located near local server 3110, and that fan 3125 is near local server 3115. Rather than streaming the video for the session from a single location, each local server streams the video to all the fans that are determined to be located near that server. For example, the video is cached at local server 3110, and local server 3110 streams the locally caches video to fan 3130. The video is also cached at local server 3115, and local server 3115 streams its locally cached copy of the video to fan 3125.

Participant Selection Mechanism—in a Live Streamed Social Media Session

FIG. 20 shows features of a platform for monetizing streaming fan interaction sessions. The fan interaction sessions can be live or can be pre-recorded. In an embodiment where the fan interaction session is live, the FanDate platform enables a communicator, such as a celebrity, to select a participant, such as a fan, to interact with during a live streamed social media session. In order to avoid embarrassing fan interaction sessions, celebrities and other communicators desire to interact with "safe" audience members during an interactive live streaming session.

For some celebrities a "safe" audience member is a participant in the live streamed social media session 1) whose hardware and environment have adequate technical capabilities, such as a network connection bandwidth above a predetermined threshold, a network bandwidth that can support a predetermined frame rate, a certain version of an application or operating system installed, a camera resolution above a predetermined threshold, communication latency below a predetermined threshold, etc., 2) who is from or not from a certain geographic area or areas, 3) who plans to ask a question that will not damage the celebrity's brand or reputation, 4) who is not abusive, and 5) who is not fake. Other celebrities have different requirements for an audience member being deemed a "safe" audience member, such as any of the five preceding requirements, or some other requirements.

FIG. 22 shows session management features of a platform for streaming fan interaction sessions. In an example, a person, such as a celebrity, the celebrity's agent, etc., logs into a FanDate platform to announce to the celebrity's fans that she will have a fan interaction session at a predetermined time on a predetermined date. The agent enters the day and time of the scheduled session.

FIG. 24 shows features of a platform for streaming fan interaction sessions that enables aggregation of fans, and user interface examples. The FanDate platform posts the celebrity's announcement to various social media sites, such as the Facebook™, Instagram™ Twitter™, etc. accounts of the celebrity. The post announces the fan interaction session, and asks the celebrity's fans to register for the session. The post includes a link where a fan can register for the session.

FIG. 23 shows disintermediate social network features of a platform for streaming fan interaction sessions. When a fan clicks the link, he is taken outside of the social media site where the link was posted, which eliminates or disintermediates the social media site with the fan interaction session. The fan is asked whether he would like to install an application or navigate to a website to register for the fan interaction session. If the fan elects to install an application on his compute device, which can be a mobile device, a personal computer, etc., the application is installed and the user is prompted to create an account at the FanDate platform and to associate his cell phone number, email address, etc., with the account. If the fan elects to navigate to website, the website appears and the fan is able to create an account at the FanDate platform and to associate his cell phone number, email address, etc. with the account. The fan then logs in to his account, where he is able to register for the fan interaction session. The FanDate platform provides a calendar event for the fan's calendar tool to remind the fan of the session.

At certain times prior to the scheduled fan interaction session, the FanDate platform notifies fans that have registered for the session of the start time of the session, such as by sending a text message or email. The celebrity and the celebrity's agent log into the FanDate platform just before the scheduled day and time, and prepare for the fan interaction session. The celebrity or the agent tap or select a pre-check icon, and the FanDate platform performs certain technical checks, such as checking that the network connectivity to the celebrity's device is adequate to support live streaming. At the predetermined time, the celebrity initiates the session via the FanDate platform. About 100,000 fans join the session.

FIG. 21 shows ranges of bandwidths supported by a platform for streaming fan interaction sessions. As the FanDate platform streams video to the fans, the FanDate platform dynamically optimizes the video being streamed to each fan, varying the bitrate of the video streamed based on the bandwidth available to each fan. An application installed at each fan's computing device monitors available bandwidth, and sends the bandwidth data to the FanDate platform, where the FanDate platform determines the video bitrate to send based on the available bandwidth. In some embodiments, the video is dynamically adjusted, such as by varying the resolution, to achieve the desired bitrate. The FanDate platform can dynamically vary the bitrate sent, by dynamically optimizing/customizing the bitrate sent to each fan based on the technical capabilities of the connection to the fan's device, such as the available bandwidth.

FIG. 26 shows features of a platform for streaming fan interaction session that enables live video face-to-face sessions, and user interface examples. The celebrity begins to talk and she invites her fans to submit questions, and about 1,000 fans do so. Before the celebrity is ready to interact with her fans, the FanDate platform evaluates these 1,000 fans to determine which are "safe." As part of this evaluation, the platform evaluates the connectivity bandwidth to the device of each of these 1,000 fans, and filters out those with inadequate connectivity bandwidth, evaluates the version of a FanDate application installed at the device, and filters out those with obsolete versions, etc. The FanDate platform checks the behavior history of these fans to filter out those who have any past history of misbehavior. The FanDate platform determines the location of these fans, such as via the fans' profiles, by doing a reverse Internet Protocol (IP) address lookup, etc., and filters out those fans that do not meet the geographic restrictions. The FanDate platform evaluates whether these fans are real, such as by inspecting the fans' Facebook, Twitter, or Instagram accounts, and filters out those that the evaluation indicates may be fake.

When the celebrity is ready to interact with her fans, she or her agent tap or select an icon on their device, and a pre-screened set of fans, such as 20 fans, are selected that best meet the "safe" criteria. The 20 users are each notified that they have been selected, and the first that respond by tapping an icon on their smartphones are presented to the celebrity or the agent, such as the first 5 that respond. The celebrity or the agent quickly reviews the fans' 5 questions, in some cases views how the fans appear, and selects one of the fans to talk to the celebrity. An interactive session is initiated between the celebrity and the selected fan, with all 100,000 audience members being able to see the video of the celebrity with a video of the fan embedded as a picture in a picture, side by side, etc. The fan asks his question, and the celebrity responds.

The celebrity indicates that she is ready for a second question and the celebrity or her agent select an icon on their smartphone or computer, and a second set of 20 fans are selected that best meet the "safe" criteria. The 20 users are each notified that they have been selected, and the first 5 that respond by tapping an icon on their phones are presented to the celebrity or the agent. The celebrity or the agent quickly reviews the fans' 5 questions, in some cases views how the fans appear, and selects one of the fans to talk to the celebrity. The fan starts to exhibit a behavioral issue, so the celebrity or the agent selects an icon and the fan is disconnected from the interactive session. The fan's bad behavior incident is associated with the fan's profile at the FanDate platform, so the fan will not be selected for any future interactive sessions. In some embodiments, the FanDate platform has a broadcast delay, which can be any arbitrary amount, such as seven seconds. In such an embodiment, when the celebrity or the agent selects the icon that disconnects the bad behaving fan, the previous seven seconds of buffered video are not streamed, so no audience members see the fan's bad behavior.

FIG. 28 shows features of a platform for transmitting a fan interaction session that enables a social television show, and user interface examples. In some embodiments, video transmitted by the FanDate platform, such as video for the fan interaction session, is sent to an entertainment platform to enable the entertainment platform to broadcast the session. The entertainment platform can stream the video as it receives the video, or can store the video for later broadcast. The entertainment platform can cause the video to be broadcast via network television, via cable television, via the internet, or via any other available suitable medium.

FIG. 27 shows features of a platform for streaming fan interaction sessions that enables geo-fenced follower interactions. In some embodiments, the FanDate platform restricts viewing to those fans within a geo-fence. Fans that are determined to be within the geo-fence are enabled to join the fan interaction session, while those that are not within the geo-fence are not allowed to join the session.

FIG. 30 shows features of a platform for streaming fan interaction sessions that enables addition of advertising to a session, and user interface examples. The agent via the FanDate platform has pre-selected an advertisement to play at the end of the fan interaction session. FIG. 29 shows features of a platform for streaming fan interaction sessions that enables integrated sponsorship and ecommerce, and user interface examples. At the end of the session, the fans view the advertisement and visit an ecommerce store available via the FanDate platform, where they purchase some products offered by the celebrity. The fans leave the session quite happy about their experience, as well as their purchase. The celebrity is also happy because she only had a minor fan behavior issue, and she was able to quickly disconnect the bad behaving fan and continue with the session without the fans being exposed to the misbehavior, thereby helping to protect her brand. The celebrity is further happy because she was able to disintermediate from a social media site, which enabled her, rather than the social media site, to profit from her fan interactions. She is able to generate revenue based on the advertisement that was added at the end of the session, and based on her ecommerce sales.

FIG. 31 is a generalized block diagram illustrating the architecture of a platform (in some cases a "FanDate platform") that facilitates transmission of a fan interaction session to participants (in some cases, "fans"). In an embodiment where the fan interaction session is a live streaming session, the live streaming session is streamed from the smartphone of celebrity 3120, who is located in San Francisco. For example, celebrity 3120 is located in San Francisco. The FanDate platform, such as via an application that executes at the computing device of celebrity 3120, determines the location of the computing device, such as via GPS or another location technology. The FanDate platform determines that local server 3105 is the server closest to celebrity 3120, and establishes a communication channel between local server 3105 and the computing device of celebrity 3120. As celebrity 3120 records her session, the video is streamed from her smartphone to local server 3105. From local server 3105, the video is streamed to servers located throughout the geographic area of the broadcast, such as local server 3115 for fans in the Detroit area, and local server 3110 for fans in the Dallas area. Any or all of servers 3105-3115 can be cloud servers, such as those offered by Amazon Web Services (AWS).

As each fan logs into the system for the fan interaction session, the FanDate platform, such as via an application that executes at the computing devices of the fans, determines a location of each device, and identifies which server is closest to each device. For example, the FanDate platform determines that fan 3130 is located near local server 3110, and that fan 3125 is near local server 3115. As local server 3105 streams the video, local servers 3115 and 3110 receive the stream, and, in turn, stream to those fans that each local server supports, with each local server dynamically optimizing the video sent to each fan device, as previously discussed.

At the point in the fan interaction session where a fan is selected to interact with the celebrity, the FanDate platform faces a synchronization challenge (in addition to the typical challenge of synchronizing audio and video when streaming a video). The FanDate platform now needs to synchronize two video streams, the stream from the celebrity's device and the stream from the fan's device. When the FanDate platform initiates the stream from the device of fan 3130 to the device of celebrity 3120, the device of fan 3130 streams the video to local server 3110. Prior to streaming video from the fan, the FanDate platform, such as via an application that executes at the device of fan 3130, determines certain technical capabilities of the environment of the device of fan 3130, such as the technical features of his device, the network connectivity capabilities between his device and local server 3110, etc. As the device of fan 3130 streams the video, the application sends various information with the stream to assist with synchronization, such as timestamp information. The stream from the device of fan 3130 to local server 3110 is dynamically optimized, similar to the dynamic optimization of video from the local servers to each fan device.

In order to facilitate real time streaming of multiple streams, the FanDate platform transmits the stream with little or no latency, such as by avoiding latency caused by buffering or caching the streamed data. In some embodiments, the FanDate platform utilizes raw transmission control protocol (TCP) to avoid latency. A problem with TCP is that packets comprise a block of data, which can be, for example, 1 kilo byte in size. This block size creates buffering delay, which can be, e.g., in the 5 to 8 second range, depending on the quality of the network. By utilizing technology that enables the FanDate platform to stream with little or no latency, such as utilizing raw TCP, the FanDate platform can transcode and send the video in real time, with little or no buffering or caching happening.

The raw TCP data is received by local server 3105, which forwards the data to the device of celebrity 3120. An application associated with the FanDate platform executing at the device of the celebrity receives the video streamed by the device of fan 3130, and synchronizes the received video with the video captured by the device of celebrity 3120. After synchronizing the two video streams, the application displays the two streams so that the celebrity can see her interaction with her fan on her device. Local server 3105 further streams the two video streams to local servers 3110 and 3115, which in turn stream the video streams to the fan devices that each local server supports. Applications associated with the FanDate platform installed at each fan device synchronize the video streams, and display the streams for the fans to view, such that the fans and the celebrity are all seeing a properly synchronized interactive discussion between the fan and the celebrity.

Broadcasting Streamed Media

In the example of the discussion of FIG. 20, the fan interaction session can be simulcast by an entertainment platform, such as a broadcast television network. In the example, when the FanDate platform announces the celebrity's fan interaction session to various social media sites, a broadcast network decides to contact the celebrity's agent and to request permission to broadcast the social media session to its audience. The agent closes a deal with the broadcast network whereby the network has the rights to both simulcast the social media session to the broadcast network's television viewers, as well as to replay the social media session at later times to the network's viewers.

At the designated time, an authorized person, such as the celebrity, the celebrity's manager, etc., initiates the fan interaction session via a streaming platform, such as a FanDate platform. When the streaming platform streams the social media session to those who registered for the session, the streaming platform further sends video of the social media session to the broadcast network, where the broadcast network simulcasts the social media session to its television viewers via its broadcast network. The streaming platform converts the streaming video to a format compatible with the broadcast network, such as mpeg4, and sends the mpeg4 to the broadcast network. The broadcast network transmits the received video to its television viewers via its broadcast network. In some instances the received video is transmitted as a full screen view, and in other instances as a picture in a picture view, such as when a network commentator in the main picture is commenting on the social media broadcast, which appears as a picture in a picture.

While the above example relates to a celebrity fan interaction session, the technique can be applied to any of various social media sessions that include streaming video. For example, a voter attending a political rally broadcasts via a streaming platform an altercation taking place at the rally. The streaming platform converts the streaming video to a format compatible with a broadcast network, and sends the converted video to the broadcast network for simulcast, or for later broadcast. In another example, a member of the public broadcasts via a streaming platform a view of a building hit by a tornado. The streaming platform converts the streaming video to a format compatible with a broadcast network, and sends the converted video to the broadcast network for simulcast.

Social Media Town Hall Session

In an example, a politician plans a social media town hall session to interact with constituents from a particular community. An authorized user, such as the politician, the politician's assistant, etc., logs into a streaming platform, such as a FanDate platform, and uses the platform to announce the town hall meeting via various social media sites. The politician intends that the town hall meeting be for constituents of a particular geographic area, and he wants to limit questions to people in a particular portion of that geographic area. The authorized user sets up a first geo-fence to restrict access to the social media town hall session to people who are located within the boundary of the first geo-fence, and sets up a second geo-fence to allow people within the boundary of the second geo-fence to ask questions at the town hall session. A geo-fence can align with the boundary of a particular voting district or a particular city, with the boundary of a circle whose center is the center of a city and whose radius is ten miles, etc.

In some embodiments, the FanDate platform includes features similar to the platform of "Participant selection mechanism—in a live streamed social media session." For example, in some embodiments, the platform assists in selecting a constituent who is determined to be "safe." When the politician announces his town hall session via the platform, he asks constituents that would like to attend to register for the town hall session. At a predetermined time before the pre-announced time, the FanDate platform notifies constituents that have registered for the session that the session will be starting at the pre-announced time. The politician logs into the platform and prepares for the town hall session. At the designated time, the politician initiates the session via the platform. About 1,000 constituents are able to join the session, as they are within the first geo-fence, and another 100 fans are able to submit a question, as they are within the second geo-fence. Those that are not within either geo-fence are not able to join the town hall session.

The politician begins to talk and, before the politician is ready to interact with his constituents, the FanDate platform evaluates these 100 constituents to determine which are "safe." In some embodiments, there is no pre-screening of constituents to determine whether any are "safe," and the politician selects constituents at random. The FanDate platform checks the behavior history of these constituents to filter out those who have any past history of misbehavior. The FanDate platform evaluates whether these constituents are real, such as by inspecting the constituents' Facebook, Twitter, or Instagram accounts, and filters out those that the inspection indicates may be fake. Voting, similar to fan voting of fan questions, can be used to bubble those fan questions with the most fan votes to a list of questions.

When the politician is ready to interact with his constituents, he or his assistance tap or select an icon on their device, and a pre-screened set of 10 constituents are selected that best meet the "safe" criteria, or who have the most popular questions, etc. The 10 constituents are each notified that they have been selected, and the first 3 that respond by tapping an icon on their phones are presented to the politician or his assistance. The politician or his assistance quickly reviews their 3 questions, and selects one of the constituents to talk to the politician. An interactive session is initiated between the politician and the selected constituent, with all 1,000 audience members being able to see the video of the politician with a video of the constituent embedded as a picture in a picture, side by side, etc. The constituent asks his question, and the politician responds.

In some embodiments, the questions for the politician to answer are pre-recorded are selected prior to the initiation of the town hall session.

Social Television Show

In an example, an entertainment platform, such as a broadcast television network, plans to do a show with a host and four remote participants, one in Boston, one in Chicago, one in Dallas, and one in San Francisco. In the past, the network had to send a broadcast crew to each site, some of the crew being to perform the interview at each site, and some being for technical/logistics support of the interview. Utilizing a platform that can stream video over the Internet, such as Facebook Live, a FanDate platform, etc., each participant and the host use a streaming device, such as a smartphone, a laptop computer, etc., to capture video, such as video of themselves talking, of a car crash site, of a political event, etc. The FanDate platform receives all five video streams and creates video of a session where the host interacts with the other participants. Utilizing features similar to those previously discussed, such as those related to live streamed social media sessions, the host can select a participant to interact with, such as by tapping an icon on a mobile device, which causes the host and the participant to appear side by side in the session video. The host can add all the participants to the session. Utilizing features previously discussed, such as features related to synchronizing multiple streams of video data, the FanDate platform combines all five streams and displays them all in the session video. The FanDate platform encodes the session in a format compatible with the entertainment platform, such as mpeg4, and sends the mpeg4 to the entertainment platform, where the platform broadcasts the session video to its viewers. For example, CNN can receive the mpeg4 data that contains the session video, and can broadcast that video to its viewers, or can save the mpeg4 data for later broadcast.

The host or another person have full control over the social media session. For example, the host, her producer, etc., using a mobile device, can identify which of the participants to display in the session video, can mute one or more of the participants, can determine the style of the display (e.g., side by side, picture in a picture, etc.), etc. The host can bring in live viewers, who register with the FanDate platform, and can have those live viewers interact with one or more of the participants. The host can ensure that the viewer is a "safe" viewer by utilizing previously discussed features.

Vydeo Call™

Figure 32:
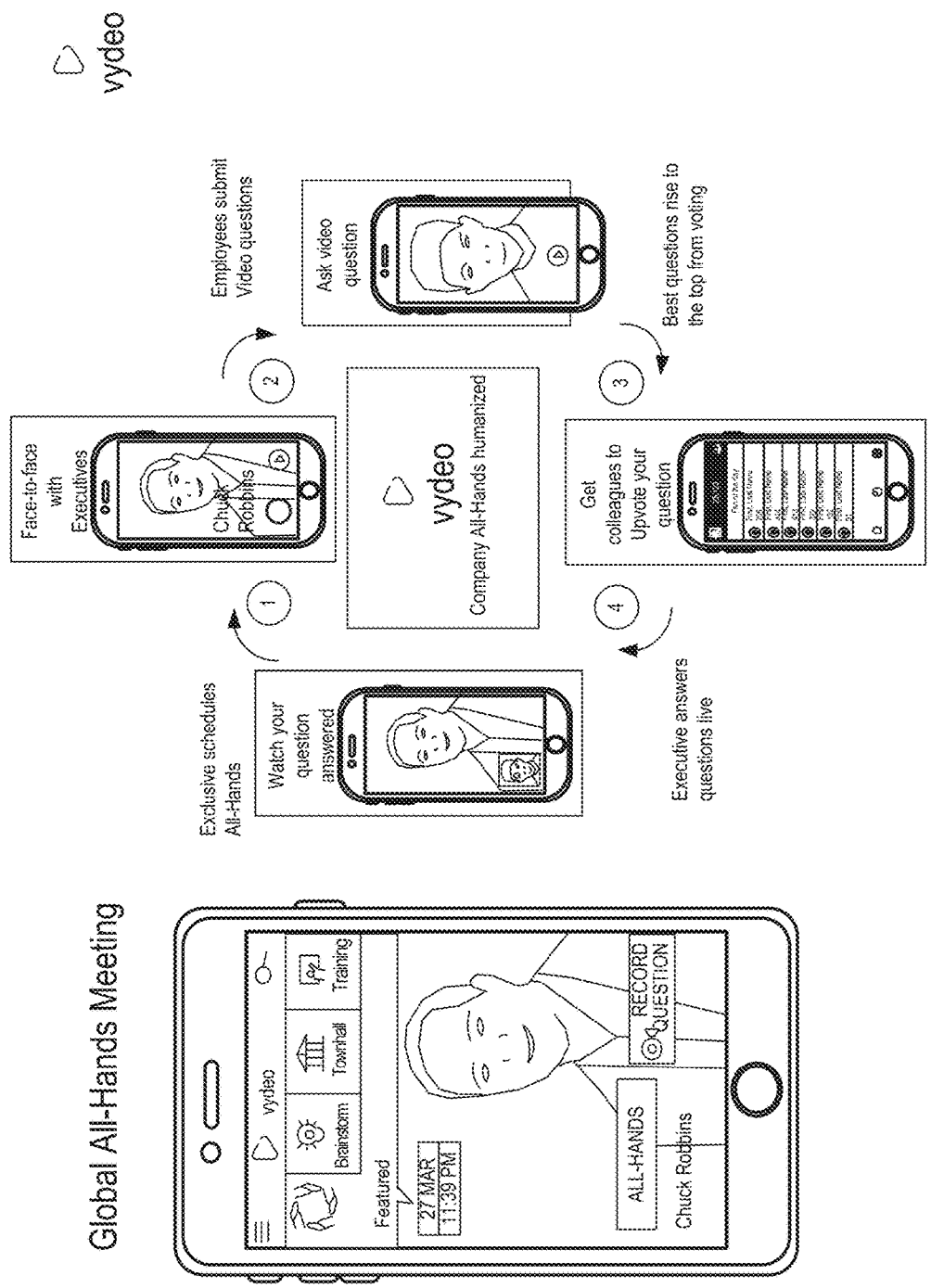
FIG. 32 shows a sequence of example user interfaces from an all-hands meeting.

Introduced here is technology and a platform for enterprise collaboration. In an example, an assistant to a CEO uses a platform for streaming video over a corporate network, which may include streaming over the internet, to arrange for an all hands streaming session. In this example, an all hands streaming session is a streaming version of an all hands meeting. The platform can be a FanDate platform, and can support enterprise infrastructure, such as Cisco 256 bit authentication, the Cisco Spark platform, an enterprise security environment, etc. The all hands streaming session of this example is a global all-hands meeting, and includes employees from several countries. FIG. 32 shows a sequence of example user interfaces from an all-hands meeting. Utilizing features similar to those previously discussed, such as those related to live streamed social media sessions, the assistant schedules and announces the streaming all hands meeting. The meeting can be announces via emails to employees, internal web pages, internal social media platforms, such as a company blog, etc. The assistant initiates the all hands streaming session, and the employees join the session.

The CEO greets the employees and starts with a presentation, which is streamed via the platform to all the employees that have joined the streaming all hands session. The CEO invites the employees to submit questions, and the employees, using a computer, such as a mobile device, record their questions. The CEO or the assistant select an employee question. The selection of the employee can utilize some or all of the features that enable a celebrity to select a "safe" audience member during a fan interaction session. The selection of the question can utilize some or all of the features of fans voting on celebrity questions, such that the most popular questions rise to the top of the question queue. The assistant selects an employee from India, and the employee's recorded question appears in the streaming all hands session such that all employees can see the question. The CEO answers the question, and then initiates a live-chat with the employee, and the CEO and the employee have an interactive conversation, which all the employees can see in the streaming session.

Figure 34:
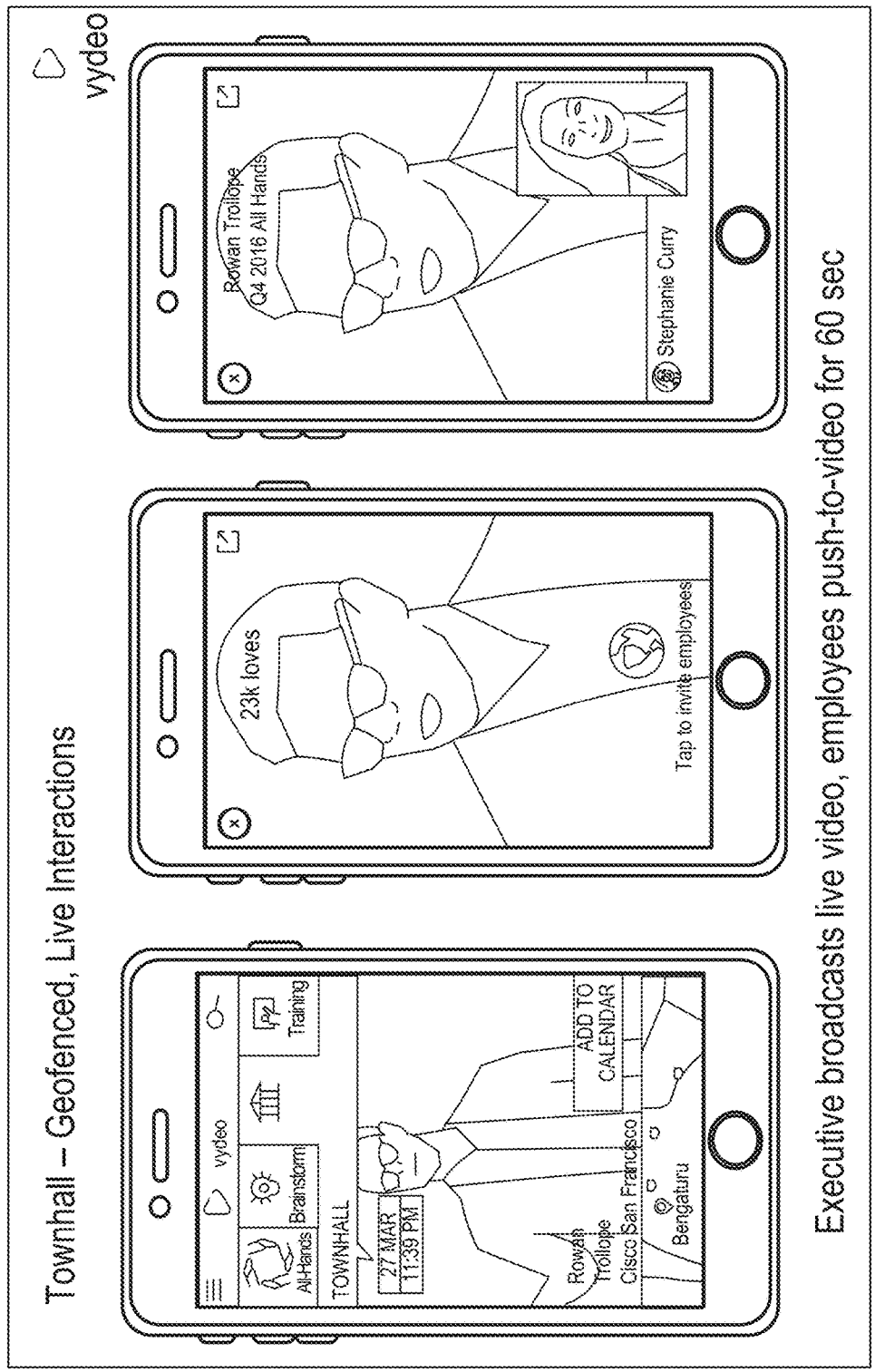
FIG. 34 shows a sequence of screen views of an example geo-fenced, live town hall meeting.
Figure 35:
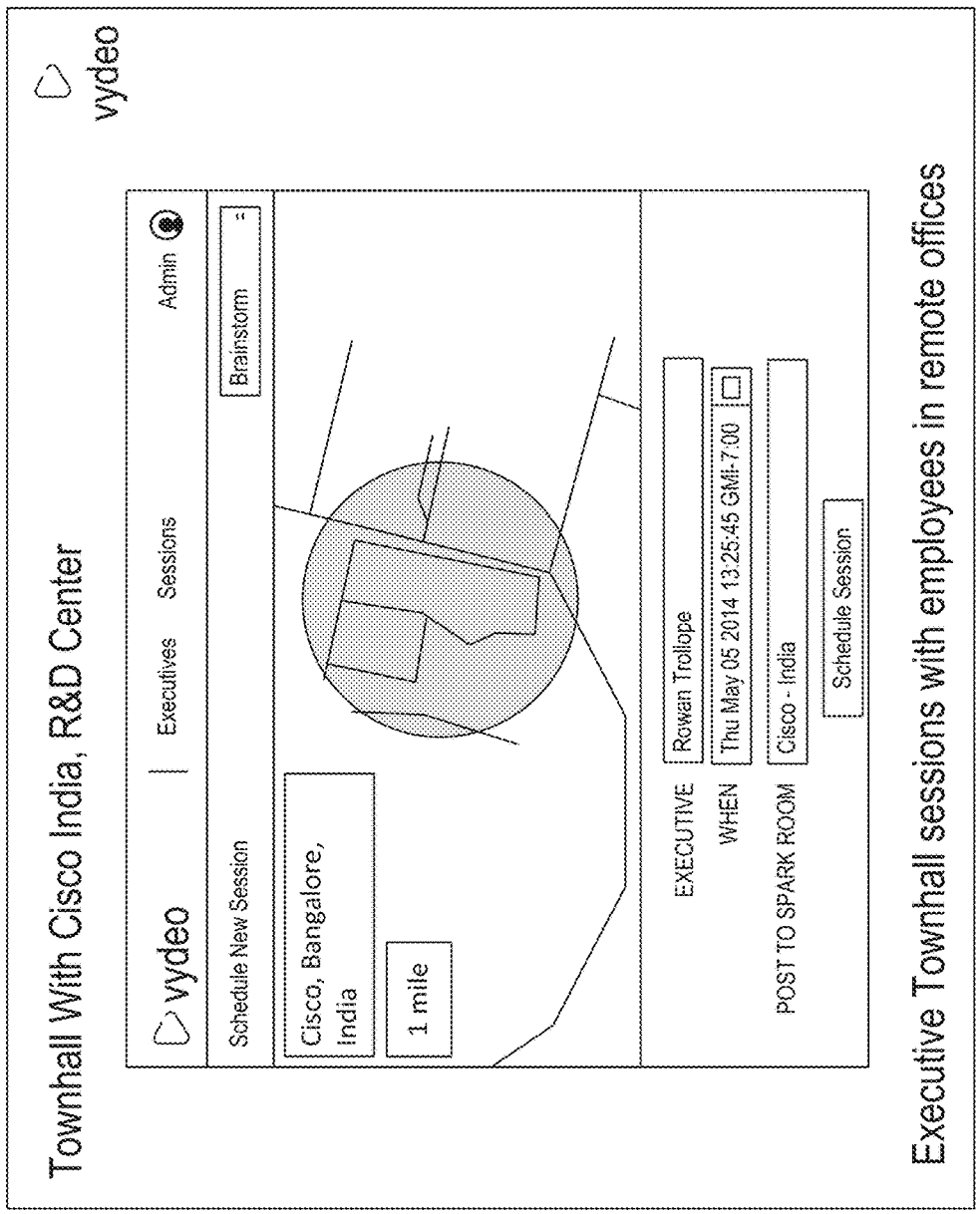
FIG. 35 shows an example user interface illustrating a geo-fence for a town hall meeting.

FIG. 34 shows a sequence of screen views of an example geo-fenced, live town hall meeting. In an example, the CEO wants to have a local all hands/town hall session. The CEO intends that the all hands/town hall meeting be for employees of a particular geographic area, and he wants to limit questions to employees in a particular portion of that geographic area. The CEO's assistant sets up a first geo-fence to restrict access to the social media town hall session to people who are located within the boundary of the first geo-fence, and sets up a second geo-fence to allow people within the boundary of the second geo-fence to ask questions at the town hall session. FIG. 35 shows an example user interface illustrating a geo-fence for an all hands/town hall meeting.

In another example, a manager of a geographically distributed group wants to host a brain storming session. Utilizing the platform, the manager sets up the brainstorm session. FIG. 33 shows a user interface for selecting participants for a brain storming session. The manager uses the user interface to select those employees that he wants to attend the brainstorm session. The manager uses his mobile device to initiate the brainstorm session, and the selected participants are able to join the session. All participants can hear each other, and the manager can selectively show the video taken by the various participant's mobile devices, such as video of the participant speaking, video of a white board drawing that the participant is making, etc.

Figure 36:
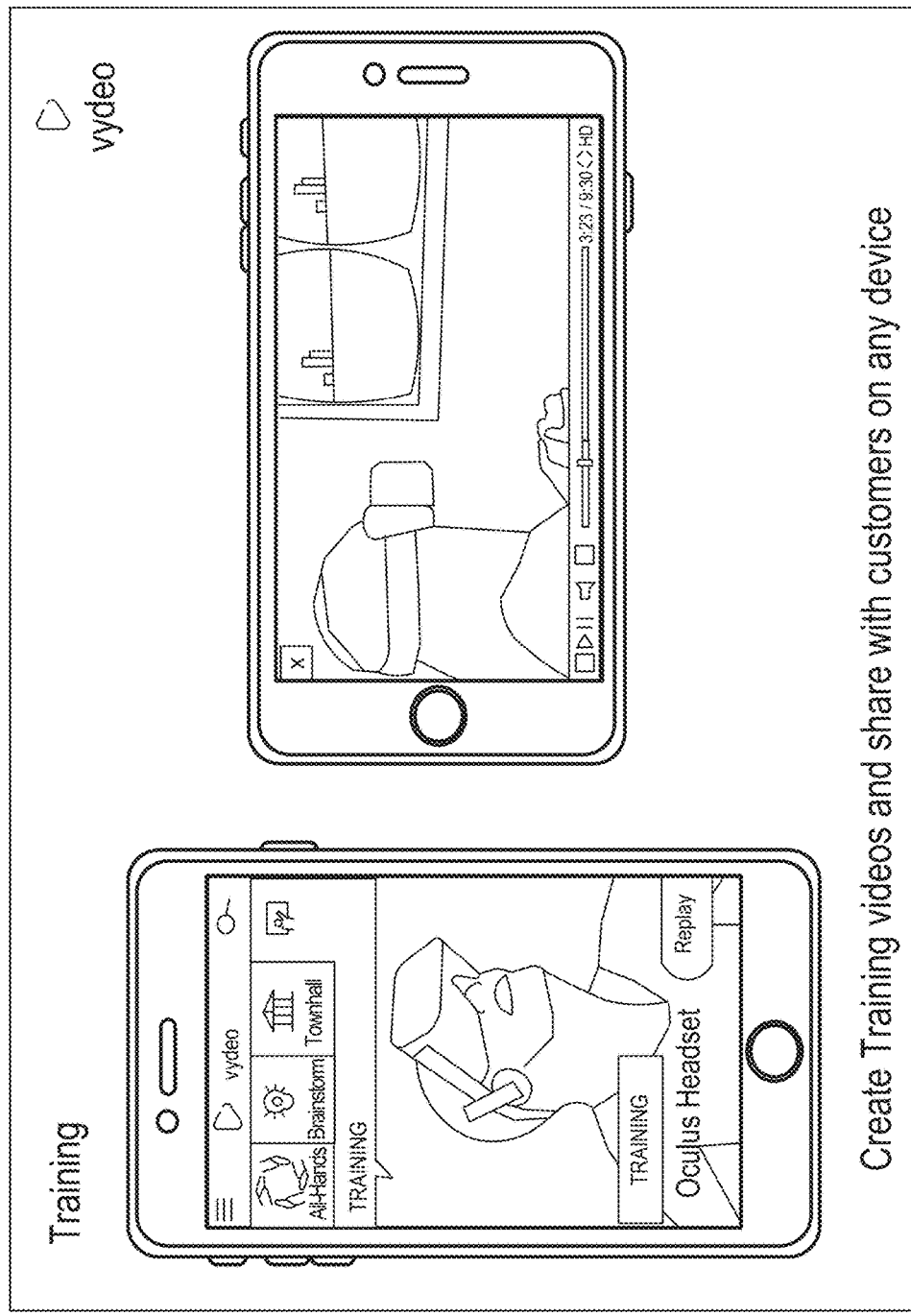
FIG. 36 shows a sequence of screen views of a training session with a remote trainee.
Figure 37:
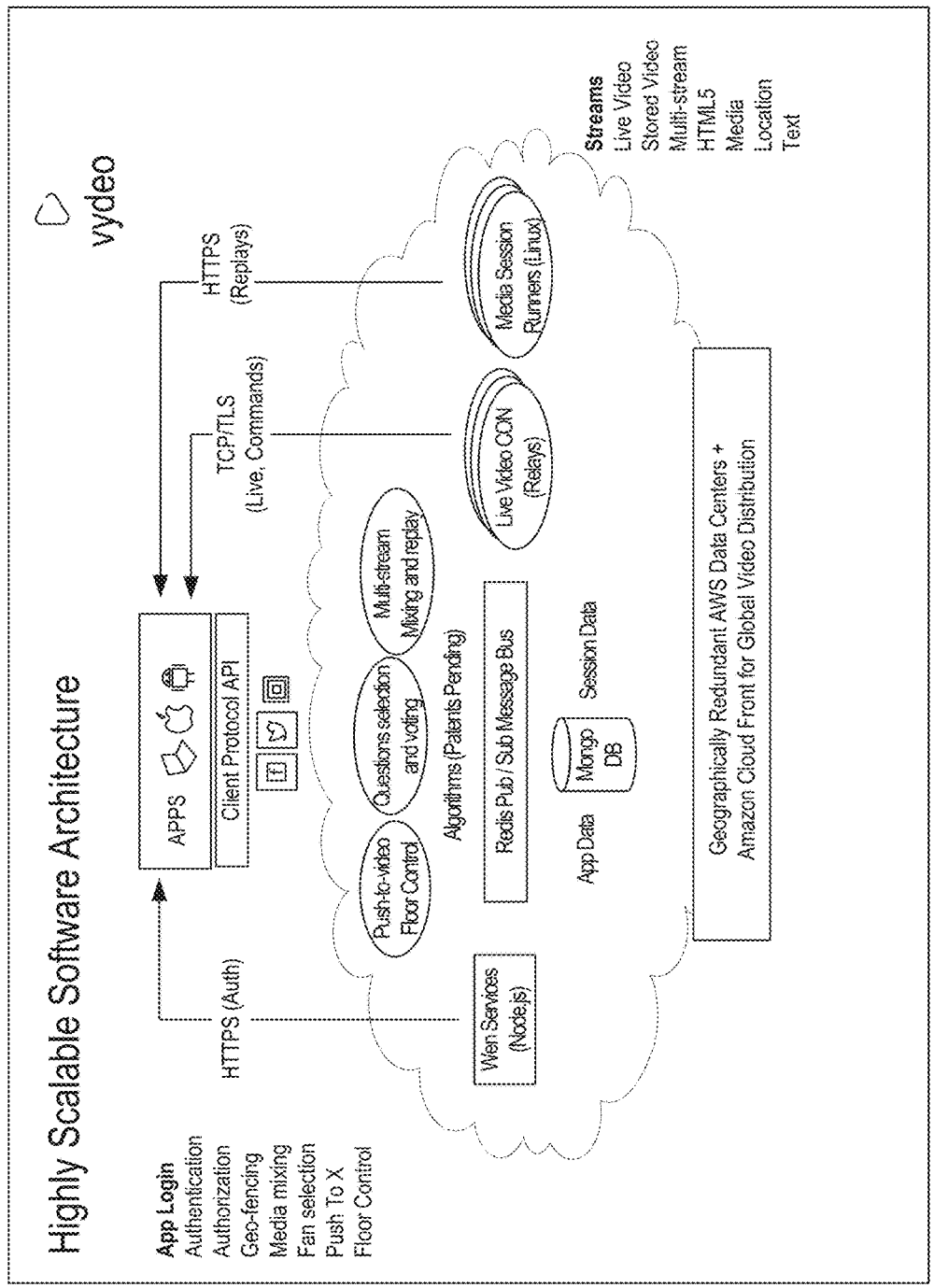
FIG. 37 shows an architectural diagram of a highly scalable software architecture.
Figure 38:
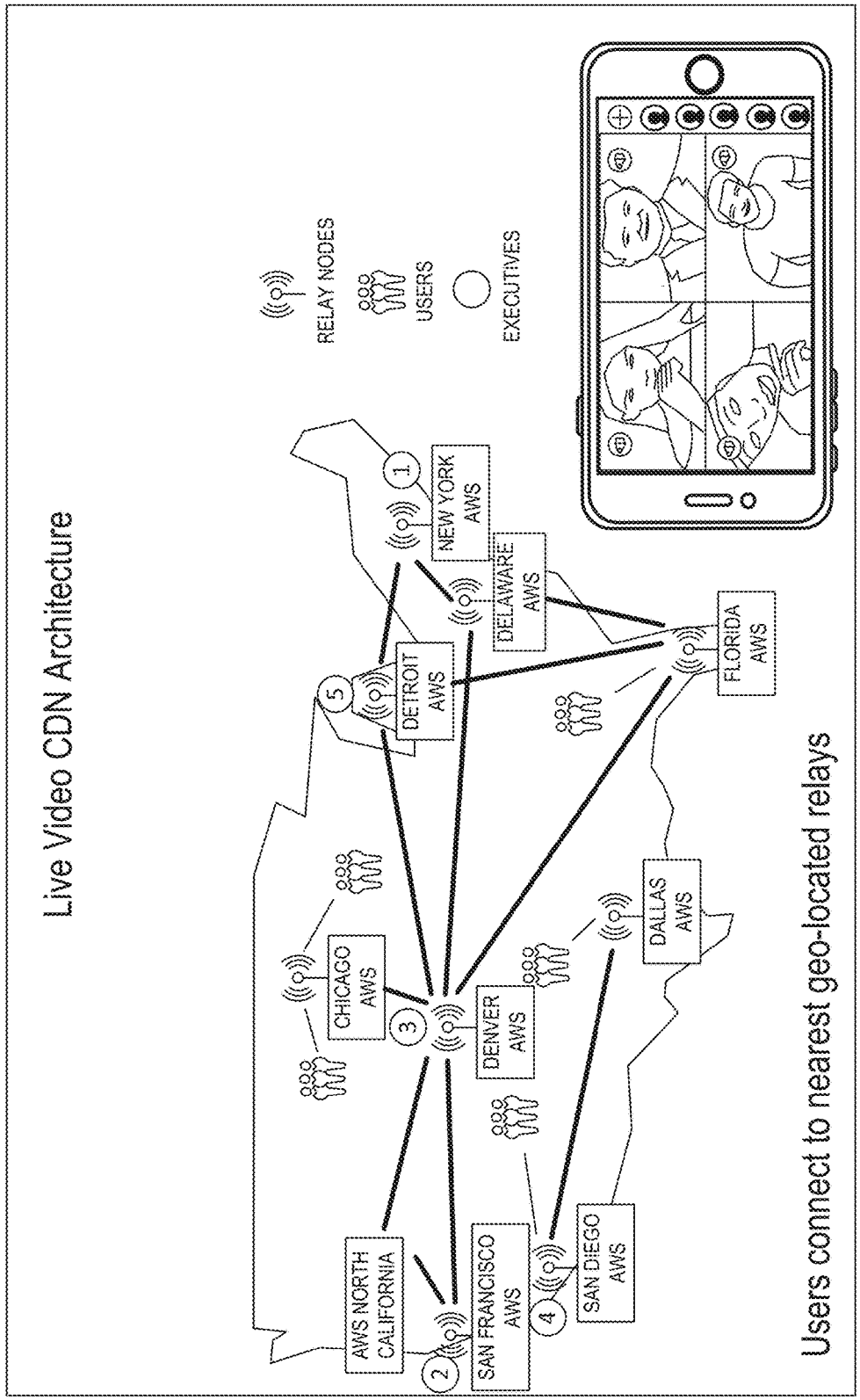
FIG. 38 shows a live video architecture.

In another example, a manager of a geographically distributed group wants to host a training session. Utilizing the platform, the manager sets up the training session. At the designated time, the manager initiates the session, and invites employees join the session. FIG. 36 shows a sequence of screen views of a training session with a remote trainee. While the streaming data for the training session of this example remains within the corporate network, in other cases, such as when training customers, the streaming data is transmitted via the internet. The manager uses his mobile device to record a trainer providing the training session, and the employees watch the session with their mobile devices, such as their smartphone, tablet, laptop computer, etc. The employees can also use non-mobile devices, such as a desktop computer, to participate in the training session. The platform of this example, as well as other examples, can utilize the software architecture of FIG. 37, or the live video architecture of FIG. 38.

Streaming Live Video with Reduced Latency

Figure 44:
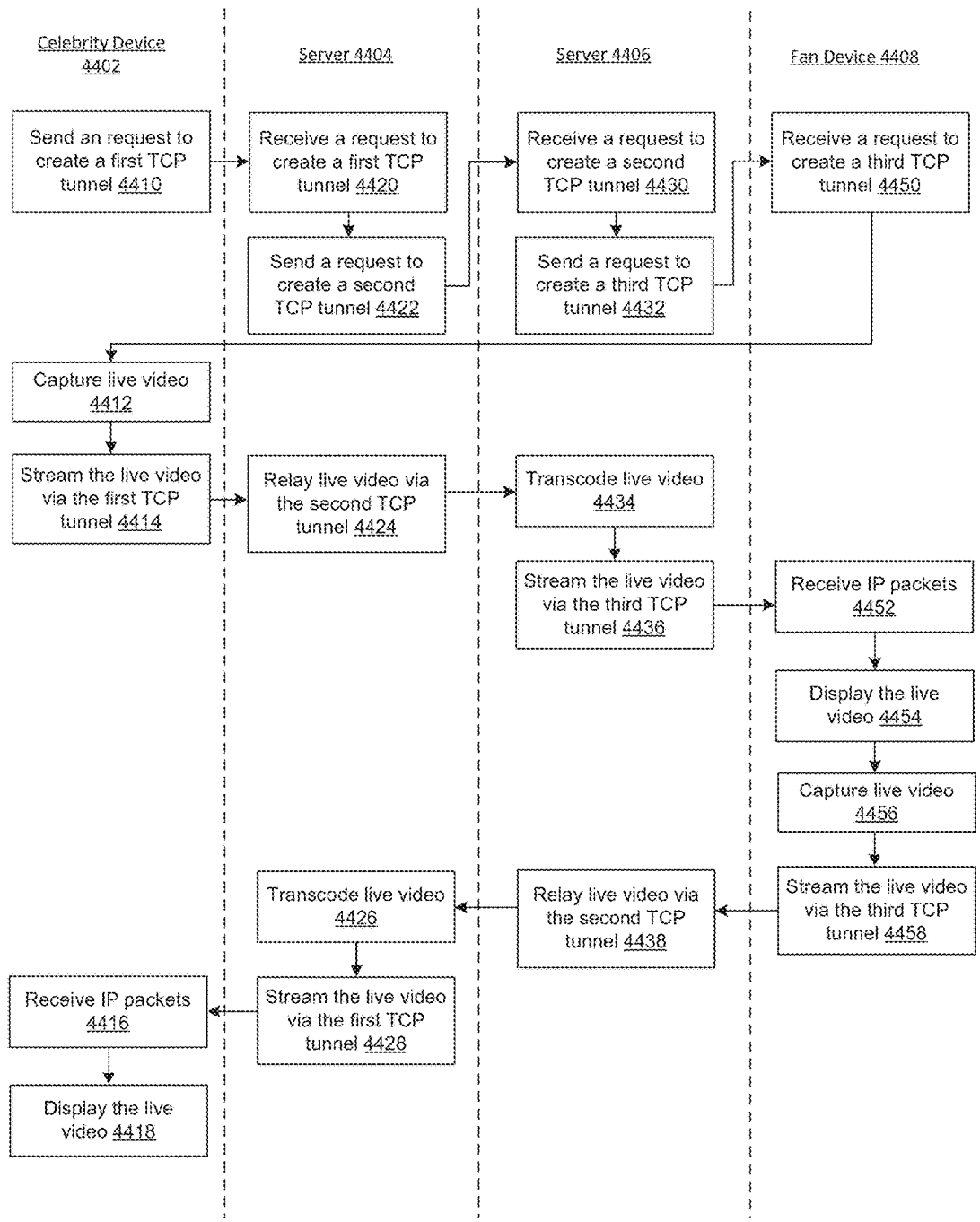
FIG. 44 shows a flow chart of an example process for streaming live video with reduced latency.

FIG. 44 shows a flow chart of an example process for streaming live video with reduced latency. Celebrity device 4402, server 4404, server 4406, and fan device 4408 are each a processing system, such as processing system 4500 of FIG. 45. Servers 4404 or 4406 can be servers at, for example, a private network, Amazon Web Services, Google Could Platform, etc., or can be video relay server 114 of FIG. 1. Celebrity device 4402 or fan device 4408 can be, for example, any of devices 102*a-c* of FIG. 1. At block 4410, celebrity device 4402 sends a request to create a first TCP tunnel, which utilizes raw sockets to enable reduced latency of communication, to server for 4404, which receives the request (block 4420). At block 4422, server 4404 sends a request to create a second TCP tunnel to server 4406, which receives the request (block 4430). At block 4432, server 4406 sends a request to create a third TCP tunnel to fan device 4408, which receives the request (block 4450). To establish a TCP tunnel, a first device can send an HTTP request to establish a network connection to a second device, and then send the request to create a TCP tunnel.

Figure 39:
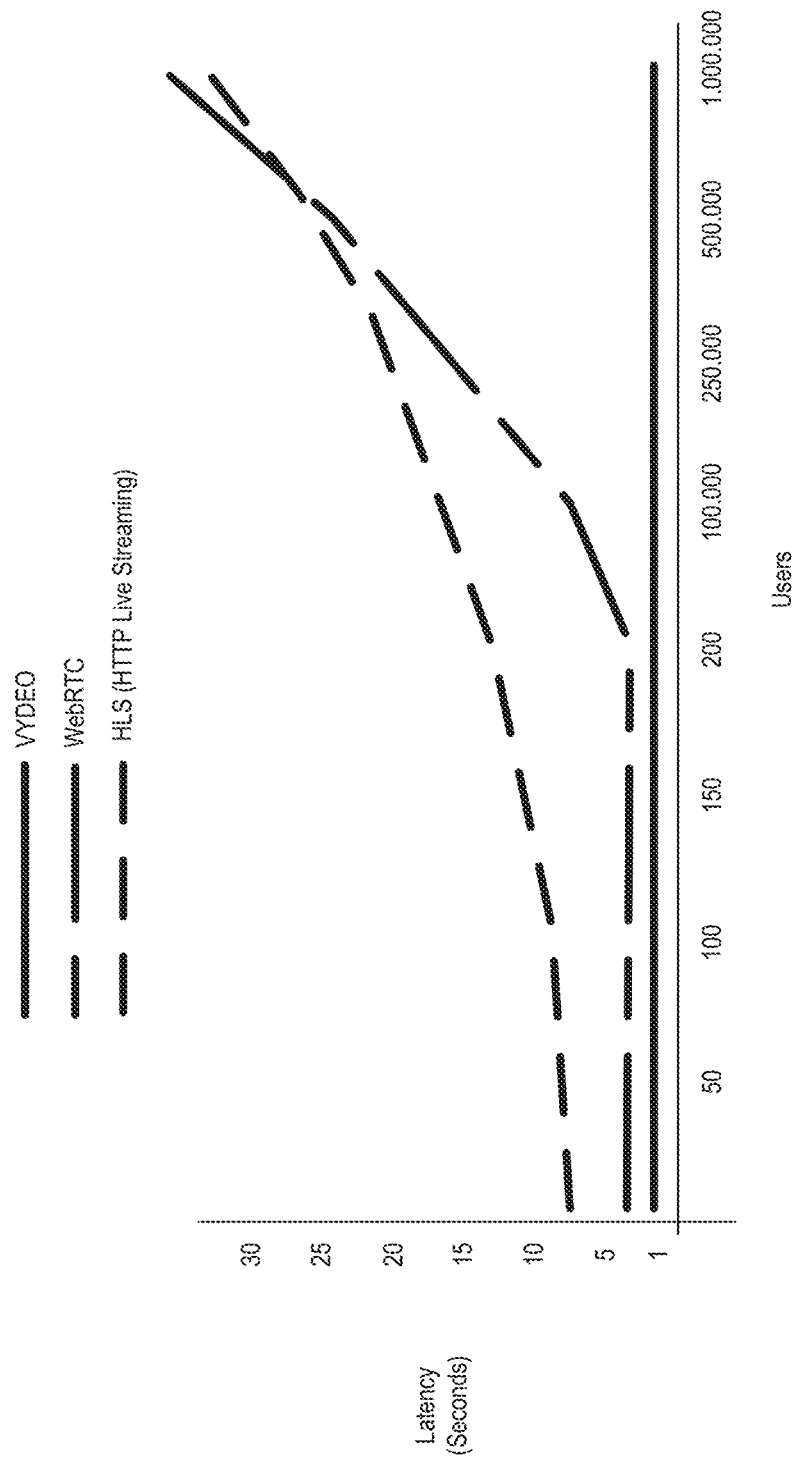
FIG. 39 shows a graph of latency for several live streaming technologies.

As shown in FIG. 39, communication latency of live streaming technologies WebRTC and HLS increases with increased numbers of users. For example, communication latency for WebRTC begins to increase significantly at approximately 200 users. As also shown in FIG. 39, an embodiment of a VYDEO platform that incorporates features of the disclosed technology has a communication latency that is lower than WebRTC or HLS with a small number of users, and remains approximately constant at approximately one second of latency up to one million users, whereas WebRTC and HLS reach latencies of over 30 seconds at a million users. By utilizing a TCP tunnel that utilizes raw sockets, a VYDEO platform can optimize communication strategies and utilize custom protocols to avoid certain limitations of other live streaming platforms. For example, a VYDEO platform can stream live video without performing error checking of the data of the IP packets that contain data of the live stream video, or without resynchronization/reordering any IP packets that contain data of the live stream video.

In the example of FIG. 44, at block 4412, celebrity device 4402 captures live video of the celebrity and streams the live video via the first TCP tunnel to server 4404 (block 4414), where server 4404 relays the live video via the second TCP tunnel to server 4406 (block 4424). The streamed live video data includes reordering data, which can be used to determine an intended order for the IP packets (e.g., data for frame 1 is ordered before data for frame 2, etc.). As server 4404 receives the IP packets containing the live stream video from celebrity device 4402, server 4404 directly relays the data as it is received, without performing any error checking of the data, and without reordering the IP packets, or even determining whether any other IP packets have been received out of order, or even just received. Similar techniques can be used by any intermediary device that relays information between celebrity device 4402 and fan device 4408, such as server 4406. It is by use of raw sockets via the TCP tunnel that a custom communication protocol can be used to reduce communications latency via such techniques.

In some embodiments, the disclosed technology enables the number of active live video streams to be minimized. In an example, celebrity device 4402 is used by celebrity 3120 of FIG. 31, who is located in San Francisco, fan device 4408 is utilized by fan 3125, who is located in Detroit, local server 3105 is server 4404, and local server 3115 is server 4406. In this example, celebrity 3120 interacts with fan 3125, and one million other fans observe the live interaction. With some technologies, streaming live video to 1 million users requires 1 million active video streams. For example, if local server 3115, in addition to streaming video from celebrity 3120 to fan 3125, streamed video from celebrity 3120 to 999 other fans in the Detroit area, 1000 active video streams would be created by celebrity device 4402, and would be relayed by server 4404 to server 4406, where server 4406 would transmit the live video to each of the 1000 users in the Detroit area. By use of the disclosed technology, even though the Internet does not support multi-cast, only one active video stream is sent by celebrity device 4402 to local server 3105. Further, local server 3105 relays only one active video stream to local server 3115 (or to local server 3110, even if there are multiple users in the Dallas area served by local server 3110). It is only at local server 3115 that the video stream is replicated to create 1000 active video streams for the 1000 users in the Detroit area, where each stream is sent to one of the 1000 fans served by local server 3115. Similarly, it is only at local server 3110 that the video stream is replicated to create the multiple active video streams for the multiple users in the Dallas area, where each stream is sent to one of the multiple fans served by local server 3110.

In some embodiments, some or all of the devices in the communication path between a celebrity device and a fan device, such as celebrity device 4402, server 4404, server 4406, or fan device 4408 in the example of FIG. 44, monitor the latency of communication with each other. When the latency of communication between two devices exceeds a first predetermined threshold, such as when the latency of communication between celebrity device 4402 and server 4404 exceeds the first predetermined threshold, the bit rate of communication between the two devices is reduced until the latency of communication decreases to below the first predetermined threshold. Conversely, when the latency falls below a second predetermined threshold, the bit rate of communication between the two devices is increased until the latency rises to between the first predetermined threshold and the second predetermined threshold. Use of such a technique allows the bitrate between devices in a communication path between a celebrity device and a fan device to be dynamically adjusted to achieve a latency within a target range.

At block 4434, server 4406 transcodes the live video. In some embodiments, data of each IP packet that includes live video data is transcoded without performing any error checking of the IP packets, or without reordering IP packets or determining whether reordering is needed, or even determining whether any other IP packet that includes live video was received. In an example, celebrity device 4402 captures live video and streams the live video at a bitrate of 2 Mb/sec to server 4404, and server 4404 streams the live video at the same bit rate (2 Mb/sec) to server 4406. In this example, server 4406 streams the live video to 1000 users. However, server 4406 may stream the live video to the 1000 users at any of various bitrates. The bit rate at which the live video is streamed can depend on any of several factors, and can vary dynamically.

For example, the bit rate may depend on the bandwidth available between server 4406 and a device of a user, or on the technical features of the device of the user, such as the screen resolution, or on a measured latency of communication between server 4406 and a device of a user, etc. After evaluating factors such as these related to devices of each of the 1000 users, server 4406 determines a bit rate to use for streaming to each user device. In this example, server 4406 determines to use one of three bit rates, 2 Mb/sec, 1 Mb/sec, or 500 kb/sec, when streaming to each of the 1000 users. Rather than transcoding the live video individually for each user, requiring a transcoding of up to 1000 active video streams, server 4406 transcodes the live video only two times, from 2 Mb/sec to 1 Mb/sec, and to 500 kb/sec. Server 4406 streams one of these three video streams, a 2 Mb/sec stream, a 1 Mb/sec stream, or a 500 kb/sec stream, to each of the 1000 user devices. Further, as server 4406 is streaming the live video to each of the users' devices, these factors can be continuously or periodically monitored, such as by server 4406 or the device of each fan, and the bit rate of the stream sent to each user's device can be dynamically adjusted, such as to achieve a latency within a target range.

At block 4436, server 4406 streams the live video via the third TCP tunnel to fan device 4408, where fan device 4408 receives IP packets (block 4452) containing data of the live video. Fan device 4408, using the reorder data, reorders the IP packets, and renders the live video data (without performing any error checking on the data of the IP packets) and displays the live video on fan device 4408 (block 4454). In an example, one or more IP packets that include data of the live video have been lost in transmission. Fan device 4408 drops some data, such as by dropping a frame that includes the lost video data, and renders the received video data absent the dropped data. In another example, live video is similarly streamed to each of 1 million fans that are watching the live video stream. The fan uses fan device 4408 to interact with the celebrity that is using celebrity device 4402, for example, asking the celebrity a question via a live video that is captured by fan device 4408 (block 4456) and that is streamed to celebrity device 4402, where the live video of the question is displayed for review by the celebrity. In an example where 1 million fans are watching the live video stream, the fans see both the live video streamed by celebrity device 4402 as well as the live video streamed by fan device 4408, such as via a side-by-side display of the two live video streams, a large display of the live video of the celebrity stream with the picture-in-picture display of the live video stream of the fan, etc. The two video streams can be displayed in any of various ways.

At block 4458, fan device 4408 streams the live video to server 4406 via the third TCP tunnel, where server 4406 relays the live video received from fan device 4408 to server 4404 via the second TCP tunnel (block 4438). At block 4426, server 4404 transcodes the live video. In an example, server 4404, in addition to serving celebrity device 4402, serves 999 other users. In this example, fan device 4408 captures live video and streams the live video at a bitrate of 500 kb/sec to server 4406, and server 4406 streams the live video at a bit rate of 500 kb/sec to server 4404. In this example, server 4404 streams the live video to 1000 users, which includes the celebrity. However, server 4404 may stream the live video to the 1000 users at any of various bitrates. The bit rate at which the live video is streamed can depend on any of several factors, such as those discussed related to block 4434. In this example, the live video stream is upscaled during transcoding from 500 kb/sec to 2 Mb/sec for transmission to celebrity device 4402. At block 4428, server 4404 streams the live video via the first TCP tunnel to celebrity device 4402, where celebrity device 4402 receives IP packets (block 4416) containing data of the live video. Celebrity device 4402 renders the live video data and displays the live video on celebrity device 4402 (block 4418).

While the example of FIG. 44 discusses streaming live video of a celebrity interacting with a fan, where multiple other fans watch the live streamed celebrity/fan interaction, the participating parties can be any of various parties. For example, the parties can be a CEO and employees where interactions between the CEO and an employee are streamed live to all the employees, or the parties can be a professor and a student where interactions between the professor and a student are streamed live to all the students, etc. Further, while the example of FIG. 44 shows two intermediate devices between a celebrity device and a particular fan device, the number of intermediate devices can be any number of intermediate devices, including zero (e.g., the celebrity device can communicate directly with the particular fan device). Further, there may be different numbers of intermediate devices between a celebrity device and other fan devices (e.g., one intermediate device between a celebrity device and a first fan device, two intermediate devices between the celebrity device and a second fan device, zero intermediate devices between the celebrity device and the third fan device, etc.).

Figure 40:
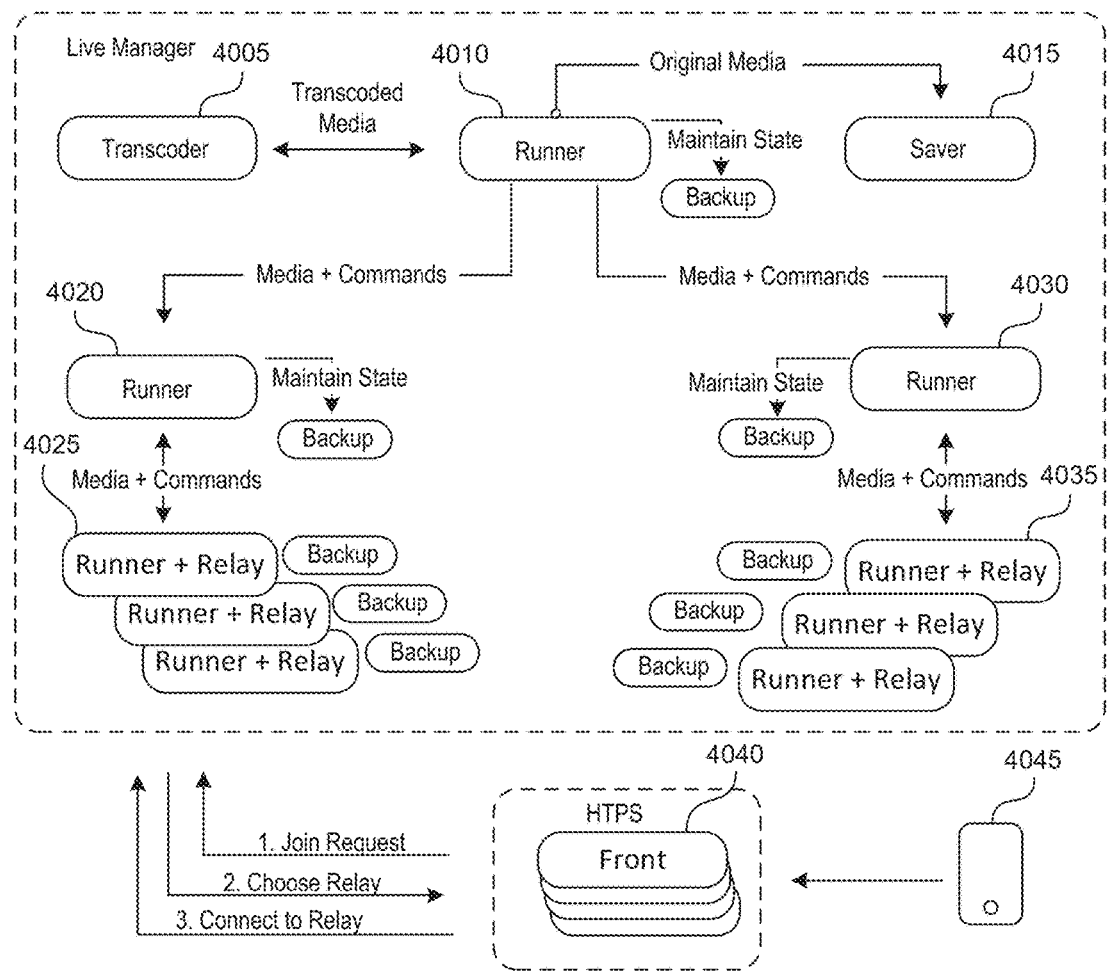
FIG. 40 is a generalized block diagram illustrating an architecture of a platform that enables streaming live video with reduced latency.

FIG. 40 is a generalized block diagram illustrating an architecture of a platform that enables streaming live video with reduced latency. It may be helpful to correlate the example architecture of FIG. 40 to the process of FIG. 44. Device 4045 can be celebrity device 4402. Device 4045 can utilize front tool 4040, which can handle HTTP requests that do not require real time performance, such as authentication, session management, or initial session join requests, to perform block 4410. Front tool 4040 can also be utilized to communicate with a runner tool, such as runner 4010, 4020, or 4030, executing on an intermediary device, such as server 4404 or 4406, for communications that do not require real time performance. Any of runner 4010, 4020, or 4030 can be media session runners 112 of FIG. 1.

Figure 41:
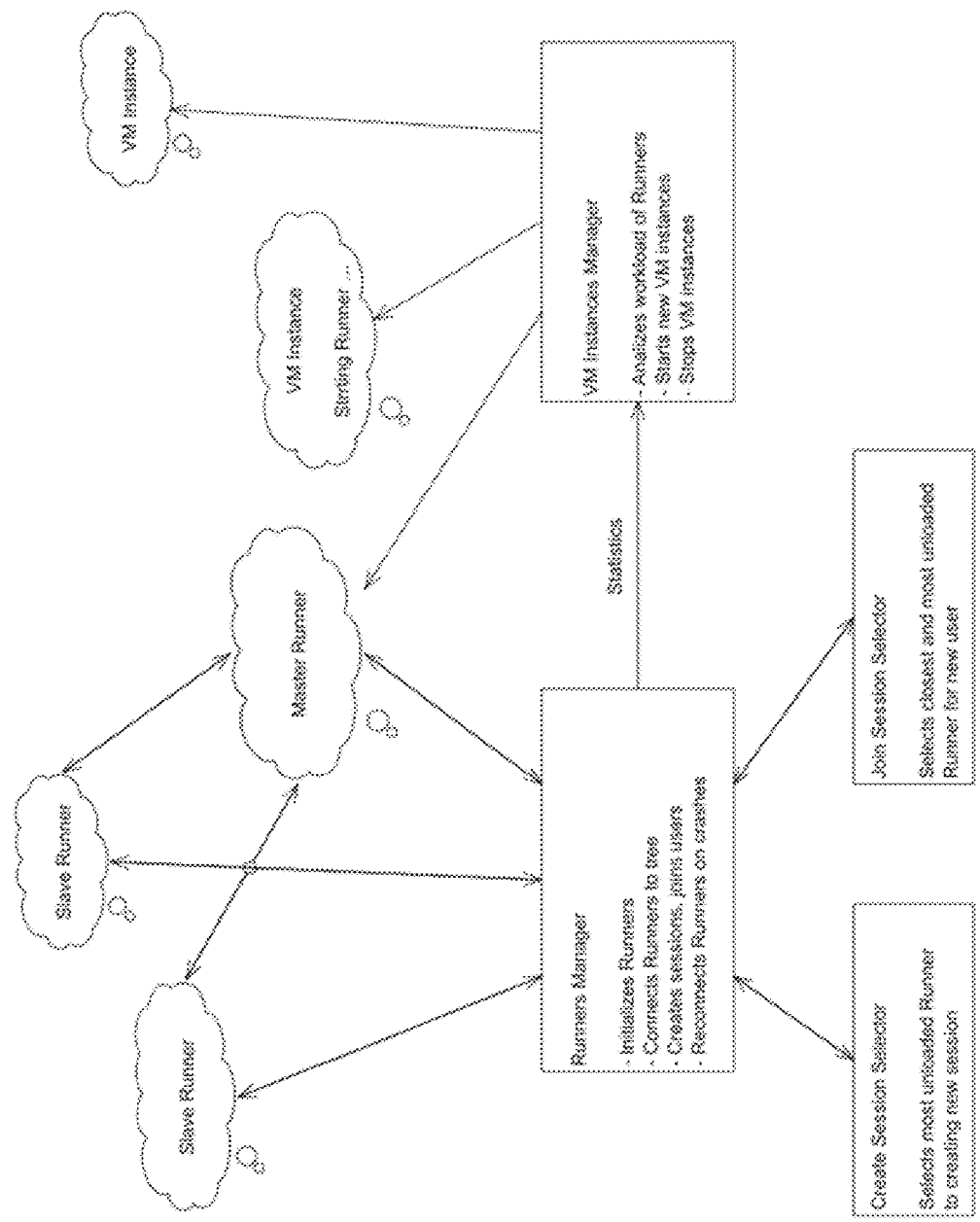
FIG. 41 shows a generalized block diagram of a live manager architecture.
Figure 42:
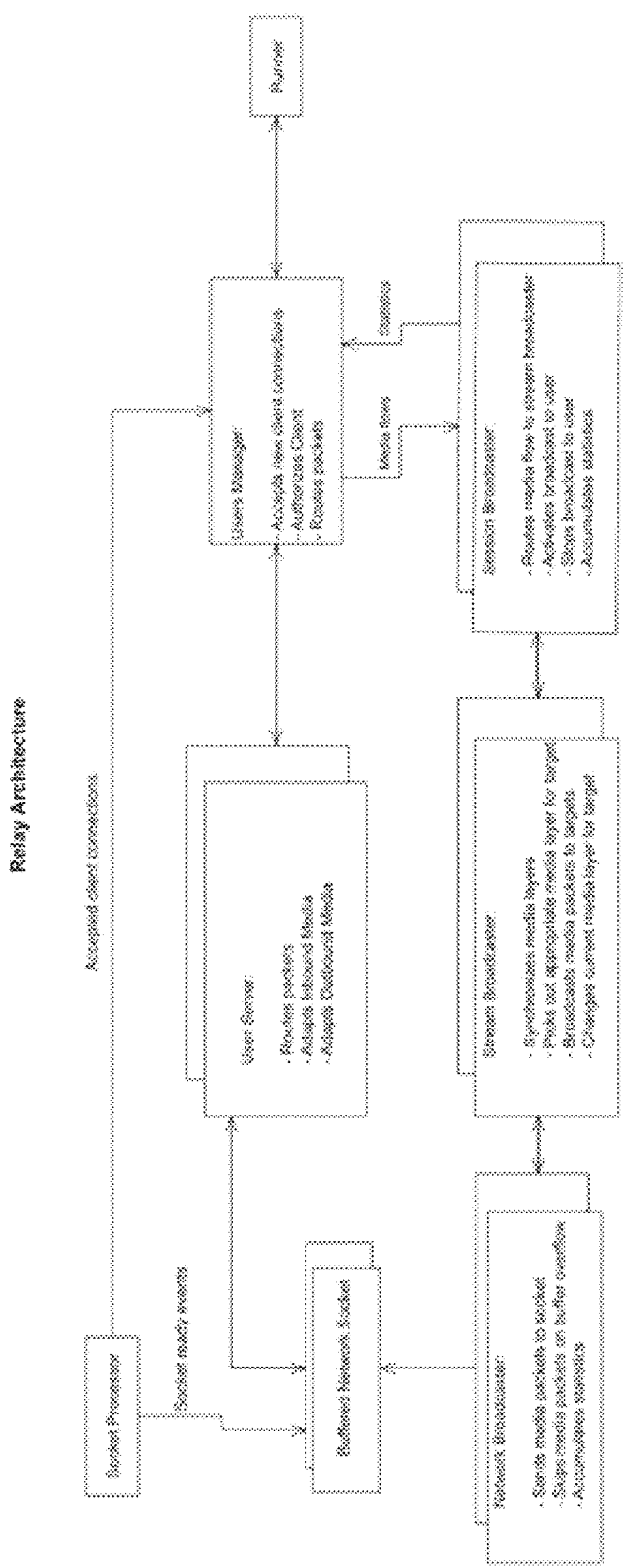
FIG. 42 shows a generalized block diagram of a relay architecture.
Figure 43:
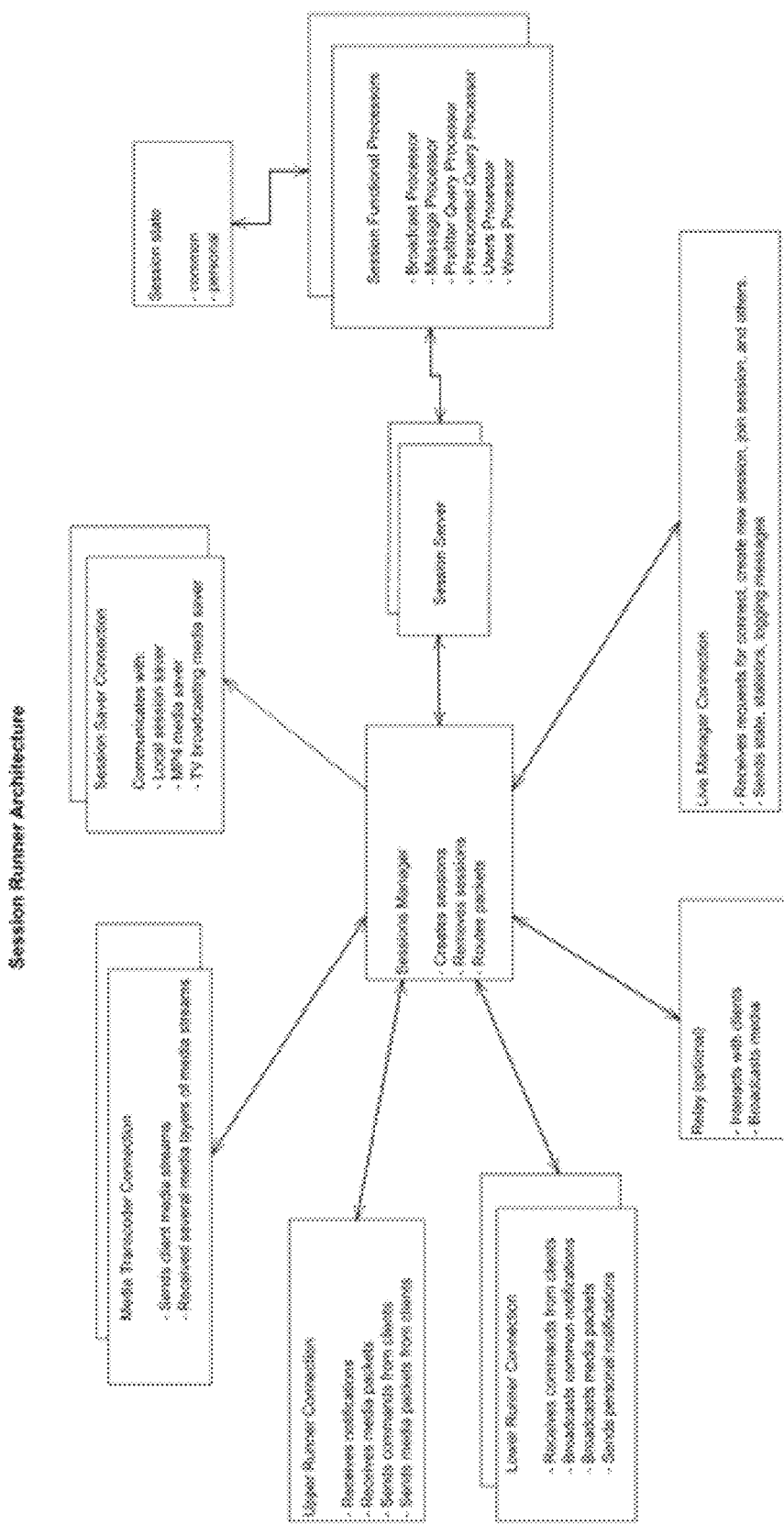
FIG. 43 shows a generalized block diagram of a session runner architecture.

A runner tool can perform, for example, the functions of some or all of blocks 4424, 4426, 4428, 4434, 4436, or 4438. FIG. 43 shows an example of a runner architecture. When performing blocks 4424 or 4438, a runner tool may utilize a relay tool. FIG. 42 shows an example of a relay architecture. A runner tool can further perform functions such as gathering live streaming session statistics, determining how to router live streaming data to participants (e.g., which intermediary servers to use, how to route data between servers, which servers will support which participants, etc.). Examples of statistics include observed latency between devices, number of participants in a live streaming session, etc. A runner tool can additionally store session state, such as IP addresses of participants, IP addresses of intermediary devices, bit rate of communication used for device to device connections, etc., and the session state can be backed up. When performing the function of blocks 4434 or 4426, a runner tool can utilize a transcoder tool, such as transcoder 4005, which is a tool that transforms an input media stream to one or more downscaled or upscaled streams, to enable selection of a stream tailored for the network conditions for any device to device connection (e.g., selecting a downscaled steam when latency is above a predetermined threshold, selecting an upscaled stream when latency is below a predetermined threshold, etc.). A runner tool can communicate with a live manager tool, an example of the architecture of which is illustrated in FIG. 41. A live manager tool can, for example, manage runner tree topology, node spawns, or terminations. In some embodiments, each runner tool maintains a connection to a live manager tool and provides data regarding statistics and checks to the live manager tool. If a runner tool instance becomes unresponsive or a network connection to a runner tool degrades, the live manager can terminate the failing node and replace it with a backup.

Saver 4015 is a tool that can be used to deliver session content to a third party consumer, or for other purposes. Saver 4015 can be used to, for example: store a binary log for the session to recover contents in case of some failure; separate live streamed data into files, such as mp4 files, that can be replayed using standard tools; render a live streaming session into a single file and stream that file to a third party tool, such as YouTube, FBLive, etc.; output fan media streams to a given Real-Time Messaging Protocol (RTMP) address to enable, e.g., use of the fan media streams by a TV studio.

Processing System

Figure 45:
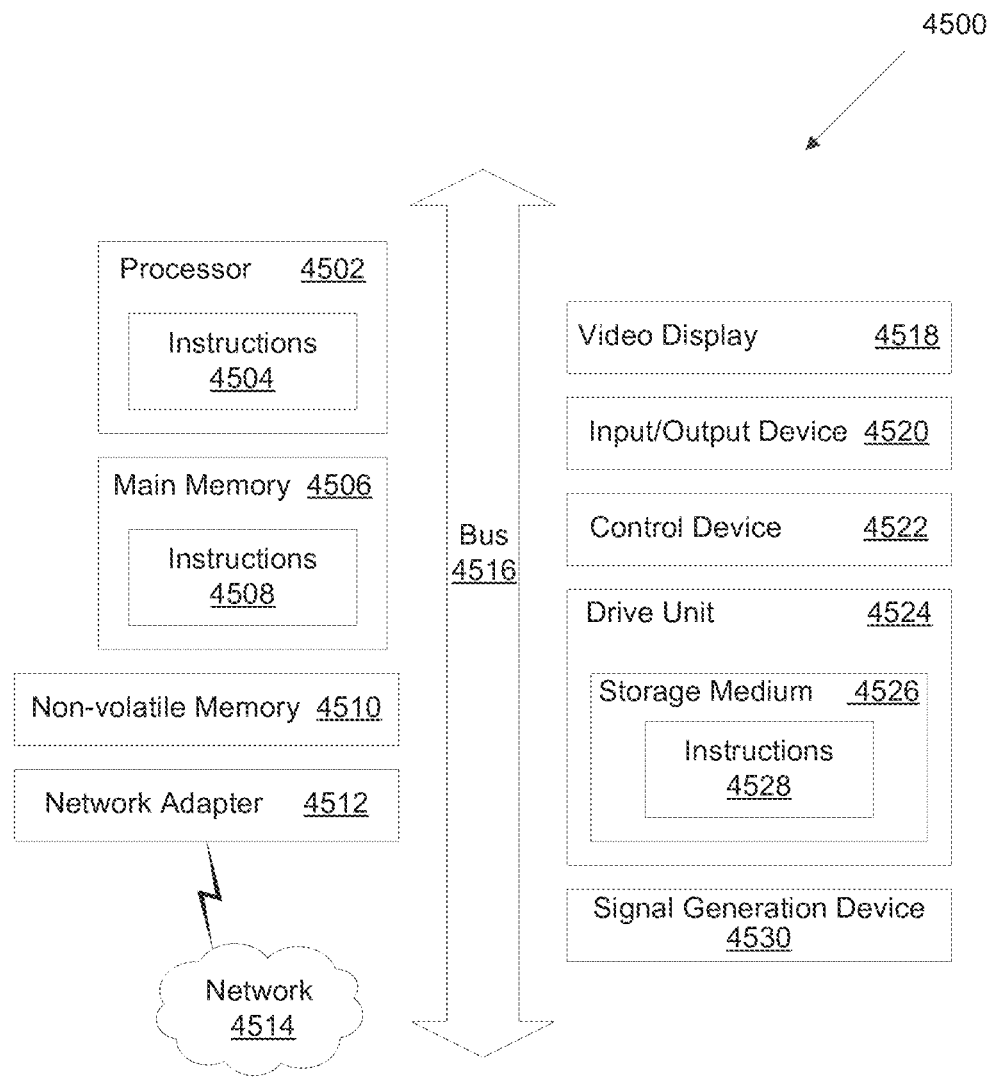
FIG. 45 is a block diagram illustrating an example of a processing system in which at least some operations described herein can be implemented.

FIG. 45 is a block diagram illustrating an example of a processing system 4500 in which at least some operations described herein can be implemented. The processing system 4500 may be or be part of a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system may include one or more central processing units ("processors") 4502, main memory 4506, non-volatile memory 4510, network adapter 4512 (e.g., network interfaces), video display 4518 (which can include a hardware accelerator, such as a hardware decoder, to accelerate video display), input/output devices 4520, control device 4522 (e.g., keyboard and pointing devices), drive unit 4524 including a storage medium 4526, and signal generation device 4530 that are communicatively connected to a bus 4516. The bus 4516 is illustrated as an abstraction that represents any one or more separate physical buses, point to point connections, or both connected by appropriate bridges, adapters, or controllers. The bus 4516, therefore, can include, for example, a system bus, a Peripheral Component Interconnect (PCI) bus or PCI-Express bus, a Hyper Transport or industry standard architecture (ISA) bus, a small computer system interface (SCSI) bus, a universal serial bus (USB), IIC (I2C) bus, or an Institute of Electrical and Electronics Engineers (IEEE) standard 3994 bus, also called "Firewire."

In various embodiments, the processing system 4500 operates as part of a user device, although the processing system 4500 may also be connected (e.g., wired or wirelessly) to the user device. In a networked deployment, the processing system 4500 may operate in the capacity of a server or a client machine in a client-server network environment, or as a peer machine in a peer-to-peer (or distributed) network environment.

The processing system 4500 may be a server computer, a client computer, a personal computer (e.g., a laptop or desktop computer), a tablet, a personal digital assistant (PDA), a mobile phone, an iPhone®, an iPad®, a Blackberry®, a processor, a web appliance, a network router, switch or bridge, a console, a hand-held console, a gaming device, a music player, or any machine capable of executing a set of instructions (sequential or otherwise) that specify actions to be taken by the processing system.

While the main memory 4506, non-volatile memory 4510, and storage medium XX26 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 4528. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 4504, 4508, 4528) set at various times in various memory and storage devices in a computer, and that, when read and executed by one or more processing units or processors 4502, cause the processing system 4500 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 4510, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 4512 enables the processing system 4500 to mediate data in a network 4514 with an entity that is external to the processing system 4500 through any known and/or convenient communications protocol supported by the processing system 4500 and the external entity. The network adapter 4512 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 4512 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by any combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for streaming live video over a network with low latency, the method comprising:
   receiving a Hypertext Transfer Protocol (HTTP) request, by a server, from a sending device, to establish a network connection;
   sending a HTTP request, by the server, to a receiving device, to establish a network connection;
   receiving a request, by the server, from the sending device, to create a Transmission Control Protocol (TCP) tunnel between the sending device and the server to enable live video acquired by the sending device to be streamed to the server, wherein the TCP tunnel enables live video to be streamed by using raw sockets to enable sending and receiving of Internet Protocol (IP) packets without any protocol-specific transport layer formatting;
   sending a request, by the server, to the receiving device, to create a TCP tunnel between the server and the receiving device for streaming live video;
   receiving a first plurality of IP packets, by the server, from the sending device, via the TCP tunnel between the sending device and the server, wherein each IP packet of the first plurality of IP packets includes live video data streamed at a first bitrate, wherein the live video data of at least one of the first plurality of packets includes an error due to transmission by the sending device;
   for each IP packet of the first plurality of IP packets:
      transcoding the live streamed video data of said each IP packet from the first bitrate to a second bitrate as said each IP packet is received from the sending device without determining whether the live streamed video data includes any transmission errors and without reordering any of the first plurality of IP packets, wherein the transcoding of the first plurality of IP plackets creates a second plurality of IP packets that include second bitrate transcoded video data; and
   for each IP packet of the second plurality of IP packets:
      sending said each IP packet, by the server, to the receiving device, via the TCP tunnel between the server and the receiving device, as said each IP packet is transcoded from the first bitrate to the second bitrate, wherein each IP packet of the second plurality of IP packets includes live video data at the second bitrate, and includes ordering data to enable the receiving device to reorder the second plurality of IP packets for display at the receiving device.

2. The method of claim 1, further comprising:
   receiving a request, by the server, from the receiving device, to create a TCP tunnel between the receiving device and the server to enable the receiving device to stream live video acquired by the receiving device to the server;
   sending a request, by the server, to the sending device, to create a TCP tunnel between the server and the sending device for streaming live video to the sending device;
   receiving a third plurality of IP packets, by the server, from the receiving device, via the TCP tunnel that enables the receiving device to stream live video to the server, wherein each IP packet of the third plurality of IP packets includes live video data streamed at a third bitrate;
   for each IP packet of the third plurality of IP packets:
      transcoding the live streamed video data of said each IP packet of the third plurality of IP packets from the third bitrate to a fourth bitrate without determining whether the live streamed video data of said each IP packet of the third plurality of IP packets includes any transmission errors, and without reordering any of the third plurality of IP packets, wherein the transcoding of the third plurality of IP plackets creates a fourth plurality of IP packets that include fourth bitrate transcoded video data; and
   sending the fourth plurality of IP packets, by the server, to the sending device, via the TCP tunnel that enables the server to stream live video to the sending device, wherein each IP packet of the fourth plurality of IP packets includes live video data at the fourth bitrate, and includes ordering data to enable the sending device to reorder the fourth plurality of IP packets for display at the sending device.

3. The method of claim 2, wherein two or more of the first bitrate, the second bitrate, the third bitrate, and the fourth bitrate are a same bitrate.

4. The method of claim 1, wherein the error due to transmission results in the video data of the at least one of the plurality of packets being:
   out of order; and/or
   incomplete.

5. A method comprising:
  receiving a request, by a server, to create a first Transmission Control Protocol (TCP) tunnel between a first device and the server for streaming live video, wherein the first TCP tunnel utilizes raw sockets;
  sending a request, by the server, to create a second TCP tunnel between the server and a second device for streaming live video, wherein the second TCP tunnel utilizes raw sockets;
  receiving a first plurality of IP packets, by the server, from the second device, via the first TCP tunnel, wherein each IP packet of the first plurality of IP packets includes video data streamed live at a first bitrate and includes packet ordering data, wherein the video data of at least one of the first plurality of packets includes an error due to transmission from the first device to the server;
  for each IP packet of the first plurality of packets:
    transcoding the video data of said each IP packet from the first bitrate to a second bitrate as said each IP packet is received from the first device without correcting the error, wherein the transcoding of the first plurality of packets creates a second plurality of packets that include video data transcoded at the second bitrate; and
  for each IP packet of the second plurality of packets:
    sending said each IP packet, by the server, to the second device, via the TCP tunnel between the server and the second device, as said each IP packet is transcoded from the first bitrate to the second bitrate, wherein each IP packet of the second plurality of IP packets includes live video data at the second bitrate, and includes the ordering data to enable the second device to reorder the second plurality of IP packets for display at the second device.

6. The method of claim 5, further comprising:
  receiving a request, by the server, from the second device, to create a TCP tunnel between the second device and the server to enable the second device to stream live video acquired by the second device to the server;
  sending a request, by the server, to the first device, to create a TCP tunnel between the server and the first device for streaming live video to the first device;
  receiving a third plurality of IP packets, by the server, from the second device, via the TCP tunnel that enables the second device to stream live video to the server, wherein each IP packet of the third plurality of IP packets includes live video data streamed at a third bitrate;
  creating a fourth plurality of IP packets by transcoding the video data of the third plurality of IP packets from a third bitrate to a fourth bitrate, wherein, when the video data of an IP packet of the fourth plurality of IP packets includes particular data with an error due to transmission error, the video data of the IP packet of the fourth plurality of IP packets is transcoded without correcting the error; and
  sending the fourth plurality of IP packets, by the server, to the first device, via the TCP tunnel between the server and the first device, wherein each IP packet of the fourth plurality of IP packets includes live video data at the fourth bitrate, and includes ordering data to enable the first device to reorder the fourth plurality of IP packets for display at the first device.

7. The method of claim 5, wherein the first bitrate, the second bitrate, the third bitrate, and the fourth bitrate are each equal to or greater that 500 kbits per second, and are each equal to or less than 2 Mbits per second.

8. The method of claim 5, wherein each IP packet of the first plurality of IP packets and the second plurality of IP packets is equal to or less than a maximum transmission unit for an Institute of Electrical and Electronics Engineers (IEEE) 802.3 Ethernet standard.

9. The method of claim 5, wherein the error due to transmission results in the video data of the at least one of the plurality of packets being:
  out of order; and/or
  incomplete.

10. The method of claim 5, wherein each packet of the third plurality of IP packets is transcoded without determining whether any other IP packet of the third plurality of IP packets was received by the server.

11. The method of claim 5, wherein each packet of the third plurality of IP packets is transcoded without waiting for data of any unreceived IP packet of the third plurality of IP packets to be received by the server.

12. The method of claim 5, wherein each packet of the third plurality of IP packets is transcoded without the server reordering any of the third plurality of IP packets.

13. The method of claim 5, further comprising:
  reordering an IP packet of the second plurality of IP packets, by the second device, based on the ordering data.

14. The method of claim 5, further comprising:
  determining, by the second device, based on the ordering data, that an IP packet of the second plurality of IP packets was lost during communication.

15. The method of claim 5, wherein a particular IP packet of the first plurality of IP packets includes data of a Predicted frame (P-frame), wherein the data of the P-frame includes an error due to transmission error, and wherein the video data of the particular IP packet is transcoded from the first bitrate to the second bitrate without correcting the error of the data of the P-frame.

16. The method of claim 5, wherein each packet of the second plurality of IP packets is sent from the server to the second device without determining whether any other IP packet of the second plurality of IP packets was received by the server.

17. The method of claim 5, wherein each packet of the second plurality of IP packets is sent from the server to the second device without waiting for data of any unreceived IP packet of the second plurality of IP packets to be received by the server.

18. The method of claim 5, wherein each packet of the second plurality of IP packets is sent from the server to the second device without the server reordering any of the second plurality of IP packets.

19. The method of claim 5, further comprising:
  receiving a third plurality of IP packets, by the server, via the first TCP tunnel, wherein each IP packet of the third plurality of IP packets includes video data streamed live at the first bitrate and includes packet ordering data;
  creating a fourth plurality of IP packets by transcoding the video data of the third plurality of IP packets from the first bitrate to the second bitrate;
  creating a fifth plurality of IP packets by transcoding the video data of the third plurality of IP packets from the first bitrate to a third bitrate, wherein the third bitrate is lower than the second bitrate; and
  determining, by the server, to send the fifth plurality of IP packets to the second device, via the TCP tunnel between the server and the second device, in response to a determination that a latency of communication between the server and the second device is above a first predetermined threshold.

20. The method of claim 5, further comprising:
receiving a third plurality of IP packets, by the server, via the first TCP tunnel, wherein each IP packet of the third plurality of IP packets includes video data streamed live at the first bitrate and includes packet ordering data;
creating a fourth plurality of IP packets by transcoding the video data of the third plurality of IP packets from the first bitrate to the second bitrate;
creating a fifth plurality of IP packets by transcoding the video data of the third plurality of IP packets from the first bitrate to a third bitrate, wherein the third bitrate is higher than the second bitrate; and
determining, by the server, to send the fifth plurality of IP packets to the second device, via the TCP tunnel between the server and the second device, in response to a determination that a latency of communication between the server and the second device is below a first predetermined threshold.

21. A computing system comprising:
a processor;
a networking interface coupled to the processor; and
a memory coupled to the processor and storing instructions which, when executed by the processor, cause the computing system to perform operations including:
receiving a request, via the networking interface, to create a first Transmission Control Protocol (TCP) tunnel between a first device and the computing system for streaming live video, wherein the first TCP tunnel utilizes raw sockets;
sending a request, via the networking interface, to create a second TCP tunnel between the computing system and a second device for streaming live video, wherein the second TCP tunnel utilizes raw sockets;
receiving a first plurality of IP packets, from the first device, via the networking interface and the first TCP tunnel, wherein each IP packet of the first plurality of IP packets includes video data streamed live at a first bitrate and includes packet ordering data, wherein the video data of at least one of the first plurality of packets includes an error due to transmission from the first device to the server;
for each IP packet of the first plurality of packets:
transcoding the video data of said each IP packet from the first bitrate to a second bitrate as said each IP packet is received from the first device without correcting the error, wherein the transcoding of the first plurality of packets creates a second plurality of packets that include video data transcoded at the second bitrate; and
for each IP packet of the second plurality of packets:
sending said each IP packets, via the networking interface, to the second device, via the TCP tunnel between the computing system and the second device, as said each IP packet is transcoded from the first bitrate to the second bitrate, wherein each IP packet of the second plurality of IP packets includes live video data at the second bitrate, and includes the ordering data to enable the second device to reorder the second plurality of IP packets for display at the second device.

22. The computing system of claim 21, wherein a particular IP packet that was sent by the first device to the computing system was not received by the computing system, wherein the particular IP packet includes data of a Predicted frame (P-frame) of the video data streamed live at the first bitrate, and wherein the creating the second plurality of IP packets by transcoding the video data of the first plurality of IP packets from the first bitrate to the second bitrate is completed without the computing system having received the particular IP packet.

23. The computing system of claim 21, wherein the sending of each IP packet of the second plurality of IP packets is done without determining whether any other IP packet of the second plurality of IP packets was received by the second device.

24. The computing system of claim 21, wherein the error due to transmission results in the video data of the at least one of the plurality of packets being:
out of order; and/or
incomplete.

* * * * *